US012754474B2

(12) United States Patent
Oriordan et al.

(10) Patent No.: US 12,754,474 B2
(45) Date of Patent: Oct. 6, 2026

(54) CONCURRENT MASK OPTIMIZATION FOR MULTIPLE LAYERS

(71) Applicant: D2S, Inc., San Jose, CA (US)

(72) Inventors: Donald Oriordan, Sunnyvale, CA (US); Akira Fujimura, Saratoga, CA (US)

(73) Assignee: D2S, INC., San Jose, CA (US)

( * ) Notice: Subject to any disclaimer, the term of this patent is extended or adjusted under 35 U.S.C. 154(b) by 8 days.

(21) Appl. No.: 18/814,439

(22) Filed: Aug. 23, 2024

(65) Prior Publication Data

US 2025/0068057 A1 Feb. 27, 2025

Related U.S. Application Data

(60) Provisional application No. 63/679,793, filed on Aug. 6, 2024, provisional application No. 63/608,141, filed (Continued)

(51) Int. Cl.
*G03F 1/70* (2012.01)
*G03F 1/36* (2012.01)

(Continued)

(52) U.S. Cl.
CPC .................. *G03F 1/70* (2013.01); *G03F 1/36* (2013.01); *G03F 1/72* (2013.01); *G03F 7/70441* (2013.01);

(Continued)

(58) Field of Classification Search
CPC ..... G03F 1/70; G03F 1/36; G03F 1/72; G03F 7/70441; G03F 7/705; G03F 7/70633;

(Continued)

(56) References Cited

U.S. PATENT DOCUMENTS 5,135,609 A 8/1992 Pease et al.
5,326,659 A 7/1994 Liu et al.

(Continued)

FOREIGN PATENT DOCUMENTS

EP 3951496 A1 2/2022
JP 2009004699 A 1/2009

(Continued)

OTHER PUBLICATIONS

Dong, Xuan, et al., "Process-Variation-Aware Rule-Based Optical Proximity Correction for Analog Layout Migration," IEEE Transactions on Computer-Aided Design of Integrated Circuits and Systems, vol. 36, No. 8, Aug. 1, 2017, pp. 1395-1405, IEEE.

(Continued)

*Primary Examiner* — Nha T Nguyen
(74) *Attorney, Agent, or Firm* — ADELI LLP

(57) ABSTRACT

Some embodiments provide a method for modifying a mask layout for producing masks used to manufacture an IC. The method identifies a first set of mask images corresponding to a first layer and a second set of mask images corresponding to a second layer. The method formulates a problem that expresses correlation between desired shapes of IC components and predicted as-manufactured shapes of the IC components. The IC components include components on the first layer and vias on the second layer, each via connecting a first-layer component to a component on another layer. The method solves the problem by iteratively exploring modifications to both the first and second sets of mask images to identify modified sets of mask images that result in predicted as-manufactured shapes for the components on the first layer and the vias on the second layer that sufficiently correlate to the desired shapes of the IC components.

20 Claims, 42 Drawing Sheets

Related U.S. Application Data on Dec. 8, 2023, provisional application No. 63/534,137, filed on Aug. 23, 2023.

(51) Int. Cl.

*G03F 1/72* (2012.01)
*G03F 7/00* (2006.01)
*G06F 30/398* (2020.01)
*G06F 30/367* (2020.01)
*G06F 119/18* (2020.01)
*G06F 119/22* (2020.01)

(52) U.S. Cl.

CPC ............ *G03F 7/705* (2013.01); *G06F 30/398* (2020.01); *G03F 7/70633* (2013.01); *G06F 30/367* (2020.01); *G06F 2119/18* (2020.01); *G06F 2119/22* (2020.01)

(58) Field of Classification Search

CPC .. G06F 30/398; G06F 30/367; G06F 2119/18; G06F 2119/22

See application file for complete search history.

(56) References Cited

U.S. PATENT DOCUMENTS 5,527,645 A 6/1996 Pati et al.
5,553,274 A 9/1996 Liebmann
5,682,323 A 10/1997 Pasch et al.
5,698,346 A 12/1997 Sugawara
5,723,233 A 3/1998 Garza et al.
5,801,954 A 9/1998 Le et al.
5,827,623 A 10/1998 Ishida et al.
5,849,440 A 12/1998 Lucas et al.
5,879,844 A 3/1999 Yamamoto et al.
6,187,483 B1 2/2001 Capodieci et al.
6,269,472 B1 7/2001 Garza et al.
6,467,076 B1 10/2002 Cobb
6,510,730 B1 1/2003 Phan et al.
6,541,167 B2 4/2003 Petersen et al.
6,611,953 B1 8/2003 Filseth et al.
6,803,554 B2 10/2004 Ye et al.
6,807,503 B2 10/2004 Ye et al.
6,892,365 B2 5/2005 Culp et al.
6,978,438 B1 12/2005 Capodieci
6,996,797 B1 2/2006 Liebmann et al.
7,003,758 B2 2/2006 Ye et al.
7,063,920 B2 6/2006 Baba-Ali
7,080,349 B1 7/2006 Babcock et al.
7,266,803 B2 9/2007 Chou et al.
7,269,817 B2 9/2007 Heng et al.
7,353,493 B2 4/2008 Akiyama
7,493,590 B1 2/2009 Hess et al.
7,509,620 B2 3/2009 Davids
7,526,748 B2 4/2009 Kotani et al.
7,545,984 B1 6/2009 Kiel et al.
7,546,574 B2 6/2009 Torunoglu et al.
7,589,819 B2 9/2009 Baba-Ali
7,694,267 B1 4/2010 Ye et al.
7,703,069 B1 4/2010 Liu et al.
7,716,627 B1 5/2010 Jeffrey et al.
7,754,401 B2 7/2010 Fujimura et al.
7,856,612 B1 12/2010 Ungar et al.
7,921,383 B1 4/2011 Wei
8,166,423 B2 4/2012 Mansfield et al.
8,238,644 B2 8/2012 Brunner et al.
8,307,310 B2 11/2012 Kotani et al.
8,336,006 B2 12/2012 Kodera et al.
8,429,573 B2 4/2013 Ogino et al.
8,473,875 B2 6/2013 Fujimura et al.
8,478,808 B1 7/2013 Torunoglu
8,490,034 B1 7/2013 Torunoglu et al.
8,512,919 B2 8/2013 Fujimura et al.
8,719,739 B2 5/2014 Fujimura et al.
8,818,072 B2 8/2014 Ong et al.
8,839,169 B2 9/2014 Gyoda et al.
9,257,367 B2 2/2016 Okada et al.
9,424,372 B1 8/2016 Torunoglu et al.
9,672,320 B2 6/2017 Chang et al.
9,922,161 B2 3/2018 Kahng et al.
10,146,124 B2 12/2018 Li et al.
10,310,371 B2 6/2019 Ye et al.
10,444,629 B2 10/2019 Zable
10,520,830 B2 12/2019 Kicken et al.
10,534,257 B2 1/2020 Tetiker et al.
10,670,973 B2 6/2020 Zou et al.
10,678,142 B2 6/2020 Jheng et al.
11,243,473 B2 2/2022 Wang et al.
11,644,746 B1 5/2023 Xiao et al.
2002/0091986 A1 7/2002 Ferguson et al.
2003/0005390 A1 1/2003 Takashima et al.
2003/0044692 A1 3/2003 Liu et al.
2004/0015794 A1 1/2004 Kotani et al.
2004/0057610 A1 3/2004 Filseth et al.
2004/0088149 A1 5/2004 Cobb
2004/0210863 A1 10/2004 Culp et al.
2005/0076321 A1 4/2005 Smith
2005/0100802 A1 5/2005 Callan et al.
2005/0132306 A1 6/2005 Smith et al.
2005/0138594 A1 6/2005 Sahouria et al.
2005/0138597 A1 6/2005 Aleshin et al.
2005/0149902 A1 7/2005 Shi et al.
2005/0251771 A1 11/2005 Robles
2006/0073686 A1 4/2006 Zach et al.
2006/0190911 A1 8/2006 Stivers
2006/0242618 A1 10/2006 Wang et al.
2006/0248495 A1 11/2006 Sezginer
2007/0011648 A1 1/2007 Abrams
2007/0031745 A1 2/2007 Ye et al.
2007/0032896 A1 2/2007 Ye et al.
2007/0037394 A1 2/2007 Su et al.
2007/0050749 A1 3/2007 Ye et al.
2007/0124708 A1 5/2007 Torres Robles et al.
2007/0130557 A1 6/2007 Luk-Pat et al.
2007/0130559 A1 6/2007 Torunoglu et al.
2007/0143234 A1 6/2007 Huang et al.
2007/0184357 A1 8/2007 Abrams et al.
2007/0186206 A1 8/2007 Abrams et al.
2007/0198963 A1 8/2007 Granik et al.
2007/0220476 A1* 9/2007 Mukherjee ................ G03F 1/36 716/55
2007/0230770 A1 10/2007 Kulkarni et al.
2008/0077907 A1 3/2008 Kulkami
2008/0109766 A1 5/2008 Song et al.
2008/0141211 A1 6/2008 Bruce et al.
2009/0037852 A1* 2/2009 Kobayashi ............ G06F 30/398 716/132
2009/0075183 A1 3/2009 Cecil
2009/0077527 A1 3/2009 Gergov et al.
2009/0148779 A1 6/2009 Baidya et al.
2009/0193369 A1 7/2009 Chan et al.
2009/0241077 A1 9/2009 Lippincott et al.
2009/0245618 A1 10/2009 Torunoglu et al.
2009/0307649 A1 12/2009 Pramanik et al.
2010/0153903 A1 6/2010 Inoue et al.
2010/0280812 A1 11/2010 Zhang
2011/0004856 A1 1/2011 Granik et al.
2011/0022994 A1 1/2011 Hu et al.
2011/0049635 A1 3/2011 Carlson
2011/0061030 A1 3/2011 Mansfield et al.
2011/0089345 A1 4/2011 Komagata et al.
2011/0219342 A1 9/2011 Socha
2011/0239169 A1 9/2011 Tirapu-Azpiroz et al.
2012/0017183 A1 1/2012 Ye et al.
2012/0066651 A1 3/2012 Pang et al.
2012/0094219 A1 4/2012 Fujimura et al.
2012/0151422 A1 6/2012 White et al.
2013/0152026 A1 6/2013 Peng et al.
2013/0159943 A1 6/2013 Agarwal et al.
2013/0283216 A1 10/2013 Pearman et al.
2013/0283218 A1 10/2013 Fujimura et al.
2014/0123082 A1 5/2014 Akhssay
2014/0129996 A1 5/2014 Fujimura et al.
2014/0272676 A1 9/2014 Satake et al.

(56) References Cited

U.S. PATENT DOCUMENTS

| | | | | |
|---|---|---|---|---|
| 2014/0282290 | A1* | 9/2014 | Rieger | G03F 1/70 716/51 |
| 2015/0169820 | A1* | 6/2015 | Wang | G03F 1/36 716/53 |
| 2015/0302134 | A1 | 10/2015 | Berkens | |
| 2016/0026750 | A1 | 1/2016 | Liu | |
| 2016/0042111 | A1 | 2/2016 | Chang | |
| 2016/0162621 | A1* | 6/2016 | Hamouda | G03F 7/70433 716/130 |
| 2016/0239601 | A1 | 8/2016 | Morisaki et al. | |
| 2016/0253450 | A1 | 9/2016 | Kandel et al. | |
| 2016/0283631 | A1 | 9/2016 | Lin et al. | |
| 2017/0061044 | A1* | 3/2017 | Ning | G03F 1/36 |
| 2017/0357911 | A1 | 12/2017 | Liu et al. | |
| 2018/0120709 | A1 | 5/2018 | Hsu et al. | |
| 2018/0247008 | A1* | 8/2018 | Hamouda | G03F 1/36 |
| 2018/0314148 | A1* | 11/2018 | Tetiker | G03F 1/70 |
| 2019/0072846 | A1 | 3/2019 | Lin et al. | |
| 2019/0094680 | A1* | 3/2019 | Huang | G03F 1/36 |
| 2019/0094710 | A1 | 3/2019 | Wang et al. | |
| 2019/0137889 | A1 | 5/2019 | Tel et al. | |
| 2019/0146455 | A1 | 5/2019 | Beylkin et al. | |
| 2019/0147134 | A1 | 5/2019 | Wang et al. | |
| 2019/0188356 | A1 | 6/2019 | Zhang et al. | |
| 2019/0197213 | A1 | 6/2019 | Ungar | |
| 2019/0206041 | A1 | 7/2019 | Fang et al. | |
| 2019/0346768 | A1 | 11/2019 | Huang et al. | |
| 2019/0354006 | A1* | 11/2019 | Hu | G06F 30/392 |
| 2019/0392106 | A1 | 12/2019 | Northrop et al. | |
| 2020/0006102 | A1 | 1/2020 | Lin et al. | |
| 2020/0051781 | A1 | 2/2020 | Fujimura et al. | |
| 2020/0065453 | A1 | 2/2020 | Kim et al. | |
| 2020/0133117 | A1 | 4/2020 | Chu et al. | |
| 2020/0184137 | A1 | 6/2020 | Tsutsui et al. | |
| 2020/0326632 | A1 | 10/2020 | Fang et al. | |
| 2020/0380362 | A1 | 12/2020 | Cao et al. | |
| 2021/0048741 | A1 | 2/2021 | Lugg et al. | |
| 2021/0048753 | A1 | 2/2021 | Zhang et al. | |
| 2021/0072635 | A1* | 3/2021 | Ma | G03F 7/705 |
| 2021/0141988 | A1 | 5/2021 | Ungar et al. | |
| 2021/0149312 | A1 | 5/2021 | Tel et al. | |
| 2021/0181620 | A1 | 6/2021 | Poonawala et al. | |
| 2021/0216697 | A1 | 7/2021 | Brink et al. | |
| 2021/0232748 | A1 | 7/2021 | Hsu et al. | |
| 2021/0357571 | A1 | 11/2021 | Tien et al. | |
| 2021/0397172 | A1 | 12/2021 | Slachter et al. | |
| 2022/0035237 | A1 | 2/2022 | Lee et al. | |
| 2022/0050381 | A1 | 2/2022 | Biswas et al. | |
| 2022/0128899 | A1 | 4/2022 | Fujimura et al. | |
| 2022/0138381 | A1* | 5/2022 | Yamane | G06F 30/367 716/110 |
| 2022/0187713 | A1 | 6/2022 | Middlebrooks et al. | |
| 2023/0092665 | A1 | 3/2023 | Fujimura et al. | |
| 2023/0107556 | A1 | 4/2023 | Tao et al. | |
| 2023/0168590 | A1* | 6/2023 | Sin | G03F 1/36 716/53 |
| 2023/0168660 | A1 | 6/2023 | Oriordan et al. | |
| 2023/0229840 | A1 | 7/2023 | Oriordan et al. | |
| 2023/0280646 | A1 | 9/2023 | Kim et al. | |
| 2023/0280659 | A1 | 9/2023 | Fu | |
| 2023/0289509 | A1 | 9/2023 | Kunigal et al. | |
| 2024/0220702 | A1* | 7/2024 | Thulasi | G06F 30/3953 |
| 2024/0288764 | A1 | 8/2024 | Hamouda | |
| 2024/0334611 | A1* | 10/2024 | Thulasi | G06F 30/398 |
| 2025/0005255 | A1* | 1/2025 | Chang | G06F 30/398 |
| 2025/0068051 | A1 | 2/2025 | Oriordan et al. | |
| 2025/0068052 | A1 | 2/2025 | Oriordan et al. | |
| 2025/0068053 | A1 | 2/2025 | Oriordan et al. | |
| 2025/0068056 | A1 | 2/2025 | Oriordan et al. | |
| 2025/0068058 | A1 | 2/2025 | Oriordan et al. | |
| 2025/0102899 | A1 | 3/2025 | Oriordan et al. | |
| 2025/0348641 | A1 | 11/2025 | Hamouda | |

FOREIGN PATENT DOCUMENTS

| | | | |
|---|---|---|---|
| JP | 2012181298 | A | 9/2012 |
| JP | 2019114295 | A | 7/2019 |
| WO | 2018125220 | A1 | 7/2018 |
| WO | 2020156777 | A1 | 8/2020 |
| WO | 2020193095 | A1 | 10/2020 |
| WO | 2021041963 | A1 | 3/2021 |
| WO | 2021043936 | A1 | 3/2021 |
| WO | 2025043234 | A2 | 2/2025 |

OTHER PUBLICATIONS

Elsemary, Ahmed Mounir, et al., "Litho Friendly via insertion with In-Design Auto-Fix flow using Machine Learning" Proceedings of SPIE, vol. 10588, Design-Process-Technology Co-optimization for Manufacturability XII, Apr. 4, 2018, 11 pages, SPIE, San Jose, California.

Kareem, Pervaiz, et. al., "Fast Prediction of Process Variation Band through Machine Learning Models," Optical Microlithography XXXIV, Feb. 2021, vol. 11613, 8 pages, Proceedings of SPIE—The International Society for Optical Engineering.

Liu, Yong, et al., "Inverse Lithography Technology Principles in Practice: Unintuitive Patterns" Proceedings SPIE 5992, 25th Annual BACUS Symposium on Photomask Technology, Nov. 8, 2005, 8 pages, SPIE.

Ma, Yuzhe, et al., "Methodologies for Layout Decomposition and Mask Optimization: A Systematic Review," Proceedings of the IFIP/IEEE International Conference on Very Large Scale Integration, Oct. 23-25, 2017, United Arab Emirates, 6 pages, IEEE.

Shao, Dongbing, et al., "Incorporating Process Variation Contours in Design Rule Calculation and SRAM Design Optimization", Proceedings of SPIE, vol. 10962, Design-Process-Technology Co-optimization for Manufacturability XIII, Mar. 20, 2019, 7 pages, SPIE, San Jose, California.

Shao, Hao-Chiang, et. al., "From IC Layout to Die Photograph: A CNN-Based Data-Driven Approach" IEEE Transactions on Computer-Aided Design of Integrated Circuits and Systems, vol. 40, No. 5, May 2021, pp. 957-970, IEEE.

Author Unknown, "Boolean operations on polygons," Wikipedia, Oct. 12, 2019, 3 pages, Wikipedia.com.

Author Unknown, "D2S Enables "Stitchless" Full-Chip Inverse Lithography Technology in a Single Day for the Multi-Beam Era," Press Release, Sep. 16, 2019, 3 pages, D2S, Inc., San Jose, California, USA.

Author Unknown, "D2S Unveils Industry's First Mask-Wafer Double Simulation Platform," Press Release, Sep. 20, 2011, 3 pages, D2S, Inc., San Jose, California, USA.

Author Unknown, "Jaccard index," Wikipedia, Sep. 6, 2020, 9 pages, Wikipedia.com.

Author Unknown, "Optical proximity correction," Wikipedia, Apr. 28, 2019, 5 pages, Wikipedia.com.

Author Unknown, "Rasterisation," Wikipedia, Aug. 21, 2020, 4 pages, Wikipedia.com.

Author Unknown, "TrueMask® DS," Exact Date Unknown but Before May 2020, 3 pages, D2S, Inc., retrieved from https://design2silicon.com/products/truemask-ds/.

Author Unknown, "TrueMask® ILT Backgrounder Stitchless Full-Chip ILT in a Day," Backgrounder, Sep. 2019, 6 pages, D2S, Inc., San Jose, California, USA.

Author Unknown, "TrueMask® ILT," Exact Date Unknown but Before May 2020, 7 pages, D2S, Inc., retrieved from https://design2silicon.com/products/truemask-ilt/.

Author Unknown, "Design for Manufacturing (DFM)," Mar. 22, 2023, 5 pages, Semiconductor Engineering, retrieved from https://web.archive.org/web/20230322153514/https://semiengineering.com/knowledge_centers/eda-design/methodologies-and-flows/design-for-manufacturing-dfm/.

Cecil, Thomas, et al., "Establishing Fast, Practical, Full-Chip ILT Flows Using Machine Learning," SPIE Proceedings 11327, Optical Microlithography XXXIII, Mar. 23, 2020, 19 pages, vol. 1132706, SPIE, San Jose, California, USA.

(56) References Cited

OTHER PUBLICATIONS

Chen, Kun-Yuan, et al., "Full-Chip Application of Machine Learning SRAFs on DRAM Case Using Auto Pattern Selection," SPIE Proceedings 10961, Optical Microlithography XXXII, Oct. 10, 2019, 13 pages, vol. 1096108, SPIE, San Jose, California, USA.
Chen, Tai-Chen, "Multilevel Full-Chip Gridless Routing With Applications to Optical-Proximity Correction," Jun. 2007, 13 pages, IEEE, retrieved from http://cc.ee.ntu.edu.tw/~ywchang/Papers/tcad07-mgr.pdf.
Dillinger, Tom, "Inverse Lithography Technology—A Status Update from TSMC," SemiWiki, Jun. 2, 2022, retrieved from https://semiwiki.com/semiconductor-manufacturers/tsmc/313540-inverse-lithography-technology-a-status-update/.
Feng, Yaobin, et al., "Freeform Mask Optimization Using Advanced Image based M3D Inverse Lithography and 3D-NAND Full Chip OPC Application," SPIE Proceedings 10587, Optical Microlithography XXXI, Mar. 20, 2018, 11 pages, vol. 105870G, SPIE, San Jose, California, USA.
Jia, Ningning, et al., "Machine Learning for Inverse Lithography: using stochastic gradient descent for robust photomask synthesis," Journal of Optics, Apr. 1, 2010, 9 pages, vol. 12, IOP Publishing, retrieved from https://www.eee.hku.hk/optima/pub/journal/1004_JO.pdf.
Jiang, Bentian et al., "Neural-ILT: Migrating ILT to Neural Networks for Mask Printability and Complexity Cooptimization," International Conference on Computer-Aided Design, Nov. 2020 (ICCAD '20), 9 pages, Association for Computing Machinery.
Kwan, Joe, et al., "Applying Machine Learning Techniques to Accelerate Advanced Process Yield Ramp," Jan. 5, 2021, 29 pages, Siemens Digital Industries Software, Munich, Germany.
Lee, Kuang-Yao, et al., "Post-Routing Redundant via Insertion for Yield/Reliability Improvement," ASP-DAC 2006: 11th Asia and South Pacific Design Automation Conference, Jan. 24-27, 2006, 6 pages, IEEE, Yokohama, Japan.
Lin, Yibo, et al., "Machine Learning for Yield Learning and Optimization," 2018 IEEE International Test Conference (ITC), Oct. 29-Nov. 1, 2018, 10 pages, IEEE, Phoenix, AZ, USA.
Liu, Peng, "Mask Synthesis Using Machine Learning Software and Hardware Platforms," SPIE Proceedings 11327, Optical Microlithography XXXIII, Mar. 23, 2020, 17 pages, vol. 1132707, SPIE, San Jose, California, USA.
Pang, Linyong (Leo), et al., "Study of Mask and Wafer Co-design That Utilizes a New Extreme SIMD Approach to Computing in Memory Manufacturing: Full-Chip Curvilinear ILT in a Day," SPIE Proceedings 11148, Photomask Technology 2019, Oct. 3, 2019, 16 pages, vol. 111480U, SPIE, retrieved from https://design2silicon.com/wp-content/uploads/2019/11/2019-BACUS-Full-Chip-Curvilinear-ILT-091219s-003.pdf.
Pang, Linyong, "Inverse Lithography Technology: 30 years from concept to practical, full-chip reality," Journal of Micro/Nanopatterning, Materials, and Metrology, Aug. 31, 2021, 49 pages, vol. 20(3), SPIE, retrieved from https://www.spiedigitallibrary.org/journals/journal-of-micro-nanopatterning-materials-and-metrology/volume-20/issue-03/030901/Inverse-lithography-technology--30-years-from-concept-to-practical/10.1117/1.JMM.20.3.030901.full.
Pang, Linyong, et al., "How GPU-Accelerated Simulation Enables Applied Deep Learning for Masks and Wafers," Photomask Japan 2019: XXVI Symposium on Photomask and Next-Generation Lithography Mask Technology, Apr. 16-18, 2019, 10 pages, SPIE, Yokohama, Japan.
Pang, Linyong, et al., "Making Digital Twins using the Deep Learning Kit (DLK)," Photomask Technology 2019, Sep. 15-19, 2019, 13 pages, SPIE, Monterey, California, USA.
PCT International Search Report and Written Opinion of Commonly Owned International Patent Application PCT/US2024/043770, mailing date Nov. 13, 2024, 13 pages, International Searching Authority (US).
Pearman, Ryan, et. al., "Adopting curvilinear shapes for production ILT: challenges and opportunities," Photomask Technology 2019, Oct. 10, 2019, 14 pages, SPIE, retrieved from https://design2silicon.com/wp-content/uploads/2019/11/Manuscript_Pearman_Bacus_2019-v4final.no-comments.pdf.
Ren, Haoxing (Mark), "Machine Learning and Deep Learning Applications in Design Automation and Practical Issues," DAC '19: 56th Annual Design Automation Conference 2019, Jun. 2-6, 2019, 55 pages, Association for Computing Machinery, Las Vegas, Nevada, USA.
Shi, Xuelong, et al., "Physics based feature Vector Design: a Critical Step Towards Machine Learning based Inverse Lithography," SPIE Proceedings 11327, Optical Microlithography XXXIII, Mar. 23, 2020, 8 pages, vol. 113270A, SPIE, San Jose, California, USA.
Sole, Marc Pons, "Layout Regularity for Design and Manufacturability," Doctoral Thesis, Jul. 8, 2012, 185 pages, Technical University of Catalonia, Barcelona, Spain.
Sundareswaran, Savithri, et al., "A Sensitivity-aware Methodology to Improve Cell Layouts for DFM Guidelines," 5 pgs., 12th Int'l Symposium on Quality Electronic Design, Mar. 14-16, 2011, Santa Clara, CA.
Teig, Steven L., "The X architecture: not your father's diagonal wiring," SLIP '02: Proceedings of the 2002 international workshop on System-level interconnect prediction, Apr. 6, 2002, 5 pages, ACM, retrieved from https://dl.acm.org/doi/10.1145/505348.505355.
Tripathi, Vikas, et. al., "Context-Aware DFM Rule Analysis and Scoring Using Machine Learning," Aug. 16, 2018, 9 pages, retrieved from https://arxiv.org/pdf/1808.05999.
Tripathi, Vikas, et al., "In-design DFM rule scoring and fixing method using ICV," Synopsys User Group Penang (SNUG), May 25, 2018, 16 pages, retrieved from https://arxiv.org/pdf/1805.10016.
Wang, Shibing, et al., "Efficient Full-Chip SRAF Placement Using Machine Learning for Best Accuracy and Improved Consistency," SPIE Proceedings 10587, Optical Microlithography XXXI, Mar. 20, 2018, 10 pages, vol. 105870N, SPIE, San Jose, California, USA.
Wang, Shibing, et al., "Machine Learning Assisted SRAF Placement for Full Chip," SPIE Proceedings 10451, Photomask Technology 2017, Oct. 16, 2017, 8 pages, vol. 104510D, SPIE, Monterey, California, USA.
Ye, Wei, et al., "LithoGAN: End-to-End Lithography Modeling with Generative Adversarial Networks," Design Automation Conference, Jun. 2019 (DAC '19), 6 pages, Association for Computing Machinery.
Pang, Linyong, et al., "TrueMask ILT MWCO: Full-Chip Curvilinear ILT in a Day, and Full Mask Multi-Beam and VSB Writing in 12 Hours for 193i", Optical Microlithography XXXIII, Proc. of SPIE vol. 11327, Mar. 2020, 14 pages, SPIE, Monterey, California, USA.

* cited by examiner

CONCURRENT MASK OPTIMIZATION FOR MULTIPLE LAYERS

BACKGROUND

In lithography, optical proximity and process bias/effects need to be corrected, and variation across manufacturing conditions needs to be minimized to achieve an optimal wafer print. Historically, efforts to correct for these effects started with a simple bias, adding a hammer head in line-ends to prevent line-end shortening. This first-generation correction is called rule-based optical proximity correction (OPC). Then, as chip feature sizes continued to shrink, OPC became more complicated and evolved to a model-based approach. Some extra patterns were added to masks, to improve the wafer process window, a measure of resilience to manufacturing variation. Around this time, the concept of inverse lithography technology (ILT) was introduced. ILT is a type of mask layout optimization that is a mathematically rigorous inverse approach to determine mask shapes that will produce the desired on-wafer results. ILT has been explored and developed over the last three decades as the next generation of OPC, providing a solution to several challenges of advanced-node lithography, whether optical or extreme ultraviolet (EUV). Today, both OPC and ILT are part of an arsenal of lithography technologies called resolution enhancement technologies.

Given a known forward transformation from mask layouts to images (representing a wafer) for a specified lithography process, mask layout optimization (e.g., ILT) computes an optimized mask image that produces the desired wafer target with best pattern fidelity and/or the largest process window. The optimized solution of mask layout optimization may not be limited to simple heuristic modifications of the target mask layout. More specifically, the mask layout optimization explores solutions to the optimization that are very different from the original mask layout. To perform mask layout optimization, some approaches define the following mathematical functions and operators:

Mask image function: $\psi$

Target mask image pattern: $\Phi$

Forward operator: f

Wafer image pattern: $\omega$

The forward operator includes a set of wafer simulation operations to convert a mask pixel image to a wafer image (e.g., electromagnetics of the three-dimensional (3D) mask image, optics of illumination and the projection lens, behavior of the photoresist, dose and focus conditions, aberrations, etc.). Thus, $$\omega = f(\psi), \text{ and} \tag{1}$$

$$\psi^* = f^{-1}(\Phi) \tag{2}$$

where $\psi^*$ is an optimal mask image function. However, because the forward operator f is many-to-one (i.e., many different mask images will produce identical wafer images), Equation 1 has no well-defined inverse. Moreover, for typical target mask image patterns $\Phi$ (e.g., a drawn layout with Manhattan geometry and sharp corners), there is no mask image function $\psi$ for which $\Phi=f(\psi)$. These issues may be addressed by recasting the inverse problem as an optimization problem to find the best solution to a problem from a set of possible options, given its desired outcome and constraints.

Optimization seeks to find a solution as close to optimal as possible within the constraints of a reasonable computational time. A merit function (also referred to as a loss function, cost function, energy function, or Hamiltonian (by analogy to quantum mechanics, where it would be an operator corresponding to the total energy of a system)) is defined and labeled H (w). This function indicates the quality of the solution, (i.e., how well a mask image produces a simulated wafer image as close enough to a target wafer image as possible). A traditional example of such a loss function is:

$$H = \int\int |f(\psi) - \phi|. \tag{3}$$

This loss function is the absolute value of the difference between the wafer image and the target wafer image, integrated over the area of the region of the wafer image. A variety of constraints may be imposed by the realities of mask manufacturing. For example, two disjoint chrome regions are separated by a minimum distance, and a chrome line has a minimum width. These constraints can be addressed by defining a subspace of the full solution space of mask image functions and restricting the solution to this subspace. However, even with such restrictions, pattern-dependent heuristics and the ability to broadly explore wide areas of the solution space is not currently included in mask layout optimization. This means that traditional mask layout optimization frequently leads to mask layouts that are unanticipated by a knowledgeable lithographer. One example is the problem of placement of sub-resolution assist features (SRAFs). Before mask layout optimization, SRAFs were placed empirically, with great care, and frozen in place during the computation of the rest of the mask images of the mask layout. Contrarily, mask layout optimization determines optimal SRAFs simultaneously with the rest of the mask layout.

Current mask image optimization approaches are based on local search heuristics that find a solution close to a local minimum, even if it may not be globally optimal. Additionally, because there are several solutions that are nearly optimal, a solution may be selected to output for the optimization from a set of multiple solutions. Typically, once all constraints are considered such that the features are bigger than a certain size to meet mask manufacturing requirements, the largest depth of focus (DoF) is wanted, and the SRAFs cannot cause a stray pattern to print on wafer, solutions in mask layout optimization that meet the constraints are unique.

Typically, traditional mask image optimization approaches optimize a cost function similar to the loss function H shown above (Equation 3). In some cases, mask image optimization simplifies its calculation by making certain approximations or reducing the number of variables. For instance, FIG. 1 illustrates an example of a mask image, simulated wafer contour and its target, cost function, and cost gradient at the beginning of an optimization. It is clear that the wafer contour does not hit the wafer target, the cost function is not zero, and the cost gradient is not flat. FIG. 2 illustrates a mask image, simulated wafer contour and its target, cost function, and cost gradient at the end of an optimization. Now, the simulated wafer contour hits the wafer target, the cost function approaches zero, and the gradient of the cost function is flat.

BRIEF SUMMARY

Some embodiments provide a method for optimizing mask layouts for producing masks for manufacturing an integrated circuit (IC) by defining multiple layers of IC components on a substrate. To optimize a mask layout with multiple sets of mask images corresponding to multiple different layers of the IC, the method iteratively (i) generates simulated wafer images of one of the layers using the mask images for that layer and (ii) modifies the set of mask images for the layer to improve the locations and shapes of the manufactured IC components of the layer based on the simulated wafer image for that layer while accounting for the components of at least one other layer of the IC (e.g., by comparing the shapes of the layer being optimized to shapes in one or more other layers). That is, the mask optimization process for a given layer accounts for not only the predicted manufactured shapes of that layer but also how those predicted manufactured shapes relate to shapes (e.g., predicted manufactured shapes) of other layers (e.g., the relation of predicted manufactured shapes for interconnect wire segments in metal layers to the predicted manufactured shapes for vias that are intended to connect those interconnect wire segments to IC components in other metal layers).

To perform the mask optimization (e.g., as part of the mask production operation in the overall electronic design automation (EDA) process), some embodiments perform an iterative optimization process for each layer. A mask production tool initially generates a mask layout having multiple mask images for each layer of a completed design layout (i.e., that specifies the intended design of the manufactured IC). The mask layout defines a set of masks that will be fabricated and used to manufacture the IC by shining light through the transparent areas of the mask onto a substrate that is coated with photoresist. The chemical structure of the photoresist is such that the material becomes either easier or more difficult to remove (depending on whether positive or negative photoresist is used), such that when additional steps (e.g., photoresist development, etching) are applied the desired pattern remains on the substrate.

The iterative optimization process simulates the shapes that will be manufactured for a layer using the masks to generate one or more simulated wafer images. Some embodiments generate a single simulated wafer image, while other embodiments generate multiple wafer images to account for various manufacturing process errors. These manufacturing process errors can include misalignment (in which one layer is shifted slightly relative to other layers due to various issues that can occur during the manufacturing of the masks and/or wafers) as well as process variation errors that can result in different sizes (and slightly different shapes) for the manufactured components. These process variations may be due to, e.g., the depth of focus and/or exposure strength used when shining light through the mask during the wafer production process, or to the dosage used during the mask-making process.

These simulations may be performed using lithographic simulation (i.e., simulation of the various manufacturing steps) or using a machine-trained network (e.g., a neural network) that reproduces the effects of this simulation. Once the simulated wafer image is generated, this simulated wafer image can be compared to a target (ideal predicted) wafer image that is based on the design layout. In some embodiments, the target wafer image may reproduce the design layout but also introduce rounded corners and similar curvilinear features (true straight lines and sharp angles may not be realistically manufacturable at high resolution) using, e.g., Gaussian convolution, low-pass filtering, etc.

In addition to comparing the simulated wafer image to the target wafer image and attempting to modify the mask images such that the simulated wafer image matches the target wafer image, some embodiments incorporate consideration of multi-layer interfaces that span the layer being optimized (i.e., that include IC components in both that layer and another layer and that necessitate adequate overlap of those individual layer components) into the optimization process. That is, not only are the mask images modified to decrease the differences between the simulated and target wafer images, but also to ensure the resiliency of the overlaps between these IC components in different layers to various manufacturing process variations.

Some embodiments perform this optimization as a gradient descent problem. Some such embodiments use a loss function with a first single layer term that applies costs to differences between the simulated and target wafer images and a multi-layer aware term that applies costs based on the resiliency of multi-layer overlaps. Other embodiments use a loss function with a single layer term that has individual components weighted based on the importance of different regions to one or more MLIs. The gradient of the loss function with respect to the mask image shapes (or mask image pixels) determines how to modify these mask image shapes each iteration of the optimization process.

Various different techniques may be used in different embodiments to account for other layers of the IC when optimizing the mask images. For instance, some embodiments only compare the simulated wafer image for the primary layer (the layer being optimized) to the target image for that primary layer while accounting for MLIs with other layers. Other embodiments not only compare the simulated wafer image and target image for the primary layer but also compare the simulated wafer image for the primary layer to the images for other layers. The images for the other layers may be simulated images for those other layers based on the mask layouts for those other layers (i.e., one or more simulated images for each other layer) or idealized images (e.g., based on the design layout for those other layers).

Different embodiments also perform different types of comparisons. For instance, when comparing simulated and target wafer images for the primary layer, some embodiments determine the similarity and/or difference between the two images. Specifically, some embodiments try to match the contours of the simulated wafer image to the contours of the target wafer image. When comparing a shape in the simulated wafer image for the primary layer with a shape in an image for a neighboring layer, some embodiments determine an intersection (e.g., an area of intersection) between the primary layer shape and the neighboring layer shape. Some embodiments determine a correlation between these two shapes (e.g., with the goal of the optimization being to increase this correlation. Some embodiments determine the similarity and/or difference between the two shapes when making the comparison between shapes on different layers.

In performing the optimization for a primary layer while accounting for other layers via the presence of MLIs, some embodiments treat regions of overlap differently from regions of non-overlap. That is, regions of a primary layer shape that relate to an MLI are treated differently during the optimization than regions of the same primary layer shape that do not affect the MLI. For instance, some embodiments optimize the masks in order to produce primary layer components that have the largest area of overlap with their corresponding components in other layers. Other embodiments identify the regions of overlap and are stricter in ensuring that these regions match more closely with the target wafer image than non-overlapping regions.

In addition, some embodiments differentiate between the importance of different portions of a shape within an overlapping region. Some embodiments identify certain points along a shape within the region of overlap as more critical than other points within that region of overlap. For example, in the case of a via located in the corner of a bent wire segment, the edges of the via that run along the edges of the wire segment can be considered more critical than the edges that run along the interior of the wire segment.

As mentioned, some embodiments use a loss function term that compares the simulated image for the primary layer to the target image for that layer while accounting for the overlaps with other layers. Specifically, rather than treat all of the differences between the simulated image and the target image equally, some embodiments weight different portions of the simulated wafer shapes more heavily based on their relevance to MLIs. In some embodiments, sections along each contour (e.g., each pixel or a subset of the pixels) is assigned a weight value, which weights the cost incurred based on that section being different from the target image. The overlapping regions are assigned higher weight values than the non-overlapping regions, and within an overlap more critical regions are assigned higher weight values than less critical regions. The loss function therefore weights differences in the more critical regions the highest, and thus the optimization process is biased towards solutions (i.e., mask images) that focus most on aligning the most critical regions with the target image.

Other embodiments use both a loss function term that compares the simulated image for the primary layer to the target image along with an additional loss function term that accounts for the MLIs. Different embodiments may apply different weights to the two loss function terms. In some such embodiments, all portions of the simulated wafer shapes are treated equally in the first (single layer) loss function term. Different embodiments use different techniques to compute the additional (multi-layer aware) loss function term, which involve comparing the shapes of components on the primary layer with the shapes of components on other layers.

For instance, for a given MLI that includes a shape in the primary layer and a shape in another layer, some embodiments compute the intersection of these shapes and define a cost for the MLI that is based on the area of this intersection (e.g., that is inversely proportional to the intersection). Some embodiments generate numerous simulated wafer images for the primary layer (and, in some cases, for the other layer) based on different possible misalignment and/or process variation errors. For at least a subset of these pairs of wafer images (i.e., one simulated wafer image of the primary layer and either a simulated or optimized wafer image of the other layer), the optimizer computes the intersection of the two shapes. Different embodiments either use the minimum of these intersections as the overlap area (representing a worst-case scenario), compute the logical intersection of all of the intersection areas as the overlap area (representing a highly unlikely but potentially even worse scenario), or compute the average area (representing an expected area), then determine the cost based on that computed area.

Other embodiments use a set of evaluation points for each shape in the primary layer that is part of an MLI. In this case, some embodiments weight the evaluation points based on whether the evaluation points are part of the overlap region of the shape and thus have an effect on the MLI. For those evaluation points that are within the overlap region, some embodiments designate points as more or less critical to the overlap (as in the approach described above that assigns weights for points in the comparison to the target image). Weights are assigned to the evaluation points based on these different categories, and the evaluation points for each shape are compared against the simulated wafer image of the appropriate neighboring layer. In some such embodiments, the optimization process evaluates whether each evaluation point is located on the correct side of the boundary of the shape in the other layer (e.g., on the interior or exterior of the shape). Some embodiments assign a cost to each evaluation point, with these costs then weighted (i.e., using the assigned weights).

Still other embodiments may use other, different techniques to compute the loss function term that accounts for the MLIs. For instance, some embodiments calculate tolerance regions for each primary layer component shape in the simulated region, which are used to constrain the boundaries of that primary layer shape (by assessing a cost for the primary layer shape extending outside the tolerance region). Some embodiments define the tolerance region for a given primary layer shape based on the location and shape of the shape in the other layer with which the primary layer shape forms an MLI (as well as the shape of the primary layer component). In this formulation, the primary layer shape can be anywhere within the boundaries of the tolerance region (although the location of the primary layer shape is still constrained based on the single-layer cost). Some such embodiments assess no cost for the primary layer shape being contained within the tolerance region, then assess additional cost based on the extent to which the primary layer shape extends outside of the tolerance region.

The above description relates to modifying one primary layer at a time while considering the relation of the shapes of that primary layer to other layers. These other layers may be optimized (e.g., using an initial single layer process that does not consider other layers) prior to the multi-layer aware optimization process in some embodiments. In other embodiments, multiple layers are optimized at once. In this case, rather than modifying a single layer of the mask layout each iteration, the optimization process modifies the mask images for multiple layers at once.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
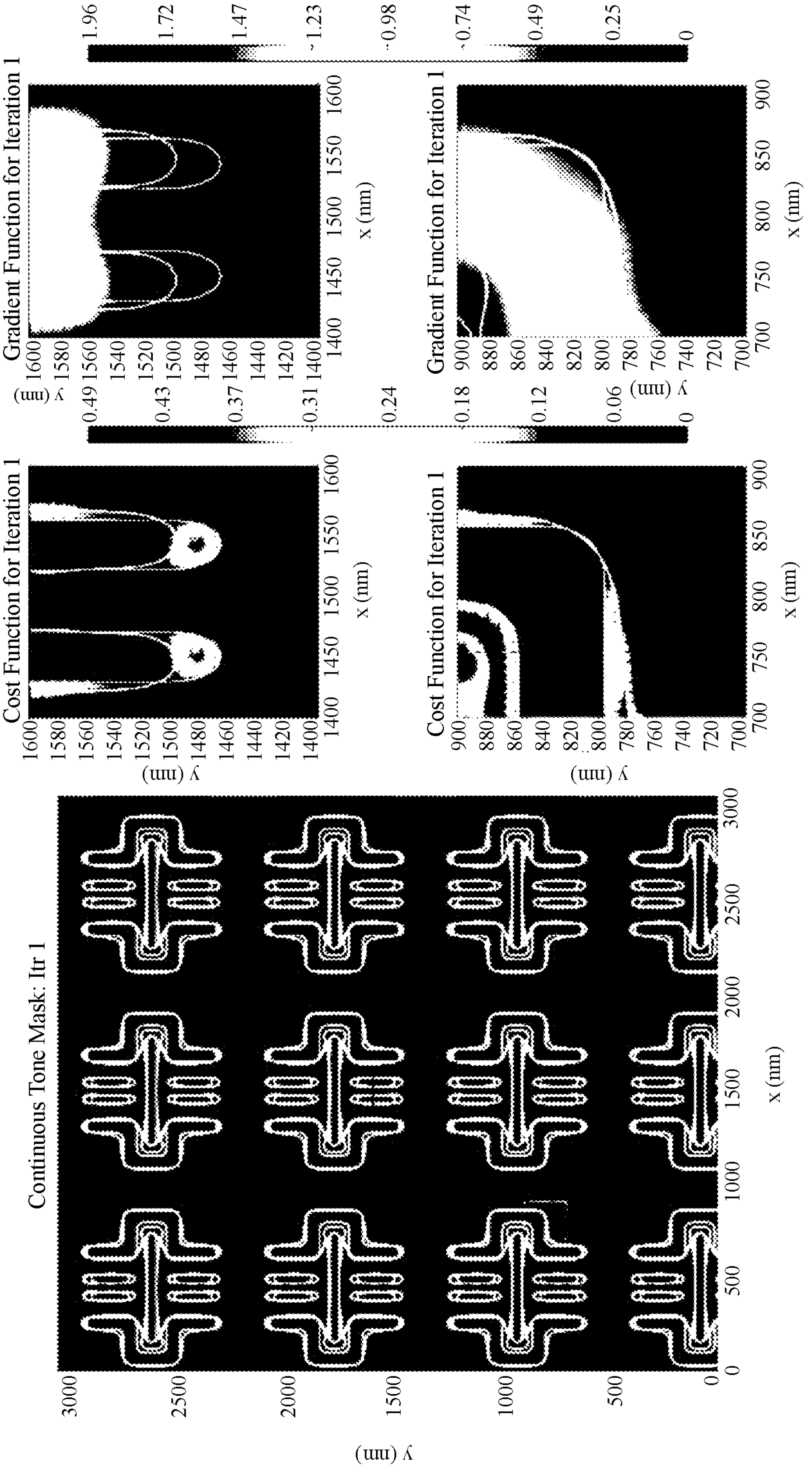
Figure 1 Prior Art
FIG. 1 illustrates an example of a mask image, its simulated wafer contour and its target, cost function, and cost gradient at the beginning of an optimization.
Figure 2:
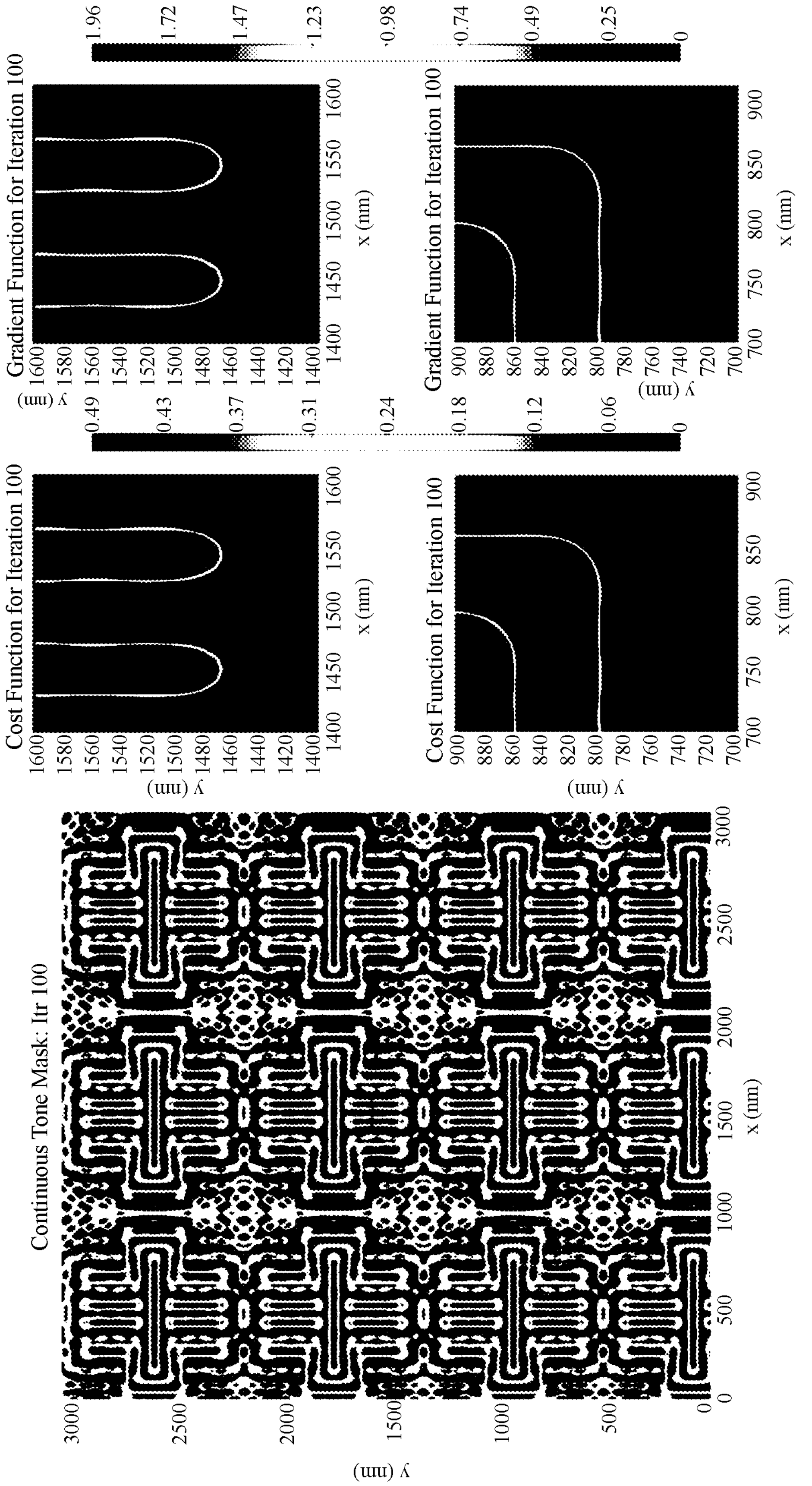
Figure 2 Prior Art
FIG. 2 illustrates a mask image, its simulated wafer contour and its target, cost function, and cost gradient at the end of an optimization.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for optimizing mask layouts for producing masks for manufacturing an integrated circuit (IC) by defining multiple layers of IC components on a substrate. To optimize a mask layout with multiple sets of mask images corresponding to multiple different layers of the IC, the method iteratively (i) generates simulated wafer images of one of the layers using the mask images for that layer and (ii) modifies the set of mask images for the layer to improve the locations and shapes of the manufactured IC components of the layer based on the simulated wafer image for that layer and a simulated wafer image for at least one other layer of the IC. That is, the mask optimization process for a given layer accounts for not only the predicted manufactured shapes of that layer but also how those predicted manufactured shapes relate to predicted manufactured shapes of other layers (e.g., the relation of predicted manufactured shapes for interconnect wire segments in metal layers to the predicted manufactured shapes for vias that are intended to connect those interconnect wire segments to IC components in other metal layers).

Before further describing the mask optimization operations of some embodiments, certain aspects of IC design and manufacturing will be described. An IC includes a set of several layers, typically manufactured on a substrate. These layers typically include the substrate layer itself (the base semiconductor layer of the IC), one or more device layers (in which transistors are located), one or more metal layers (also referred to as interconnect layers or wiring layers, which are layers through which metal interconnects traverse in a plane), and one or more intervening layers. The intervening, or dielectric layers, are spaced between the device and metal layers, and allow for z-axis connections (taking, e.g., the plane of the metal layers as being parallel to the x-y plane). These intervening layers include via layers between pairs of metal layers and contact layers between device layers and metal layers, with vias and contacts being two examples of z-axis connections that traverse between at least two layers of the IC.

The design of these layers is in some embodiments defined by a design layout for the IC. In some embodiments, a design layout includes a layout for each layer (e.g., each device layer, each wiring layer, and/or each via layer). For a given layer, the design layout defines the shapes of the components (e.g., the interconnect wiring segments, the vias, etc.) that are defined on that layer.

To manufacture the layers and their components based on the design layout, one or more photomasks (referred to herein as "masks") are created and used. A mask is an opaque plate with transparent areas that let in light through a defined pattern. The transparent areas of a mask are determined by a corresponding mask layout. In some embodiments, a mask layout has an overall mask image for each device or wiring layer. The overall mask image for each layer can be decomposed into one or more individual mask images, for instance through the use of a coloring technique that assigns one of several different colors to each shape in the overall mask image in order to assign the shape to the individual mask image of that color. Each mask image of each layer can be used to produce a mask that can then be used to fabricate the components of that layer.

That is, just as a design layout includes multiple design layers that correspond to eventually fabricated IC layers (also referred to herein as wafers), a mask layout includes multiple mask layers that correspond to eventually fabricated masks (which are themselves used to fabricate the IC layers). In some embodiments, each layer of a design layout corresponds to a layer of the mask layout, which can include one or more mask images.

Mask images define the mask layout in the geometric domain, and show the pattern of the transparent areas, including primary transparent areas that will fabricate components of the design and secondary transparent areas (e.g., SRAFs) that will aid in the fabrication of the components of the design (i.e., by letting more light shine through the mask). In some embodiments, the mask images are rasterized into mask pixel images, which define the mask layout in the pixel domain. It should be noted that, due to the nature of the mask-making process, the mask shapes (1) do not necessarily correspond 1:1 to the fabricated IC components (i.e., to the design layout shapes) and (2) cannot always be easily correlated to individual IC components (i.e., to design layout shapes) by human observation.

Figure 3:
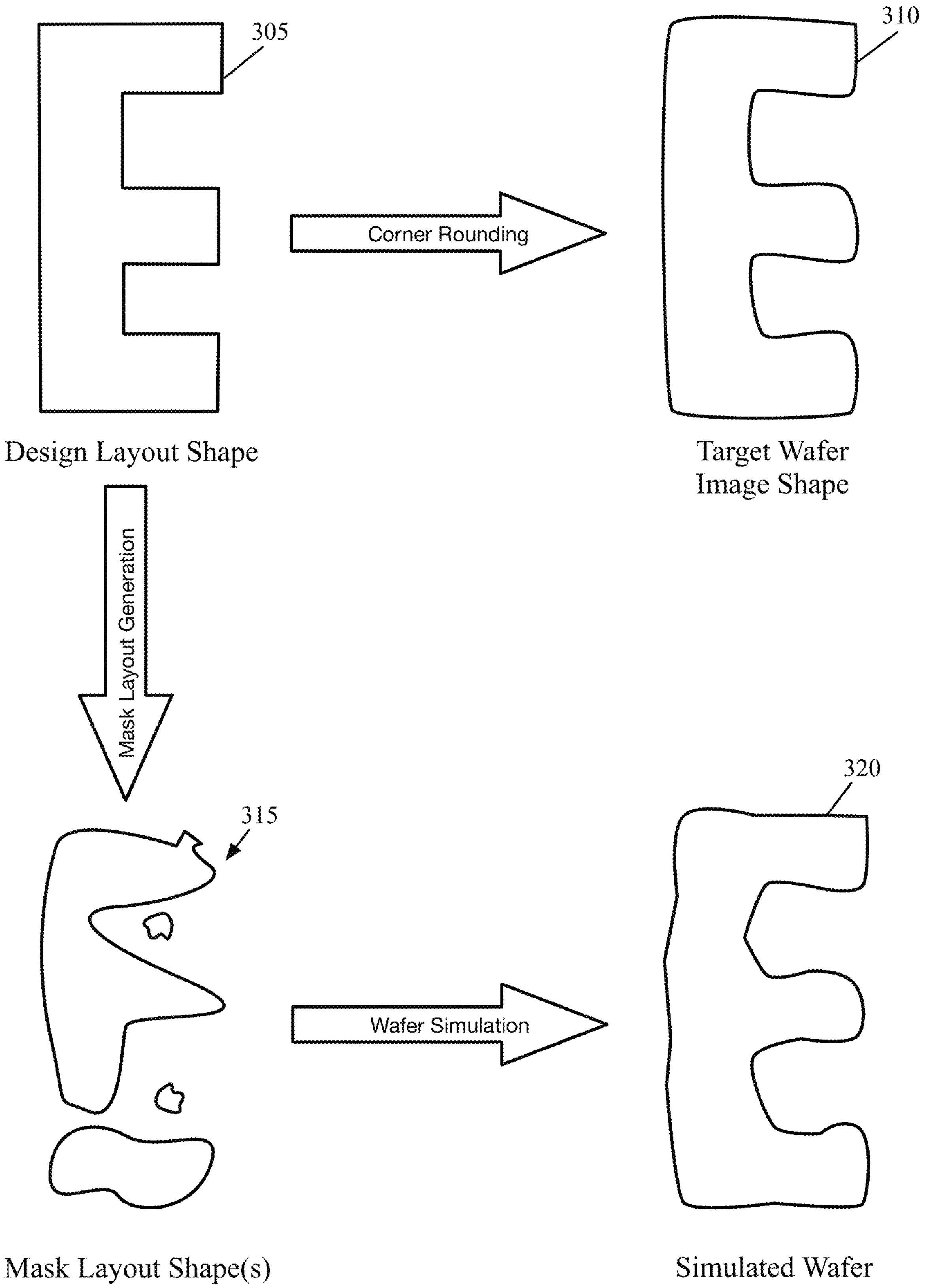
FIG. 3 conceptually illustrates different types of shapes that are described in this application.

FIG. 3 conceptually illustrates different types of shapes that are described in this application. These different types of shapes include design layout shapes 305, target wafer image shapes 310 (a type of predicted shape), mask layout shapes 315, and simulated wafer image shapes 320 (another type of predicted shape). The design layout shape 305 are shapes that are part of the actual design layout (e.g., that is output by the physical design process). In many cases, these shapes are rectilinear shapes (i.e., with straight lines, in some such cases only including straight lines at certain angles relative to each other). In other examples, the design layout shapes 305 may have curvilinear features (i.e., at least some of the contours of the shapes may be curved).

From each design layout shape 305, a target wafer image shape 310 can be generated. In some embodiments, this target wafer image shape 310 predicts the closest shape to the design layout shape 305 that can be physically manufactured. In some embodiments, at high resolution, the angled corners (e.g., right-angled corners of the design layout shapes 305) cannot physically be manufactured. To generate the target wafer image shapes 310, some embodiments may use various corner rounding algorithms (e.g., a low pass filter and/or Gaussian convolution). During mask optimization, these target wafer image shapes are used as the ideal outputs of a wafer simulation process.

Mask layout shapes 315 are also generated by a mask production process from the design layout shape (or from the target wafer image shape). In many cases, the mask layout shapes 315 do not closely resemble a specific design layout shape 305. In addition, as shown in this case, sometimes multiple separate shapes are used to fabricate a single IC component corresponding to a single design layout shape 305. Rather than being smooth-edged shapes, in certain cases various small features may be added to the mask layout shapes 315 to better fabricate the IC components. In some cases, very small shapes referred to as sub-resolution assist features (SRAFs) may be included in the mask layout. In addition, due to the nature of IC fabrication and the very small distances involved, mask layout shapes 315 that primarily are designed for the fabrication of one IC component can have an effect on the shape of other nearby IC components.

During the process of iterative mask optimization, the mask layout shapes 315) are iteratively modified in order to determine the shapes that will best result in manufactured components matching the design layout shapes 305 (or at least the target wafer image shapes 310). Part of this mask optimization process includes wafer simulation, in which various techniques are used to generate simulated wafer shapes 320 based on the current mask layout shapes. As described in more detail herein, the wafer simulation process may use lithographic simulation in some embodiments, which simulates the various lithographic operations used to fabricate an IC layer using a mask (e.g., optical exposure, photoresist development, and etching). Other embodiments use machine-trained networks (e.g., neural networks) to generate the simulated wafer shapes 320 from a mask layout. The goal of the iterative mask optimization is to arrive at mask layout shapes 315 that, when provided to the wafer simulation process, result in simulated wafer shapes 320 that match the target wafer shapes 310.

The masks generated through mask optimization are used to fabricate one or more layers of an IC. In some embodiments, one IC layer corresponds to a set of one or more masks of a mask layout such that the IC layer is fabricated using the set of masks. In some such embodiments, one mask is used to fabricate at least a portion of two or more layers. Mask simulation is the generation of a mask image (or a mask pixel image) in order to simulate the features of the corresponding mask when fabricated. Mask optimization is the modification of one or more mask images of a mask layout to arrive at a resulting mask layout that produces an optimized mask. In some embodiments, mask optimization is performed using wafer simulation, which will be described below.

A substrate is a type of base board used to package a bare IC chip. A wafer is an example of a substrate, and is a thin slice of semiconductor (e.g., silicon) material used for the fabrication of ICs. Light is shone through a mask (i.e., through the mask's transparent areas) onto a wafer to fabricate a layer of an IC on the wafer. In some embodiments, light is shone through multiple masks, one at a time, to fabricate a layer of an IC. This process involves the application of photoresist to the substrate, such that after the light is shone through the mask or masks for a layer, areas that received the light have different chemical properties than those that did not receive light. Wafer simulation is the generation of one or more wafer images (e.g., wafer pixel images, wafer contour images) based on one or more mask pixel images rasterized from mask images of a mask layout to simulate the as-manufactured shapes produced on the wafer when fabricated based on the mask layout.

Vias are small holes through one or more via layers to intersect with conductors on each of the adjacent metal layers (e.g., directly with the interconnect segments, or with via pads that connect to the interconnect segments). Vias are examples of z-axis components, specifically z-axis connections that traverse between at least two layers. Other examples of z-axis components are z-axis capacitors, in which metal components in two layers do not physically connect but instead form a capacitor.

In some embodiments, via holes are plated with metal (e.g., copper) to form an electrical connection through the insulating layers. Contact layers are similar to via layers, but connect metal (wiring/interconnect) layers to device layers rather than metal layers to other metal layers. That is, vias refer to z-axis components that connect interconnect lines (e.g., lines representing wires) on different metal layers and higher layer interconnect lines to circuit elements, while contacts refer to z-axis components that connect parts of circuit elements on the IC substrate with one or more lower metal layers (e.g., metal layer 1) to form circuit elements (e.g., to form transistors). Because vias and contacts connect parts of multiple layers together, it is important for the metal layer components to properly cover the entirety of the vias and contacts (i.e., it is important to have proper overlap for certain z-axis components).

When an IC is manufactured, in some embodiments, different layers of the IC can be misaligned (i.e., one wafer layer is misaligned relative to another wafer layer). For example, in some embodiments, a metal first layer is manufactured, and a via second layer is manufactured on top of the manufactured metal first layer but is not aligned with the metal first layer. Misalignment issues between layers can be introduced for various reasons, both in the mask production process and the wafer production process. For instance, during mask manufacturing, a group of mask shapes might be shifted or the mask surface could be warped, leading to misalignment of the wafer shapes being produced by those mask shapes. In addition, during the lithography process (manufacturing of the actual wafer), different machines are used to manufacture different layers of the IC and misalignment between these machines can introduce misalignment to the wafer layers. When layers are misaligned, in some embodiments, insufficient overhang of multi-layer interfaces can occur.

To ensure proper overhang at multi-layer interfaces, some embodiments consider multiple layers' mask images when optimizing one or more mask images used to fabricate these layers. For example, when optimizing a first metal layer, some embodiments consider one or more mask images of the first metal layer along with one or more mask images of an adjacent via layer. Doing so allows for the possibility of insufficient overhang to be minimized or eliminated. Conjunctively or alternatively, some embodiments consider one or more mask images of a second metal layer that is adjacent to the via layer. In such embodiments, the first metal layer sits on one side of the via layer, and the second metal layer sits on the other side of the via layer. These embodiments may conjunctively or alternatively optimize the masks of the via layer and/or the second metal layer, i.e., the optimization can be performed for one of these three layers at a time or for more than one of these three layers at once.

Some embodiments of the invention extend mask image optimization (e.g., Inverse Lithography Technology (ILT) optimization) from a traditional one-layer optimization to a multi-layer optimization process. Traditional mask image optimization operates on a single layer at a time, and only within the context of that single layer. Any interactions with the layers above and below the layer for which one or more mask images are being optimized, are not considered.

As described above, ILT is a type of mask layout optimization that is a mathematically rigorous inverse approach to determine mask shapes that will produce the desired on-wafer results. Given a known forward transformation from mask layouts to images (representing a wafer) for a specified lithography process, ILT computes an optimized mask image that produces the desired wafer target with best pattern fidelity and/or the largest process window. The optimized solution of mask layout optimization in some embodiments is not limited to simple heuristic modifications of the target mask layout. More specifically, the mask layout optimization explores solutions to the optimization that are very different from the original mask layout. To perform mask layout optimization, some embodiments define the operators $\psi$ (the mask image function), $\Phi$ (the target mask image pattern), f (a forward operator that includes a set of wafer simulation operations to convert a mask pixel image to a wafer image, and $\omega$ (the wafer image pattern). Thus, $\omega=f(\psi)$ and $\psi^*=f^{-1}(\Phi)$, where $\psi^*$ is an optimal mask image function. Optimization seeks to find a solution as close to optimal as possible within the constraints of a reasonable computational time. In some embodiments, a merit function (also referred to as a loss function, cost function, energy function, or Hamiltonian is defined and labeled $H(\psi)$. This function indicates the quality of the solution, (i.e., how well a mask image produces a simulated wafer image as close enough to a target wafer image as possible). A traditional example of such a loss function is given by $H=\iint|f(\psi)-\phi|$, which is equation 3 above. This loss function is the absolute value of the difference between the wafer image and the target wafer image, integrated over the area of the region of the wafer image. In some embodiments, one or more additional terms are included in the loss function, such as the wafer images at various operating conditions throughout the process window (i.e., over- or under-exposed and out of focus), normalized wafer image log-slope of the wafer image, robustness against mask image error enhancement factor, or other factors as deemed appropriate.

A multi-layer mask image optimization process considers the layers above and/or below (referred to hereafter as adjacent layers). In particular, the shapes produced on multiple silicon wafer interconnect layers in combination with process variations are considered when optimizing mask image(s) for a particular layer. This results in an improved mask, which is optimized for silicon manufacturability involving multiple layers. Additionally, some embodiments provide a way to co-optimize multiple adjacent-layer multiple mask images at once, again taking the interaction between adjacent silicon wafer interconnect layers into account. Additional cost function terms are introduced during iterative mask image optimization which accounts for the silicon wafer interactions between the layer being optimized and the adjacent layers. In some embodiments, deep learning (e.g., machine-trained networks) is used to compute silicon wafer details for the adjacent layers, enabling the computation of new loss function terms to become sufficiently performant to ensure tractability of the overall optimization loop.

The discussion throughout this specification refers to the consideration of Back End of Line (BEOL) interfaces (e.g., vias connecting metal wire segments) when optimizing one or more mask images of a mask layout based on wafer simulation. However, one of ordinary skill would understand that Front End of Line (FEOL) layer interfaces and/or Middle End of Line (MEOL) interfaces can be conjunctively or alternatively considered.

Figure 4:
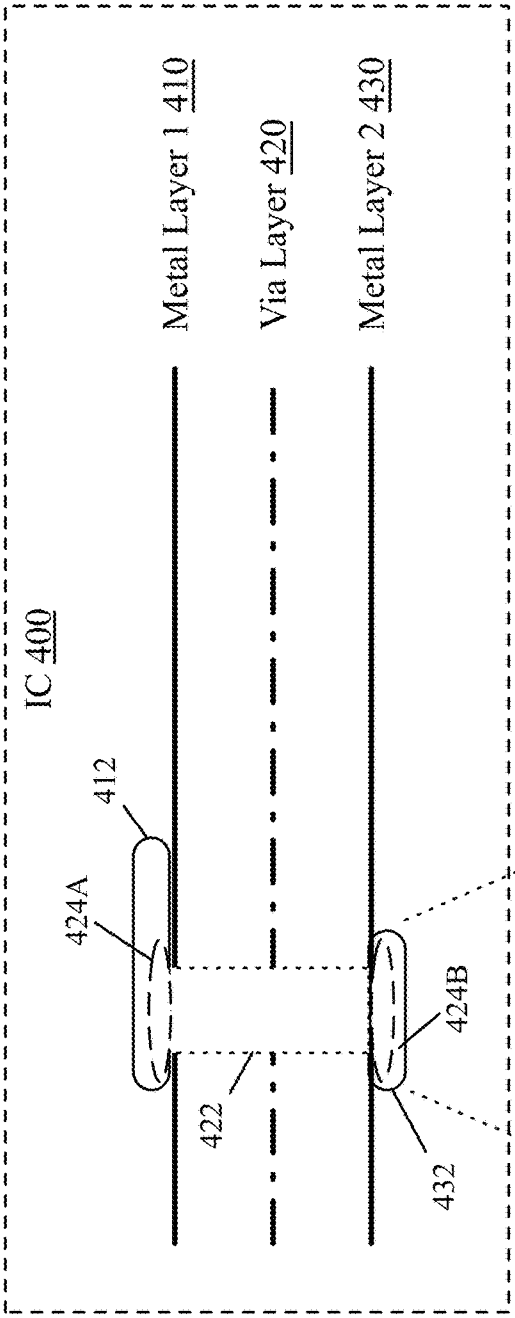
FIG. 4 conceptually illustrates an example portion of IC that includes three adjacent layers.
Figure 4:
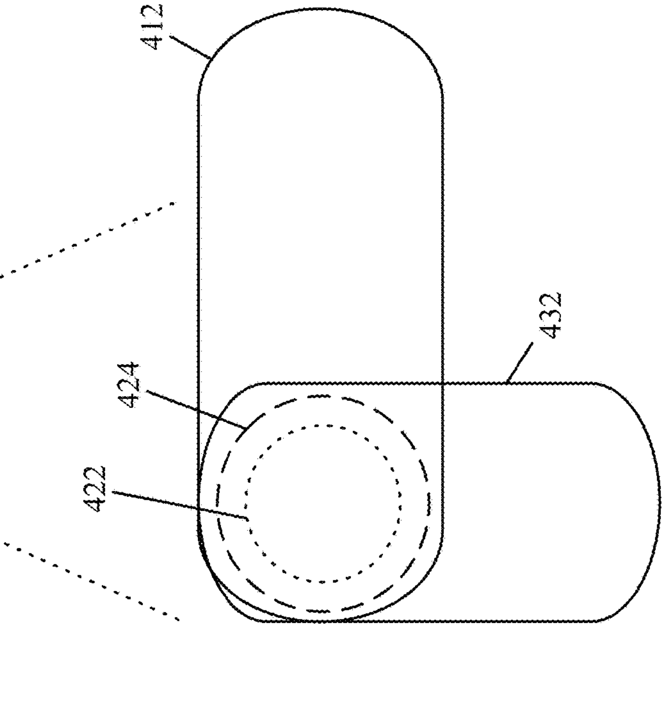

Some embodiments optimize one or more mask images of a first layer of an IC based on that first layer and one or more additional layers adjacent to the first layer. FIG. 4 illustrates an example portion of an IC 400 that includes three layers 410-430. In this example, three layers 410-430 of the IC 400 are shown, although the IC 400 may include one or more additional layers (e.g., one or more additional via and/or metal layers, one or more device layers, etc.). As shown, two metal layers 410 and 430 sit on either side of a via layer 420. In some embodiments, the via layer 420 runs through an inter-layer dielectric (ILD) (not shown) to connect wire segments on the two metal layers 410 and 430.

Some embodiments use vias to connect wire segments on the first metal layer 410 to metal wire segments on the second metal layer 430. For example, a via hole 422 is defined on the via layer 420, and via pads 424A-B are defined on either side of the via hole 422 to connect a first metal wire segment 412 on the first metal layer 410 with a second metal wire segment 432 on the second metal layer 430. In some embodiments, the via hole 422 runs through the ILD between the two metal layers 410 and 430 while the via pads 424A and 424B reside respectively on the metal layers 410 and 430 to connect respectively to the metal wire segments 412 and 432.

This figure also shows the via hole 422, via pads 424, and wire segments 412 and 432 from a top-down perspective. As shown, the via pads 424 are larger than the via hole 422 to fully cover the hole 422, and the wire segments 412 and 432 fully cover the via pads 424. In some embodiments, mask optimization is performed to ensure that, when manufactured on a wafer, the via pads of each via for an IC are larger than their corresponding via hole. Conjunctively or alternatively, in some embodiments mask optimization is performed to ensure that, when manufactured on a wafer, interconnect line ends defined on metal layers (e.g., line ends of the wire segments 412 and 432 in metal layers 410 and 430) are larger than the via pads to which they connect (and, in turn, also larger than the via holes which need to be smaller than the via pads). Similar optimization can be performed to ensure that contacts' pads are smaller than the line ends connecting to them, and that the contacts' holes are smaller than their pads.

Some embodiments perform z-axis analysis so that a mask layout can be optimized based on the z-axis analysis. Z-axis analysis includes (1) analysis of planar connection(s) for z-axis connections (e.g., vias, contacts) (i.e., analysis of metal line ends and their connecting via pads), and (2) analysis of z-axis connections (analysis of via pads and their corresponding via holes). Conjunctive analysis includes analyzing both planar and z-axis connections together (e.g., analysis of both metal line ends, both via pads, and the via hole for a single metal-via interface). Simplified conjunctive analysis is performed in some embodiments, which ignores via pads and performs analysis just based on metal line ends and via holes.

To optimize one or more mask images of the first metal layer 410, some embodiments consider the mask images of the first metal layer 410 as well as mask images of the via layer 420. Some embodiments also consider mask images of the second metal layer 430 and/or an additional via layer to the other side of the first metal layer 430. To optimize one or more mask images of the via layer 420, some embodiments consider the mask images of the via layer 420 along with mask images of the first metal layer 410 and/or mask images of the second metal layer 430. Either or both of the metal layers' mask images can be considered. To optimize one or more mask images of the second metal layer 430, some embodiments consider the mask images of the second metal layer 430 as well as mask images of the via layer 420. Some embodiments also consider mask images of the first metal layer 410 and/or an additional via layer to the other side of the second metal layer 430. Any of these optimizations can include performing z-axis analysis (analyzing overhang of line ends on via pads, and separately analyzing overhang of via pads on via holes), conjunctive analysis (analyzing overhang of line ends on via pads and the via pads on via holes together or simplified conjunctive analysis (analyzing overhang of line ends on via holes).

In some embodiments, mask image optimization is performed for each of the layers 410-430 individually, while still considering other layers in the mask image optimization of a given layer. That is, to perform mask image optimization for a specific individual layer, wafer simulation is performed for both that specific layer and one or more other (e.g., neighboring) layers (e.g., based on the mask images of those other layers), but only the specific layer is optimized during that process. In other embodiments, two or more of the layers 410-430 are optimized at once, such that the wafer simulation involves multiple layers' mask images and the mask image modification modifies multiple layers' mask images at a time.

Mask optimization for IC layers (such as layers 410-430) is performed in some embodiments to improve the IC's manufacturability and in order to improve the one or more masks used in manufacturing the IC, such that the masks produce an IC as close to the IC's design (as shown in the IC's design layout) as possible. In some embodiments, Designs For Manufacturability (DFM) rules are also followed, which exist in the form of recommended rules that seek to enhance IC design layout quality from a manufacturability perspective. The DFM rules are seen as complementary to the standard Design Rule Checking (DRC) rules and are typically written in the geometrical design space. DFM rules are by design more conservative than DRC rules.

Further, in some embodiments, DFM rules are often not followed completely, and some are treated as optional depending on a variety of factors. If a design layout is not deemed to have any DFM rule violations, it is deemed to be fully manufacturable or at least satisfactorily manufacturable in some embodiments.

Various DFM rule scoring methodology approaches are used in the industry to ascertain such layout design quality from the manufacturability perspective. In some embodiments, DFM rules are written with respect to a single layout design layer (e.g., minimum width or minimum spacing of a structure such as a wire). DFM rules in some embodiments are written with respect to multiple shapes within a particular neighborhood or context. DFM rules are also written with respect to multiple design layers in some embodiments (e.g., a rule for minimum multi-layer interface overlap or minimum multi-layer interface overhang for preferred-direction routing). Here, the multiple design layers may include metal and via layers for interconnect routing). DFM rules in some embodiments are extremely complex. Further, they are in some embodiments subject to various limitations in practice. For example, in some embodiments of a particular design layout, a via enclosure rule is tagged as "violated" in multiple different locations within the design layout, and all such violation locations are scored equally via conventional geometry-based methods.

Figure 5:
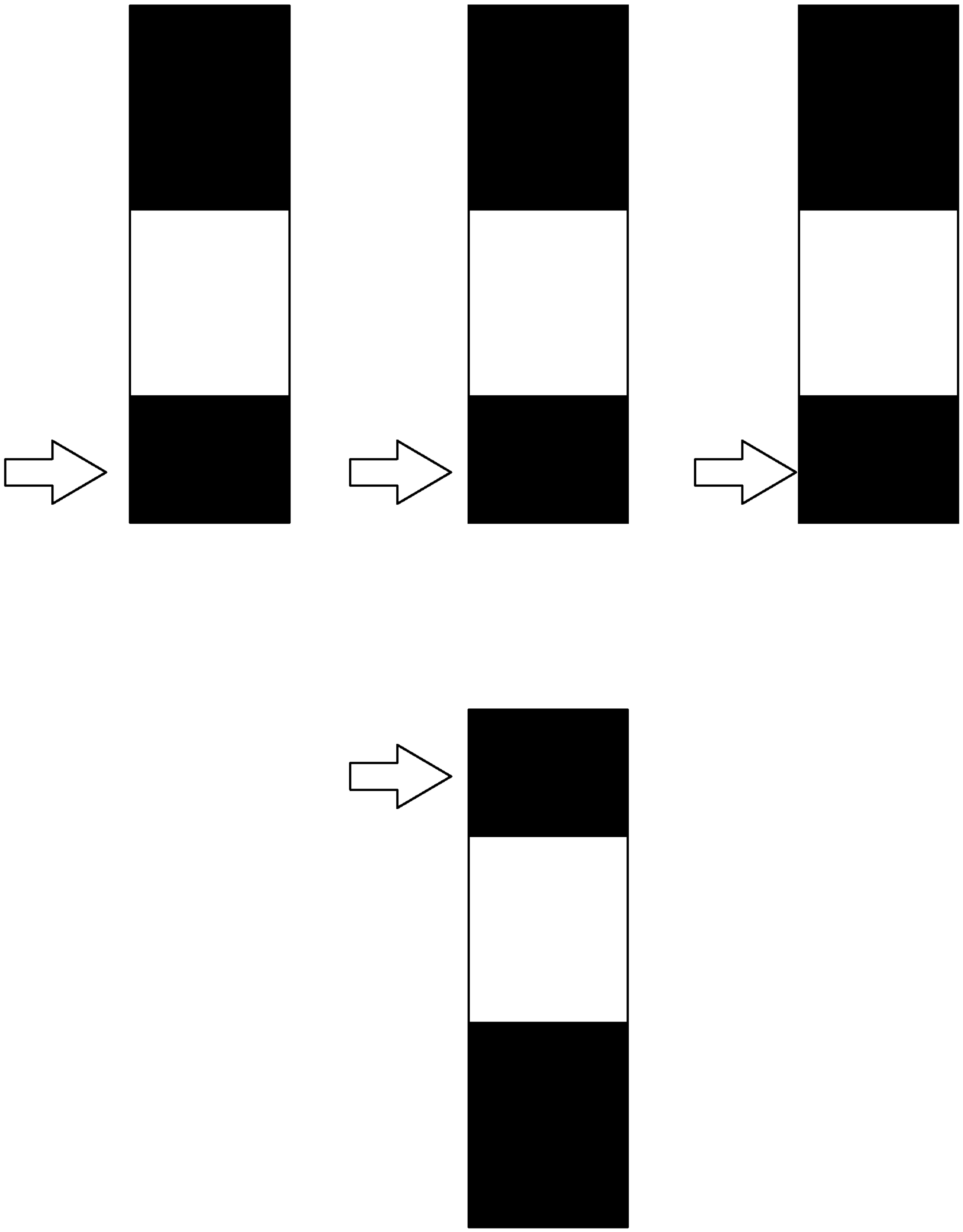
FIG. 5 illustrates an example of a design with via hole overhang DRC violations.

FIG. 5 illustrates an example of a design with via overhang DRC violations. While this figure illustrates each via connected to one metal line end on one adjacent metal layer for simplicity, each via is also connected to another metal line end on another adjacent metal layer (i.e., another metal layer on the other side of the via layer). This figure also illustrates the via hole of each via, and for simplicity does not illustrate the via pads of each via.

In this figure, four via overlap regions are shown, all of which are flagged as an insufficient overhang DFM rule violation (identified by the arrows). These violations effectively express a concern that manufacturing variation in manufacturing the vias, and the variation in manufacturing the metal lines, together with the misalignment between the two layers will all combine to make the overlap between the via holes and the metal lines too small. Since all of these represent nanoscale electrical wires, a reasonable overlap between the via holes as manufactured and the line ends as manufactured is required to remain to make a sufficiently good electrical connection. In some embodiments, FIG. 5 is a CAD drawing. As-manufactured shapes are generally curvilinear shapes that have corners rounded and line ends tapered significantly. Since line ends of minimum width taper significantly, there are sufficient "overhang" for the line ends as manufactured to "cover" the as-manufactured via holes.

However, these various violations may not actually be the same from a lithography perspective, due to the design context or neighborhood in which they exist. The four via holes shown will typically become more of a distorted circular shape when manufactured and the line ends will be tapered. Each of the instances of as-manufactured via holes and line ends will have significant variation when compared with each other, even though the CAD drawings are identical to each other. It is the task of mask image optimization to attempt to make the result as similar to each other as possible in this situation, though some random variation typically will occur anyway. Systemic variation due to the inability of mask image optimization to optimize every situation identically (due to differing neighborhoods) also cannot be fully avoided, although mask image optimization tries to make those differences disappear. In some embodiments, given an optimized mask image or mask image set (e.g., a mask layout) prepared for this design, detailed lithography simulations indicate that in fact one of the "failed" enclosure locations is actually printed successfully during lithography, i.e., achieving sufficient via coverage, and in fact should not be considered a failure at all. Examples are shown by reference to FIGS. 6-10.

In some embodiments, different shapes (e.g., contours) are computed for each IC component (e.g., wire segment, via, contact) to correspond to different sets of process conditions that can occur during actual manufacturing of the IC components. In such embodiments, different sets of process conditions represent different values of a set of manufacturing process parameters, and each set of process conditions includes a different value for each manufacturing process parameter.

The set of manufacturing process parameters in some embodiments includes one or more manufacturing process parameters related to at least one of depth of focus and strength of exposure used during a wafer fabrication process. In such embodiments, different contours are generated for each shape in a simulated wafer image to represent the different manufacturing process parameters that can occur because of variations in the wafer fabrication process (i.e., the mask production process that produces the physical wafer using a physical design layout and one or more masks). Conjunctively or alternatively, the set of manufacturing process parameters includes one or more manufacturing process parameters related to dosage used during a mask making process. In such embodiments, different contours are generated for each shape in a simulated wafer image to represent the different manufacturing process parameters that can occur because of variations in the mask making production process (i.e., the mask generation process that generates the physical mask(s) from a mask layout).

Given any input design mask reflective of a portion of a design, some embodiments produce multiple images that are reflective of the entire manufacturing process at nominal process values and at extreme values reflective of absolute limit values, or statistical values such as 1, 2, or 3 standard deviations. Each of these outputs are referred to as a 'set' of process conditions or as process corners, such as nominal, minimum, or maximum process condition sets or process corners.

Some embodiments generate, for each shape (e.g., each via, each contact, each wire segment) of an IC design, a set of contours including a maximum contour (also referred to as an outer contour), a minimum contour (also referred to as an inner contour), and a nominal contour corresponding respectively to a set of maximum process conditions, a set of minimum process conditions, and a set of nominal process conditions. These different process condition sets include different values for a particular set of manufacturing process parameters. For instance, in some embodiments the manufacturing process parameters can relate to depth of focus or strength of exposure used during the wafer production process of the wire segments.

For example, a first set of process conditions in some embodiments represents the nominal process conditions of the manufacturing parameters, which includes the average depth of focus and the average exposure strength. As another example, a second set of process conditions in some embodiments represents the maximum process conditions of the manufacturing parameters, which includes the largest depth of focus and the largest exposure strength.

In other embodiments, the second set of process conditions representing the maximum process conditions includes the smallest depth of focus and the largest exposure strength. Still, in other embodiments, the second set of process conditions representing the maximum process conditions includes the largest depth of focus and the smallest exposure strength. Any combination of process conditions can be used for each of the different sets of process conditions. There can be any number of process condition sets, and the process condition sets can be used for generating different contours of each shape for a simulated wafer image.

Figure 6:
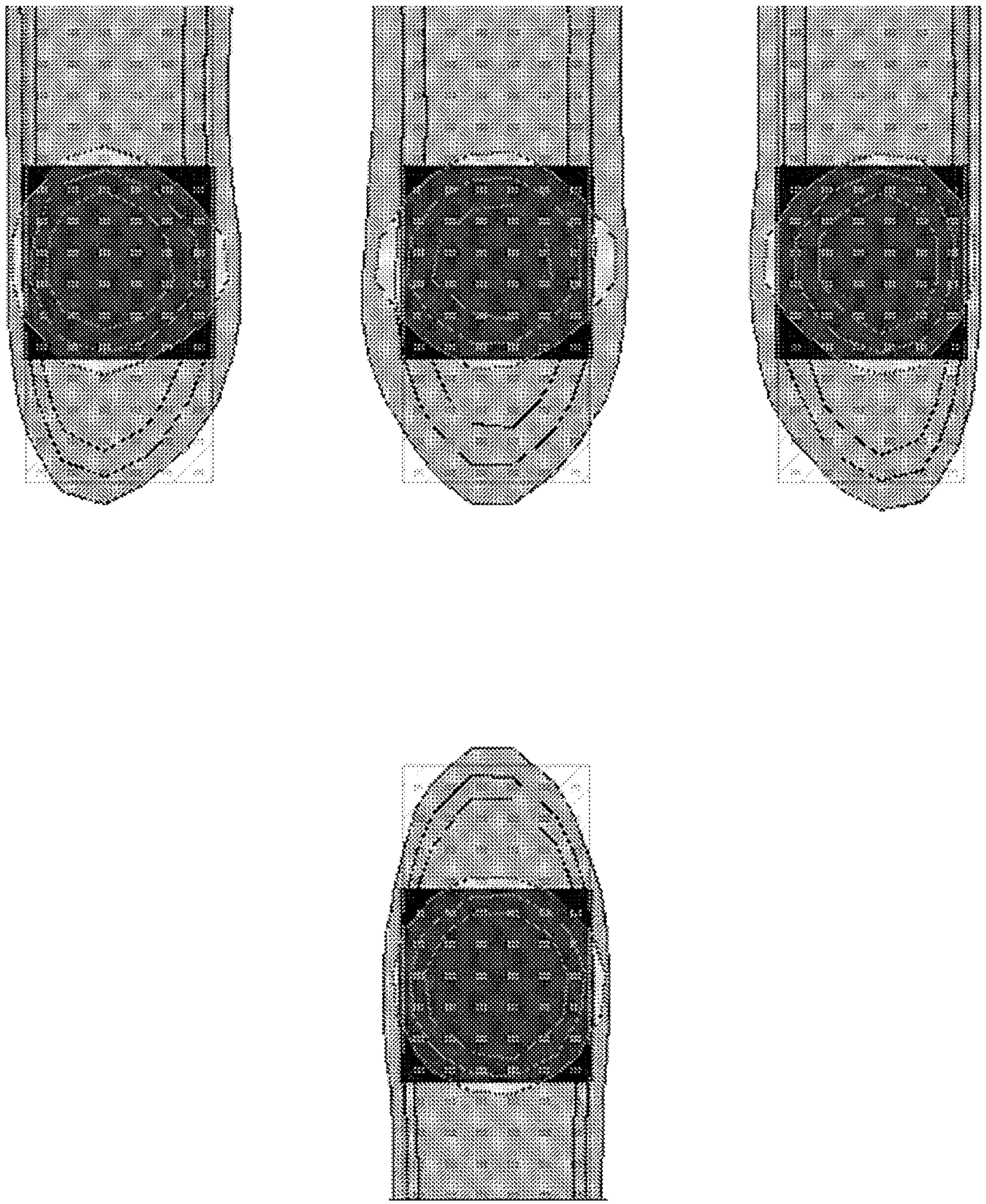
FIG. 6 illustrates an example of a via hole overhang design showing nominal, inner and outer contours.

FIG. 6 illustrates an example of a multi-layer interface overhang design showing nominal, inner, and outer contours corresponding respectively to nominal, minimum, and maximum sets of process conditions. The figure shows three sets of contours for the metal line ends and via hole shapes for the multi-layer interface overhang design in FIG. 5. Here, the contours for the tall, narrow metal layer (wire segment) shapes are shown, and the three contours corresponding to the nominal process condition set and the two process extremes are clearly visible, especially near the wire tips (ends of the drawn rectangles). Similarly, the figure shows three contours for each of the vias, which appear similar to concentric circles.

Figure 7:
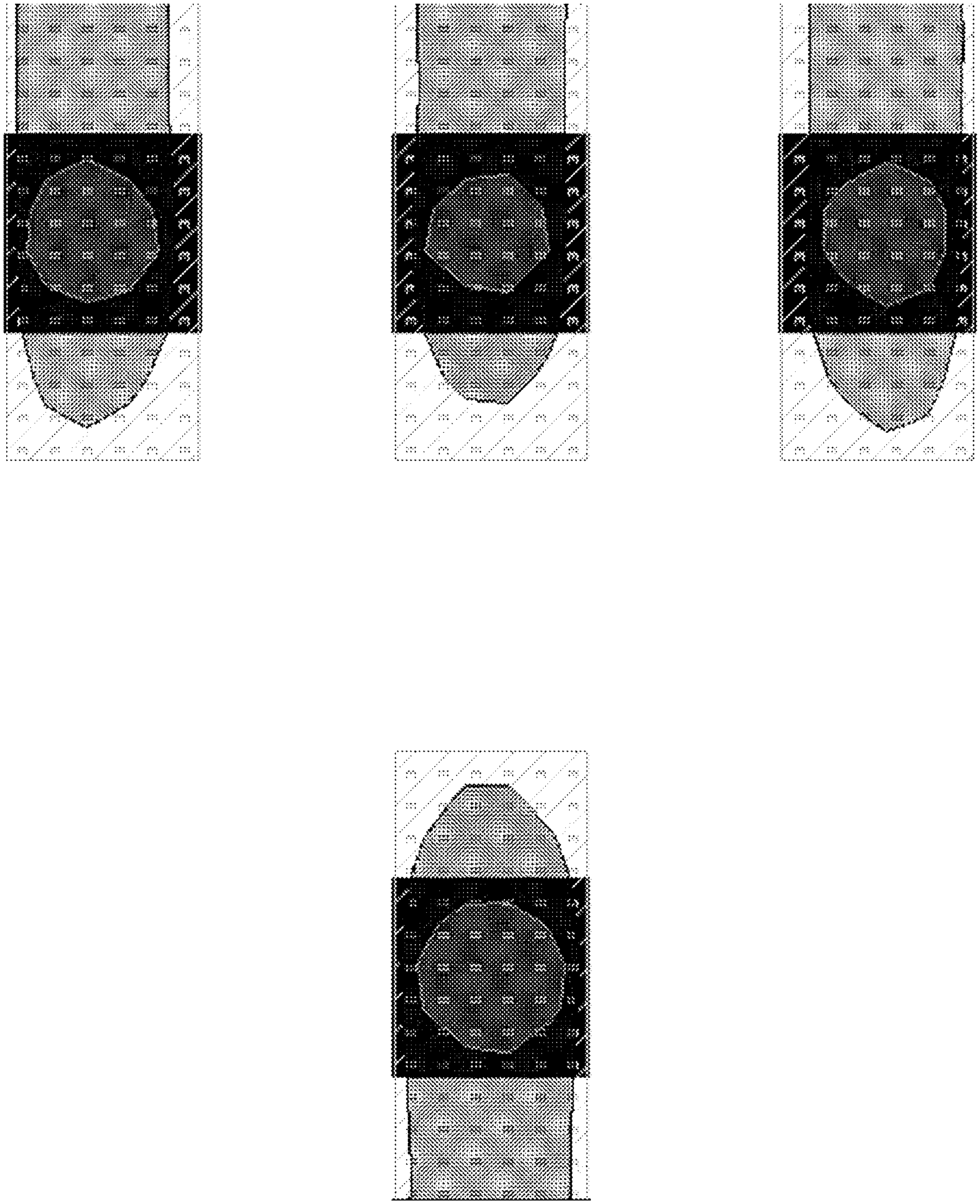
FIG. 7 illustrates an example of a via hole overhang design showing inner contours only.

FIG. 7 illustrates an example of the multi-layer interface overhang design showing only the inner contours (i.e., with the nominal process condition and the maximum process condition contours removed). These figures are produced assuming optimal alignment between the metal line ends and the via holes. In all cases, these via holes tend to be fully overlapped by the metal, and the intersection between the metal contours and the via hole contours are shown as a thick circular line in FIG. 8. The top center via hole, while fully overlapped, has a smaller printed area than the others, a potential cause for concern (e.g., increased via resistance).

Figure 9:
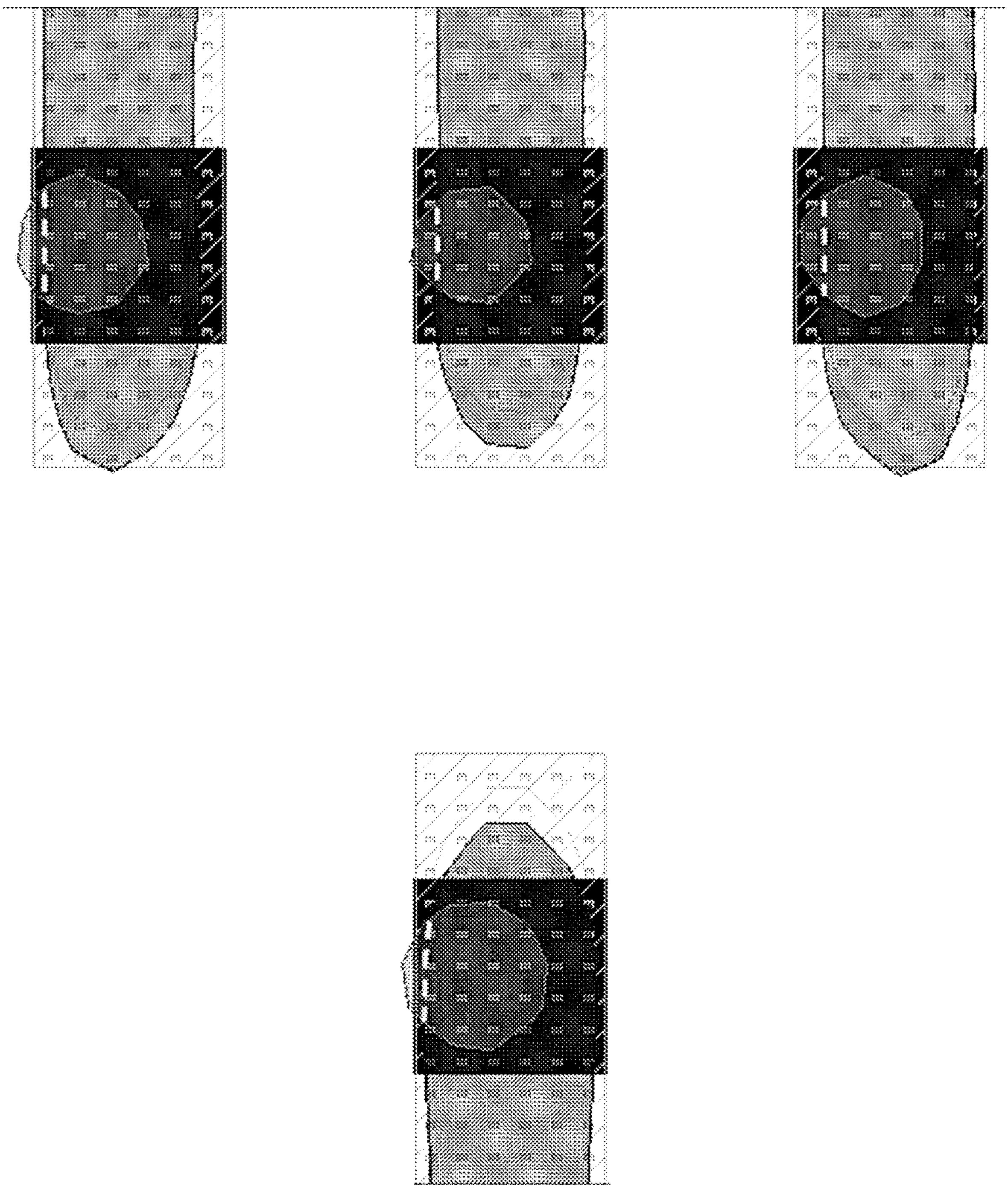
FIG. 9 illustrates an example of inner via hole contours and inner metal contours for an example dual misalignment case.

However, if via-metal misalignments are introduced during manufacturing, full overlap may not be achieved. FIG. 9 illustrates an example of one possible manufacturing scenario that shows inner via hole contours and inner metal contours for a dual misalignment case. Here, the metal layer has been shifted downwards while the via layer has been shifted left, relative to the originally drawn design (rectangles and squares). As shown, the left edges of the via holes are not fully covered by the left edges of the metal line ends in this scenario, and a "clipping" is evident, particularly for the leftmost, upper via hole location. The areas of the via holes to the left of the thick dashed lines are the uncovered areas.

Figure 10:
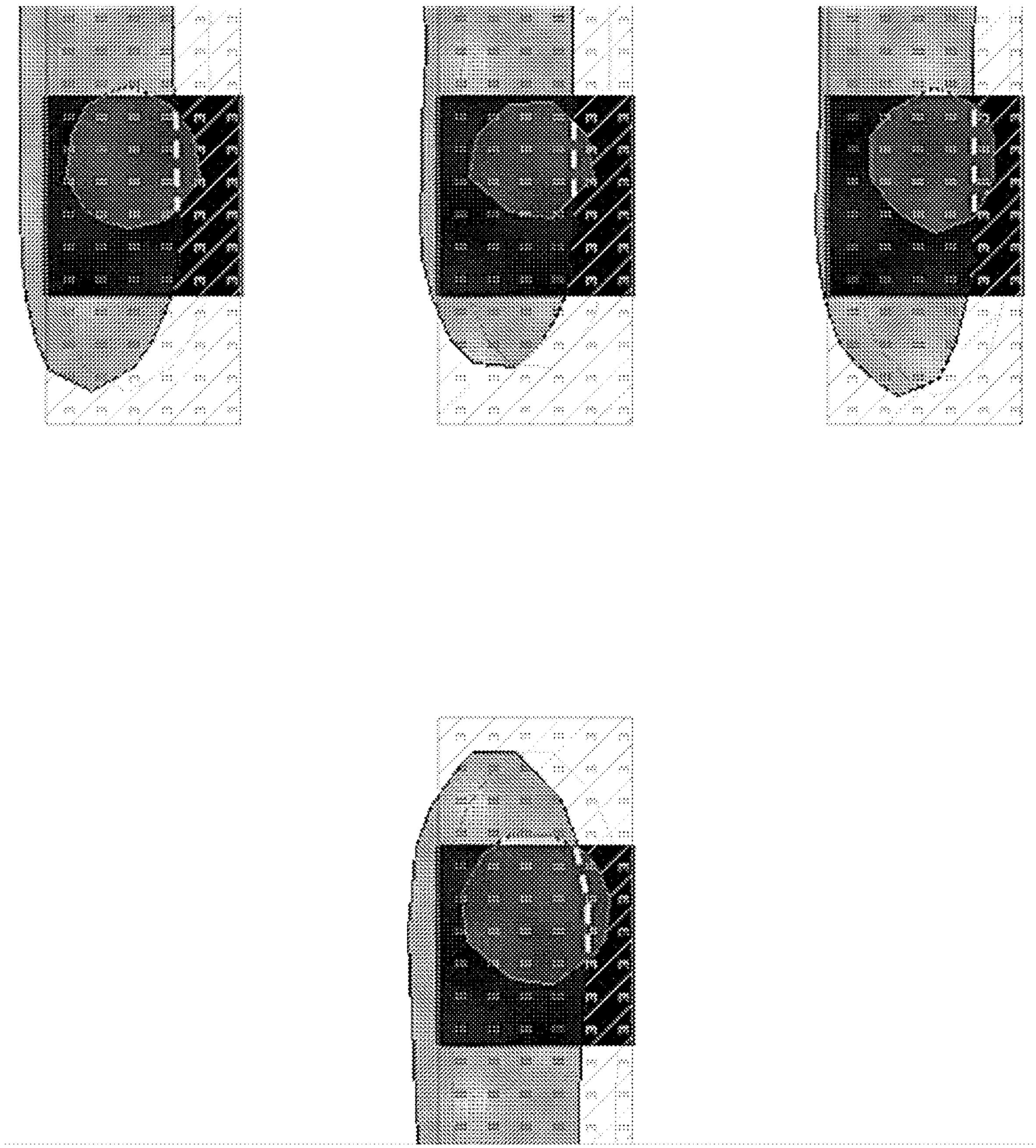
FIG. 10 illustrates an example of inner via hole contours and inner metal contours for another example misalignment case.

During manufacturing, other misalignments may also occur. FIG. 10 illustrates an example of a second misalignment case where the metal layer is misaligned to the left and the via layer is misaligned upwards. This time, the areas of the via holes to the right of the thick dashed lines are the uncovered areas. The metal line ends are misaligned to the left and northwards, i.e., effectively misaligned in a northwest direction. In some embodiments, the via holes are misaligned to the right, i.e., misaligned in an easterly direction.

Figure 8:
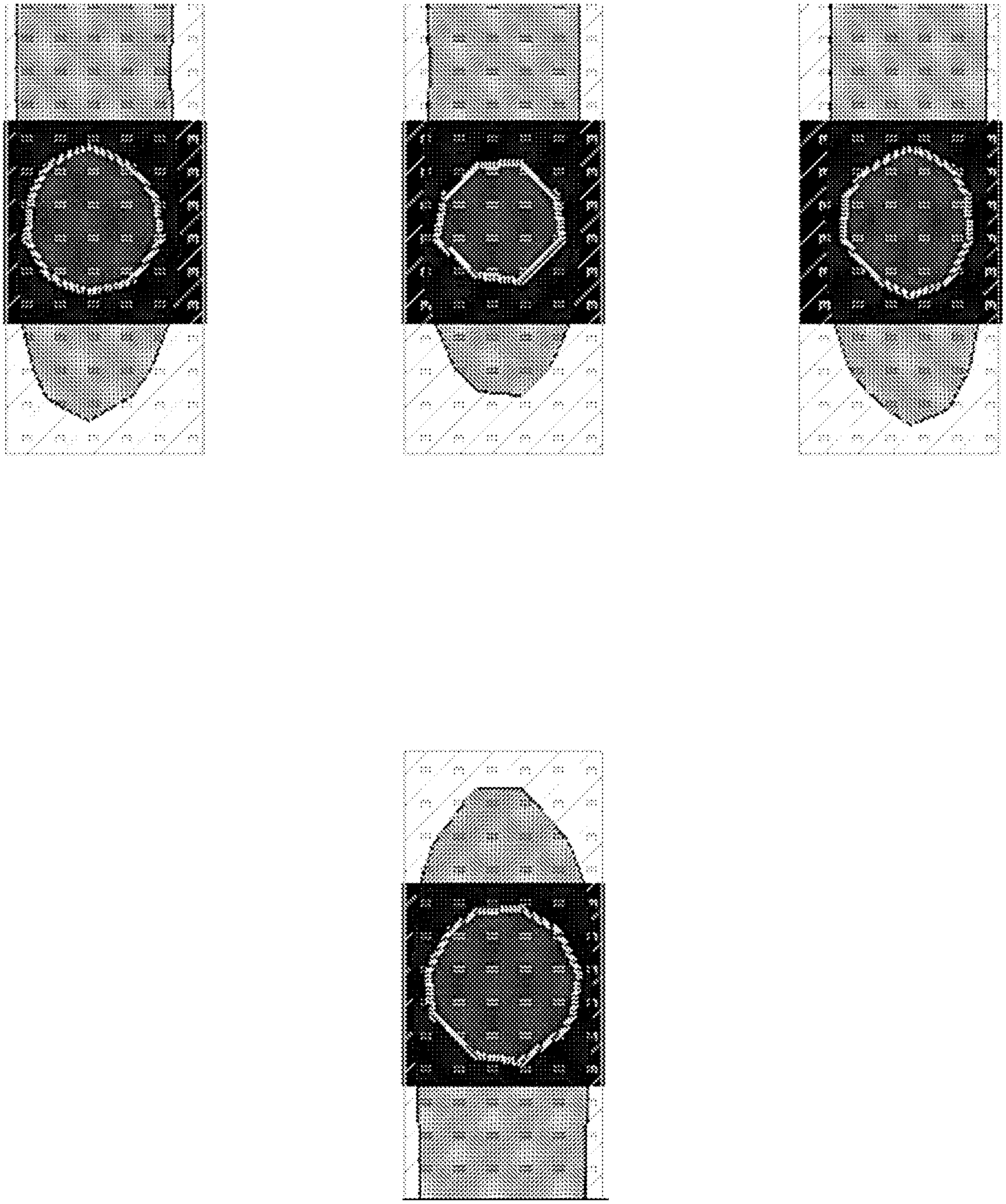
FIG. 8 illustrates an example of an intersection or overlap between inner via hole contours and inner metal contours.

Depending on the magnitude of the misalignment, the directions involved, and the actual shape of each manufactured metal and via hole contours (the shapes of which are location- or context-specific), different amounts of via hole coverage or overlap exist during real manufacturing for each via hole instance in some embodiments. Due to how the metal and via holes are printed, some via holes are simply more susceptible to coverage issues than others. Alternately, some via holes are more resilient to coverage issues than others. The thick circular line in FIG. 8 shows the amount of the manufactured via hole that is overlapped by metal in the ideal case of no misalignment. Due to how metal and via layers are printed, some via holes are also more susceptible to coverage issues with their corresponding via pads.

Different via-coverages can occur due to the way the metal and via layers are printed, as a function of the immediate neighborhoods. The above scenario shows that the drawn shapes with more 'space' around them have more room for sub-resolution assist features (SRAFs) to be included in the mask layout, and hence print more reliably across manufacturing variations. Ignoring the effects of multiple layer decomposition in order to simplify the discussion, the upper, center-most shapes have the least amount of surrounding space such that suitable SRAFs may not be inserted during mask image optimization and thus can result in reduced via coverage.

DFM rules which do not take such neighboring design context into account often set the rule for the worst case (for example, the center-middle via hole in the example of FIG. 8). The rule may therefore be overly pessimistic, imposing an extra burden on a layout engineer to achieve DFM compliance in certain areas where that compliance may not even be needed. In FIG. 8, the left, the right, and the bottom via hole overlaps would have been sufficient due to high resiliency values. An overly conservative design rule set intent on making the center top via hole overlap also sufficient would, however, have required a longer overhang for all situations.

DRC and DFM rules are typically constructed based on a knowledge of mask and wafer lithography limitations. They are often overly pessimistic, and efforts to make these rules more context aware (and therefore somewhat less pessimistic) have led to an explosion in rule deck size and thus to corresponding computational processing cost when evaluating the rules for a particular design layout. Optimizations performed during mask image optimization when optimizing a set of one or more mask images for a layer are in some embodiments performed with respect to a single layer at a time. For example, a simple loss function determined when optimizing a layer in some embodiments is the absolute value of the difference between the wafer image and the target wafer pattern, integrated over the area of the region of the image. In some embodiments, one or more additional elements are included in the loss function. Examples of such additional elements include the images at various operating conditions throughout the process window (i.e., over- or under-exposed and out of focus), normalized image log-slope of the image, robustness against mask error enhancement factor, etc.

Given the significant computational cost of mask image optimization even for a single layer, mask images optimized by typical existing mask image optimization processes do not explicitly account for the adjacent layers above or below the layer being optimized. Hence, traditional mask image optimization does not produce mask layouts that are optimized for the manufacturability of a design as far as the silicon wafer shape interactions between multiple layers are concerned. Therefore, some embodiments advantageously take adjacent layers into account when performing mask image optimization to produce mask layouts that not only meet the existing single-layer requirements but also improve design manufacturability from a multiple-layer perspective. For example, some embodiments improve mask image optimization such that a mask produced for a metal (e.g., wiring) layer is fully aware of the effects of manufacturing on the adjacent via layer mask(s), so that not only is a metal layer mask image optimized from a metal layer fabrication standpoint, but it is also optimized from a via enclosure (resiliency) standpoint. Some embodiments further advantageously perform optimization in a fully context-aware manner (i.e., the neighboring layout context for both the metal and via layers are fully taken into account). Such embodiments can use z-axis analysis, conjunctive analysis, or simplified conjunctive analysis to optimize mask images.

In some embodiments, the mask image optimization process results in a set of mask images for a layer (such as a metal layer), or a set of mask images for a layer stack (such as via-metal-via layer stack, or metal-via-metal layer stack), that is effectively locally optimized in each contextual location to result in maximal via coverage resiliency (e.g., via pad and via hole resiliency and/or via pad and metal line end resiliency). Conjunctively or alternatively, the mask image optimization process in some embodiments results in a mask image (or set of mask images) such that each individual via's susceptibility to via coverage issues is minimized.

During conventional mask image optimization, in some embodiments, a three-dimensional (3D) representation of the wafer illumination intensity is computed. In some embodiments, a loss function (also referred to as a Hamiltonian in some embodiments) is calculated, including a weighted sum of terms. The term weights are multiplied by a factor related to the difference between the simulated wafer image and the target wafer image across the pixel field (i.e., in the pixel domain). In some embodiments, the loss function terms include contributions from a variety of printed image characteristics. Iterative optimizations are pursued to reduce the magnitude of this loss function. In computational mathematics, an iterative method is a mathematical procedure that uses an initial value to generate a sequence of improving approximate solutions for a class of problems, in which the n-th approximation is derived from the previous ones. A specific implementation of an iterative method, including the termination criteria, is an algorithm of the iterative method.

Figure 11:
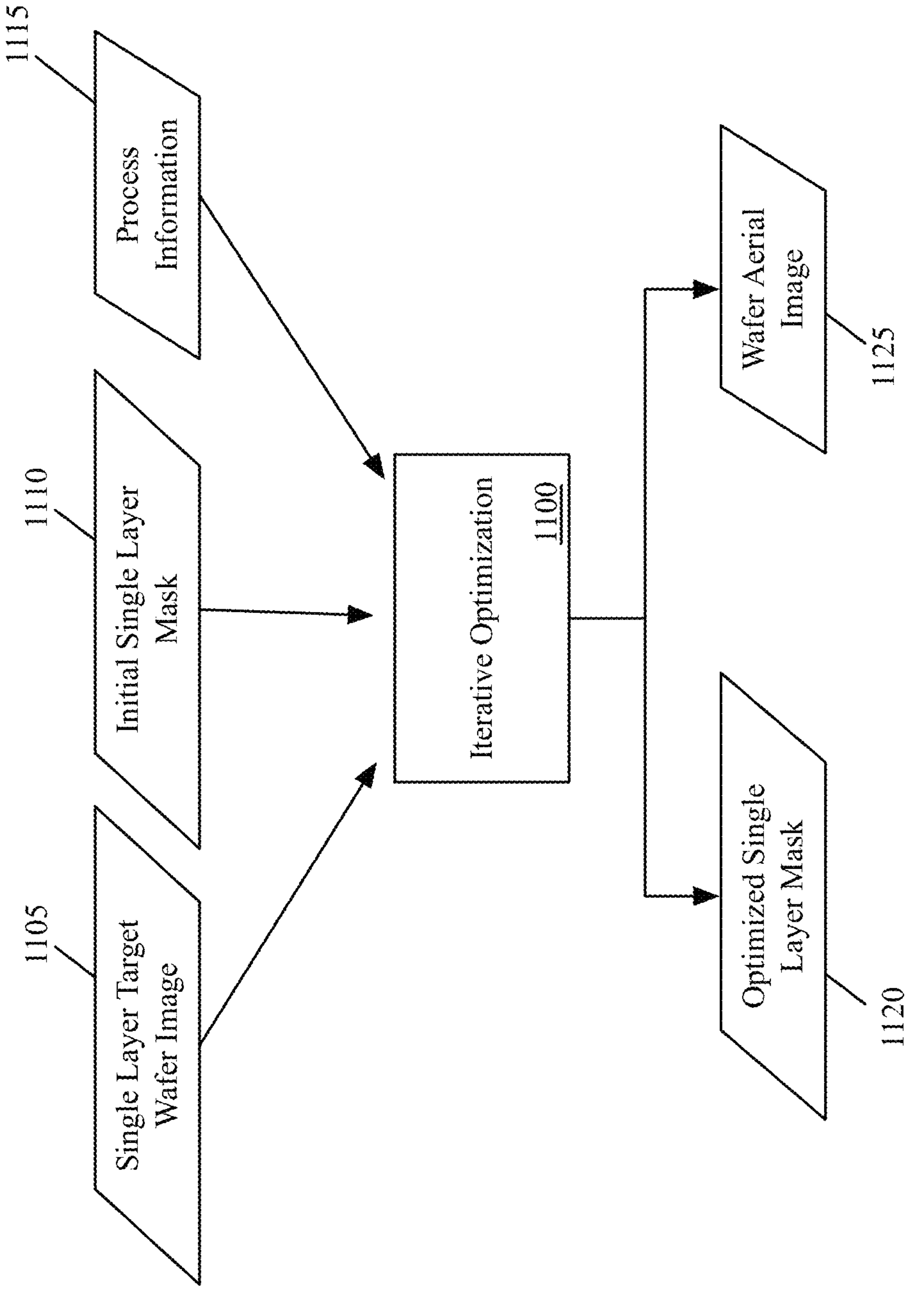
FIG. 11 conceptually illustrates an example of a high level mask image optimization process with inputs corresponding to a single layer to produce an optimized mask image for that single layer.

FIG. 11 conceptually illustrates an example of a high level mask image optimization process with inputs corresponding to a single layer to produce an optimized mask image for that single layer. For conventional mask image optimization, the primary inputs are an initial single-layer mask 1105 and a target wafer image 1110 (i.e., a wafer image representing what the wafer should look like when manufactured using the input mask image). In some embodiments, this target wafer image 1110 is a corner-rounded version of a designer-drawn layout (also referred to as a design layout). A secondary input is the process information 1115 (e.g., process model, process variability or conditions, etc.) for the wafer, and the mask rules that the single-layer mask image often follows. This information is provided to an iterative optimization process 1100, the primary output of which is a single-layer mask image 1120, optimized in order to produce a wafer image as close as possible to the input target, when combined with the lithography or forward process.

In some embodiments, secondary outputs of the optimization process 1100 include wafer aerial images 1125. For example, a secondary output in some embodiments includes a wafer image at a nominal process condition set. Additional images in some embodiments include wafer images at other process conditions (representative of those produced in response to manufacturing dose and depth-of-focus variations) and, in some embodiments, various indicators of error, such as areas where mask image optimization could not produce an adequate wafer process window, or where mask rules are violated.

Figure 12:
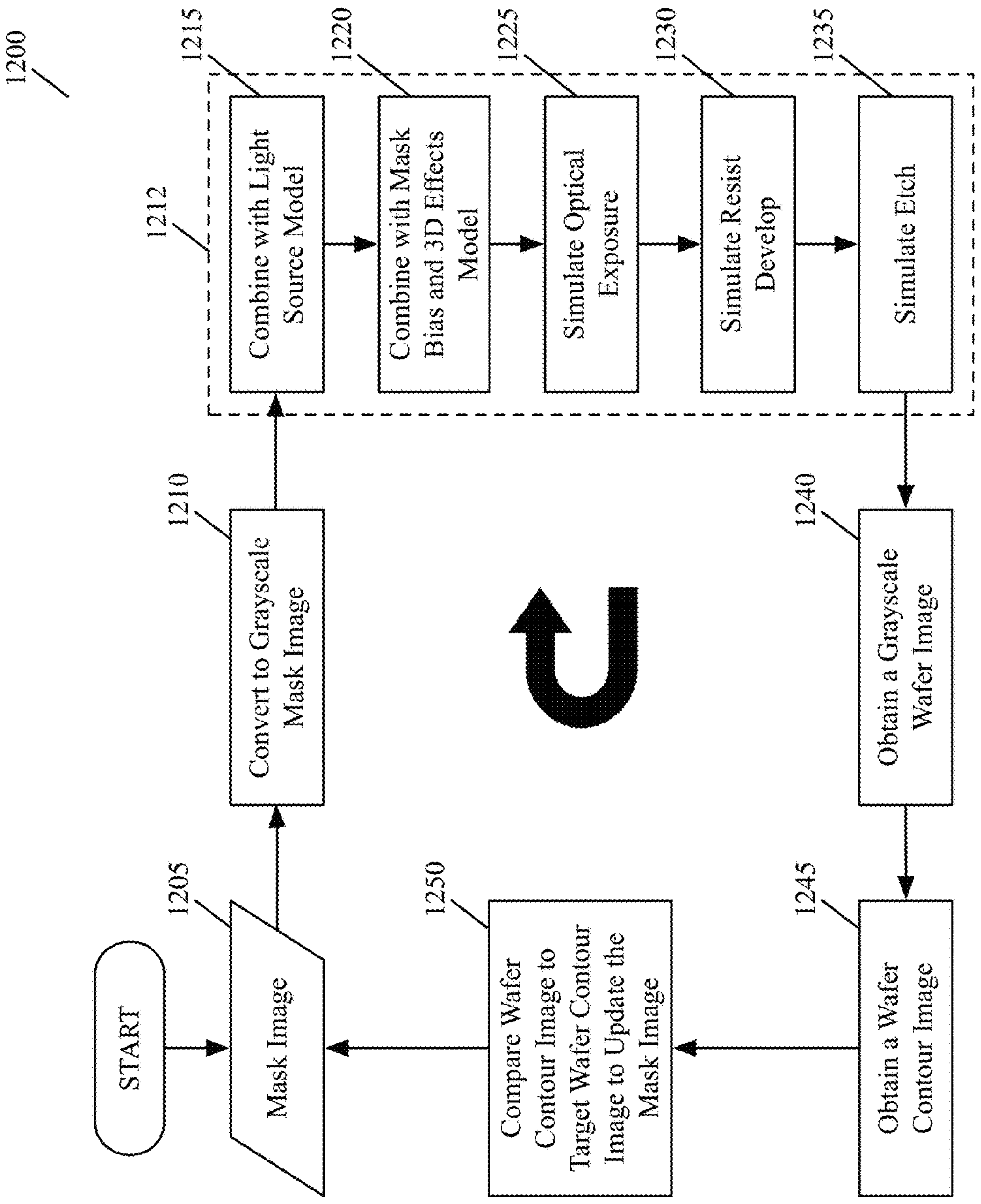
FIG. 12 conceptually illustrates an example of an iterative mask image optimization process.

FIG. 12 conceptually illustrates an example of an iterative mask image optimization process 1200. There are many known OPC and ILT methods, including the use of deep learning, to infer mask images. Hence, different embodiments may use any of these OPC or ILT methods. As shown, a mask image 1205 (represented in the equations above as w) is converted (at 1210) to a grayscale mask image (i.e., a pixel image) using a process known as rasterization. This greyscale (rasterized) mask image is used to perform a set of wafer simulation operations 1212, collectively referred to in the equations above as the forward operator f.

This forward operator 1212 includes multiple operations, which may vary in different embodiments. In this example, the greyscale mask image is combined (at 1215-1220) with a light source model, mask bias, and 3D effects model. Optical exposure is simulated (at 1225) to obtain an aerial intensity image. Next, photoresist development and etch operations are simulated (at 1230-1235) to obtain (at 1240) a grayscale wafer image (i.e., a pixel-based wafer image).

In some embodiments, a contour operation is performed (at 1245) to obtain a wafer contour image (referred to in the above equations as w) from the grayscale wafer image. This wafer contour image is used compared (at 1250) to a target wafer contour image, with this difference then used to update the mask image. Some embodiments compute the target wafer image using the design layout corresponding to the mask image. Examples of methods to generate a target wafer image from a design layout include performing a low pass filter, performing one or more Gaussian convolutions, and using one or more corner rounding algorithms on the interconnect layers of the design layout. That is, rather than comparing the simulated wafer image (based on the current mask image) to a rectilinear design layout, various operations are performed on the design layout (e.g., various corner rounding operations, etc.) so that the target wafer image is a more realistically manufactured wafer image.

The comparison of the simulated wafer image and the target wafer image is made by computing a loss function that expresses the difference between the simulated wafer contour image and the desired wafer contour image @. Other embodiments do not perform a contour operation, and the loss function computes the difference between the simulated grayscale wafer image and a desired (target) grayscale wafer image. After computation of the loss function, some embodiments compute gradients based on the loss function, and the mask image is updated based on these computed gradients. Further information regarding the loss function, the terms included in the loss function, and the gradients performed using the loss function will be described below. After updating the mask image based on the comparison, the iterative optimization process 1200 of some embodiments repeats the operations 1210-1250 starting with the updated mask image (the desired target image remains constant through each iteration).

The process 1200 is performed in some embodiments iteratively until the simulated wafer contour image $\omega$ (or the simulated grayscale wafer image) is as close as possible to the target wafer image $\Phi$ (or the target grayscale wafer image). That is, the process 1200 terminates when a local minimum for the loss function is reached, indicating an optimal mask image for the layer. Conjunctively or alternatively, the process 1200 is performed iteratively until a different termination condition is met (e.g., a particular number of iterations has been performed). At the end of the process 1200, an optimized mask image ψ* represents the optimized, iterative inverse of the wafer processing process for the given target mask image.

Figure 13:
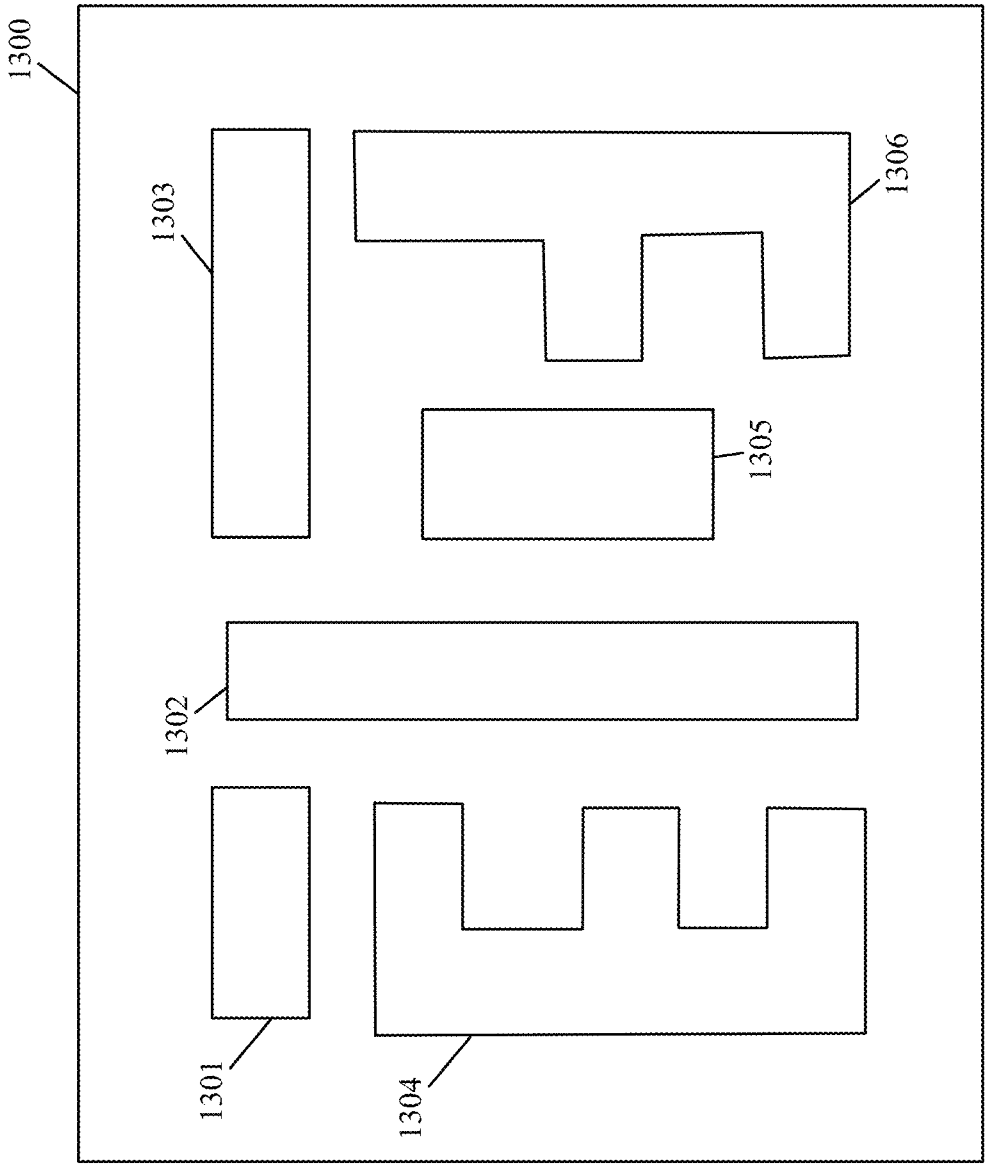
FIG. 13 illustrates an example design layout for a metal layer of an IC.

As described above, some embodiments perform wafer simulation to optimize a mask image corresponding to a design layout. This mask image optimization in some embodiments includes utilizing (and optimizing) SRAFs in the mask image. FIG. 13 illustrates an example design layout 1300 of a metal layer (or a region of a metal layer) of an IC. As shown, the design layout 1300 shows the interconnect segments designed for the region of the metal layer. In this example, the design layout 1300 includes piecewise linear interconnect segments (i.e., interconnect segments with only straight line segments), however, a design layout can conjunctively or alternatively have one or more curvilinear segments (i.e., interconnect segments with at least one curved segment). As shown, the design layout 1300 includes interconnect segments 1301-1306, which are shapes representing wires that are to be manufactured for this metal layer.

While the design layout 1300 includes shapes with sharp edges and corners, in some embodiments, the wire segments fabricated from this design layout 1300 will have rounded corners, due to constraints of manufacturing ICs. To manufacture these wire segments, one or more masks are used. More specifically, one or more masks are created for each layer of an IC so that light can be shone through the holes of the masks to produce fabricate the layers of the IC (after applying photoresist).

Figure 14A:
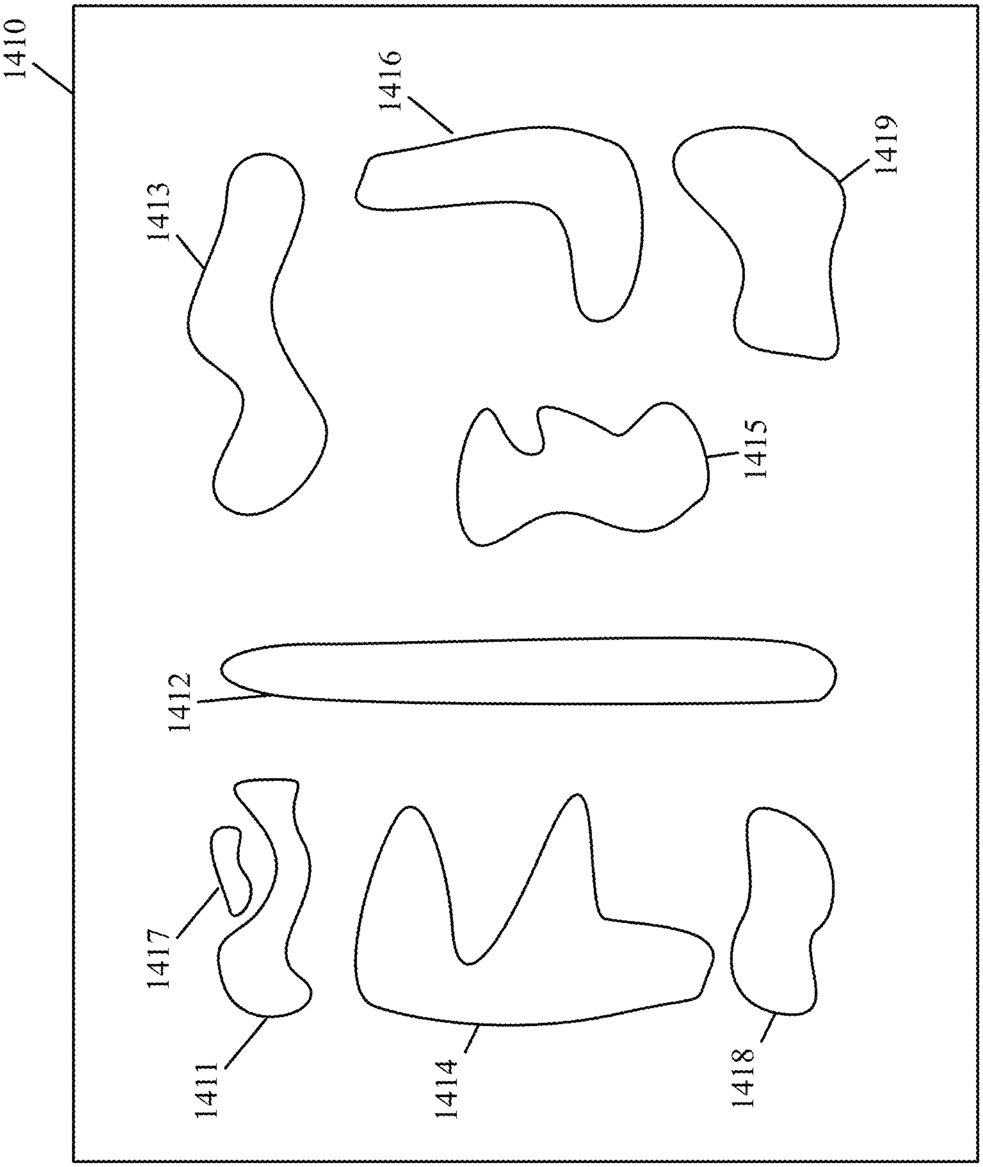
FIGS. 14A-B illustrate a mask image of a metal layer before and after at least one iteration of mask image optimization.

FIG. 14A illustrates a mask image 1410, created for the design layout 1300 of FIG. 13, before optimization of the mask image 1410 has been performed. This mask image 1410 will be used to produce one or more masks, and those masks will be used to produce the wire segments as designed in the design layout 1300. In this example, one mask image 1410 is created for the design layout 1300 of the metal layer. However, in other embodiments, multiple mask images are created in order to manufacture the design layout 1300. In such embodiments, each mask image includes a set of shapes that will be used to create a different portion of the wire segments (e.g., different wire segments, different portions of a same wire segment).

In this figure, the mask image 1410 includes a set of mask shapes 1411-1419, each of which represents a transparent area that will be made on a mask to create wire segments corresponding to the design shapes 1301-1306 in the design layout 1300. The mask shapes 1411-1419 illustrate the areas of the mask that will be removed in order to let light shine through the mask and onto the substrate (after application of photoresist) to fabricate at least a portion of the IC. In this example, the mask shapes 1411-1419 can be easily correlated to the design shapes 1301-1306. However, in many cases, a mask image can include one or more shapes that do not clearly map (e.g., to a human viewer) to the specific design shapes of a design layout to which they correspond.

Figure 14B:
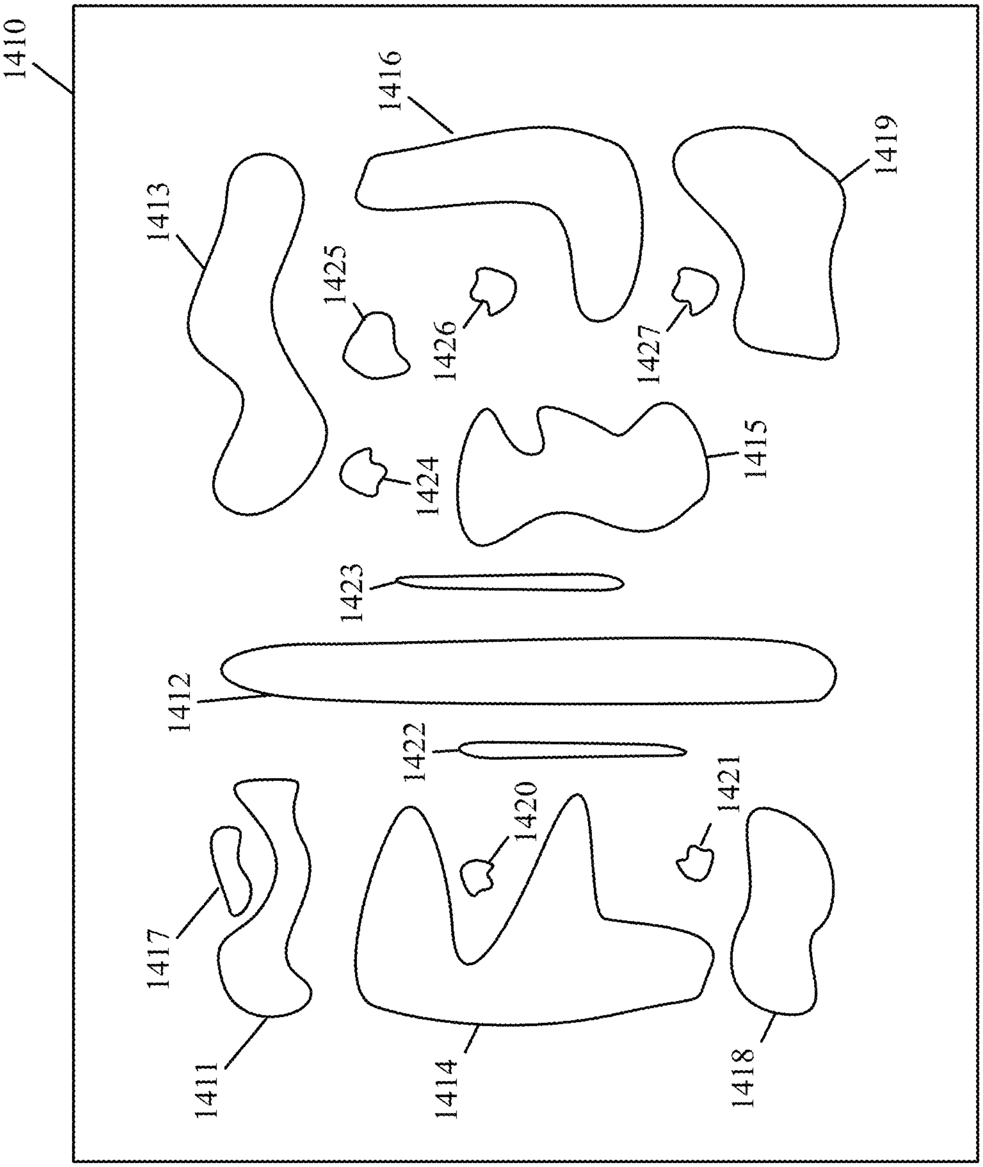

As mentioned above, the mask image 1410 shown in FIG. 14A is before mask image optimization has been performed. FIG. 14B illustrates the mask image 1410 after at least one round of mask image optimization. In this figure, the mask image 1410 now includes a set of SRAFs 1420-1427, which represent additional transparent areas that will be fabricated as part of the corresponding mask. These SRAFs 1420-1427 will be fabricated as part of the mask to let additional light through the mask which will better manufacture the IC on the substrate. The SRAFs 1420-1427 add additional light such that the fabricated IC components (e.g., wire segments) on the substrate will be closer to the design layout 1300.

The SRAFs 1420-1427 may have been added and/or modified during any iteration of mask image optimization. For example, SRAFs 1420-1424 in some embodiments might be added to the mask image 1410 during a first mask image optimization iteration, while SRAFs 1425-1427 are added to the mask image 1410 during a later mask image optimization iteration. As another example, one or more other SRAFS could be added to the mask image 1410 during one optimization iteration but then removed and/or modified during one or more later optimization iterations (e.g., if a mask image including a particular SRAF produces a locally worse wafer image than a mask image without the particular SRAFs).

Simulated annealing is a probabilistic optimization technique that is used in some embodiments to iteratively modify a mask image (e.g., a mask image's SRAFs) to improve the mask image. In such embodiments, each iteration can add, move, modify, and/or remove one or more SRAFs of a particular mask image, as well as the larger primary features of the particular mask image, and then use that particular mask image to again perform wafer simulation. Based on the result of the wafer simulation, the SRAFs of the particular mask image are modified.

Figure 15A:
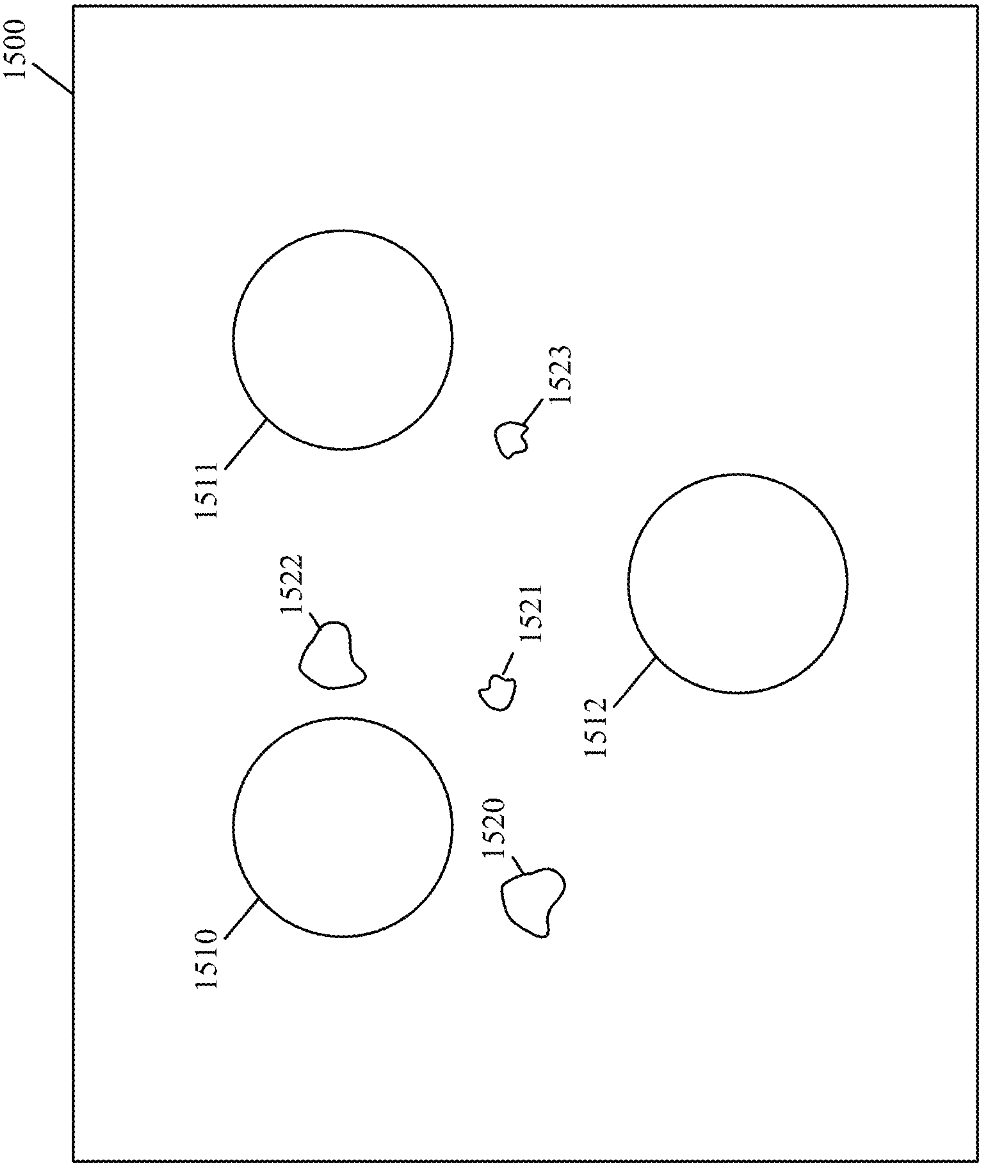
FIGS. 15A-B illustrate an example mask image of a via layer before and after at least one iteration of optimization.
Figure 15B:
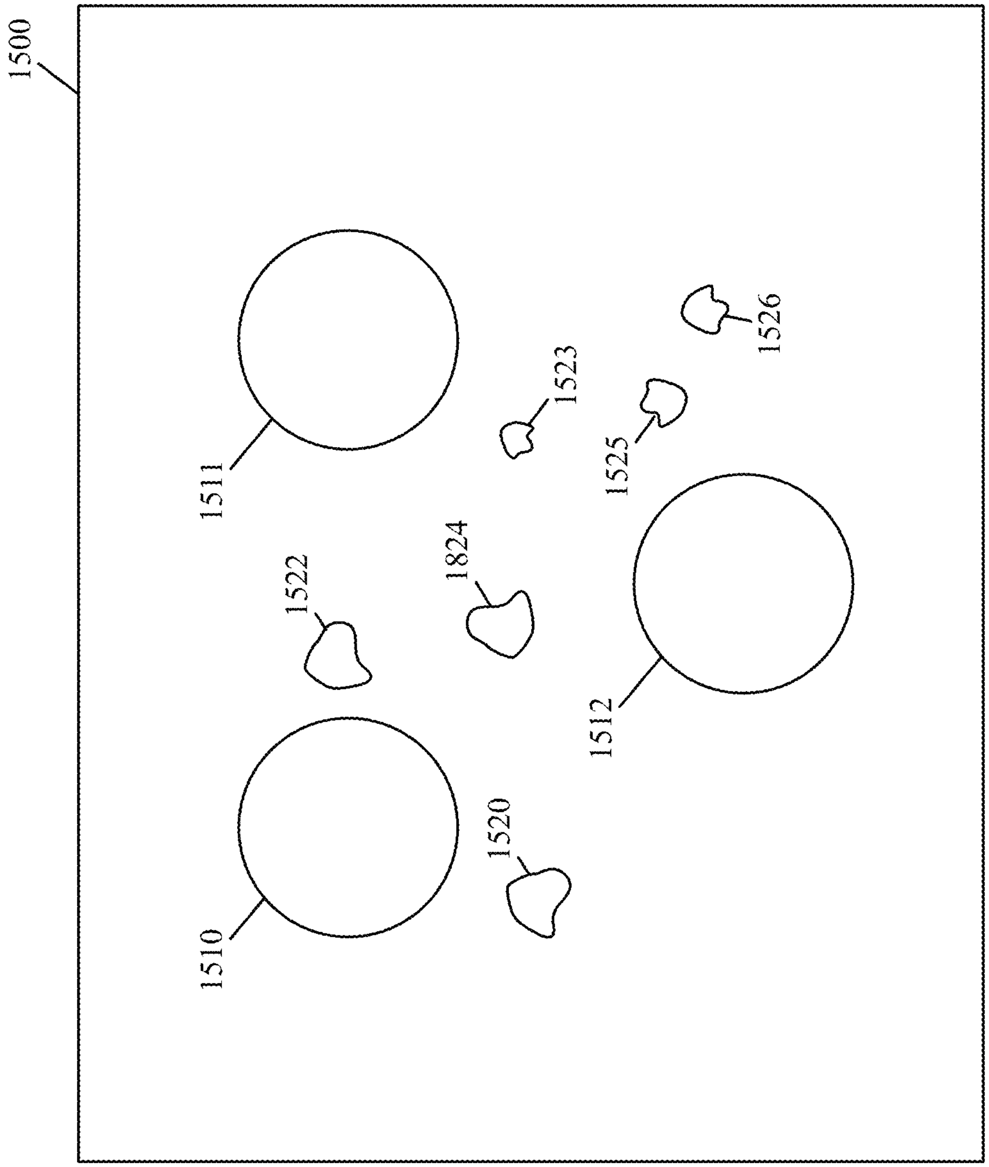

FIGS. 15A-B illustrate another example mask image 1500 at different times during mask image optimization. In this example, the mask image 1500 corresponds to a via layer of a design layout (not shown). FIG. 15A illustrates the mask image 1500 after at least one iteration of mask image optimization. In this figure, the mask image 1500 includes a set of IC components 1510-1512 representing transparent areas that will be fabricated on the corresponding mask. The IC components 1510-1512 illustrate the areas of the mask that will be removed in order to let light shine through the mask and onto the substrate to fabricate at least a portion of the IC.

This figure also illustrates SRAFs 1520-1523 that have been added to the mask image 1500. In some embodiments, these SRAFs 1520-1523 were added to the mask image 1500 during one iteration of optimization. In other embodiments, the SRAFs 1520-1523 were added to the mask during multiple iterations of optimization.

FIG. 15B illustrates the mask image 1500 after at least one more iteration of optimization. In this figure, additional SRAFs 1524-1526 are now included in the mask image 1500. These SRAFs 1524-1526 may have been added during one or more additional optimizations. In addition, SRAF 1521 was removed from the mask image 1500 as shown in FIG. 15A (e.g., because an optimization iteration determined that SRAF 1521 made the mask image 1500 less optimal rather than more optimal).

Figure 16:
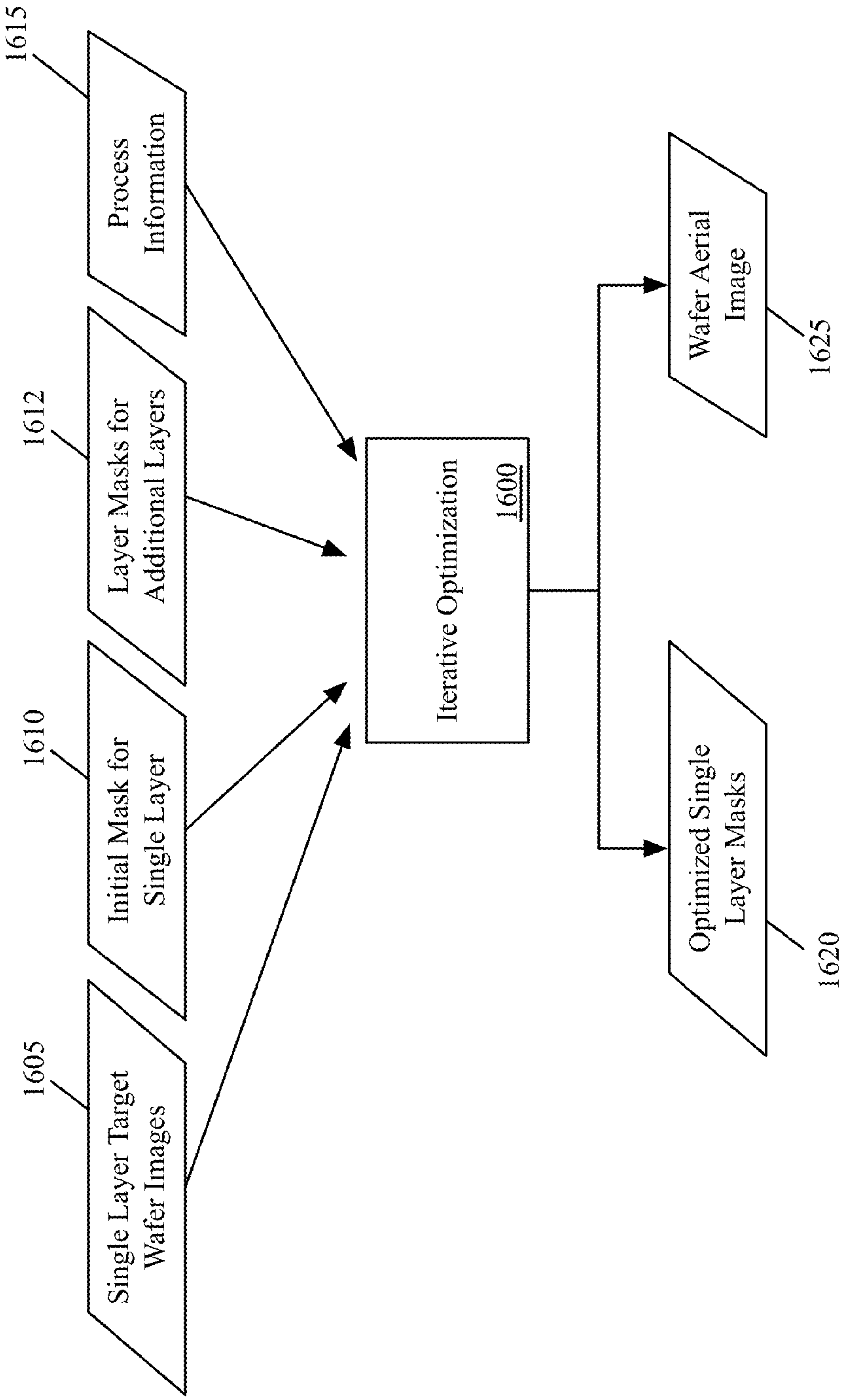
FIG. 16 conceptually illustrates an example of a high level mask image optimization process that uses inputs corresponding to multiple layers to produce an optimized mask image for a single layer.

In some embodiments, rather than focusing on a single layer's mask image(s) during optimization, some embodiments also account for other layers during the process of optimizing the mask(s) for a particular layer. FIG. 16 conceptually illustrates an example of a high level mask image optimization process that uses inputs corresponding to multiple layers to produce an optimized mask image (or optimized set of multiple mask images) for a single layer. As shown, the inputs to this optimization process 1600 include the target wafer image 1605 for the single layer (i.e., the single layer being optimized). In addition, the inputs include the initial mask 1610 for the single layer being optimized as well as layer masks 1612 (which, in some embodiments, may already have been optimized) for additional (e.g., neighboring) layers. In some embodiments, the full set of mask images 1610 and 1612 includes multiple masks for a set of neighboring layers, such as a via layer and a neighboring metal layer, a metal layer and its two neighboring via layers, or a via layer and its two neighboring metal layers. A secondary input is the process information 1615 (e.g., process model, process variability or conditions, etc.) for the wafers, and the mask rules that the single-layer mask image often follows.

Rather than only including the operations shown in FIG. 12, the iterative mask image optimization process 1600 includes one or more operations in which the information for adjacent layers is considered in addition to the main layer under optimization. For instance, in some embodiments the iterative optimization process also performs wafer simulation for the neighboring layers (at least the first iteration, as the wafer simulation does not need to be performed each iteration if the masks of the neighboring layers are not changed between iterations). In addition, the loss function may include additional terms (i.e., in addition to the comparison term for the layer being optimized) that factor in analysis of multiple layers of simulated wafers (e.g., analysis of overlaps between metal and via layer shapes). This analysis can include z-axis analysis, conjunctive analysis, and/or simplified conjunctive analysis in some embodiments.

The primary output of the iterative optimization is again a single-layer mask image 1620, optimized in order to produce a wafer image as close as possible to the input target wafer image 1605. Secondary outputs include one or more wafer aerial images 1625, such as a wafer image at a nominal process condition set. In some embodiments, the secondary outputs include one or more additional wafer images at other process conditions (representative of those produced in response to manufacturing dose and depth-of-focus variations).

Before optimizing the primary layer's mask image, some embodiments perform traditional (single-layer) mask image optimization for the adjacent layers. In such embodiments, for these adjacent layers, a standard loss function (e.g., Equation 3 described above) is employed by the optimizer, with each of these adjacent layers optimized independently of any other layers. In some embodiments, each adjacent layer's traditional optimization produces corresponding wafer images as a secondary output. When performing mask image optimization for the primary layer based on the mask images for that layer and the adjacent layers, some embodiments employ additional loss or error terms that are calculated based on the multiple wafer images (i.e., the simulated wafer images for the primary layer as well as the adjacent layers) and included in the loss function.

Figure 17:
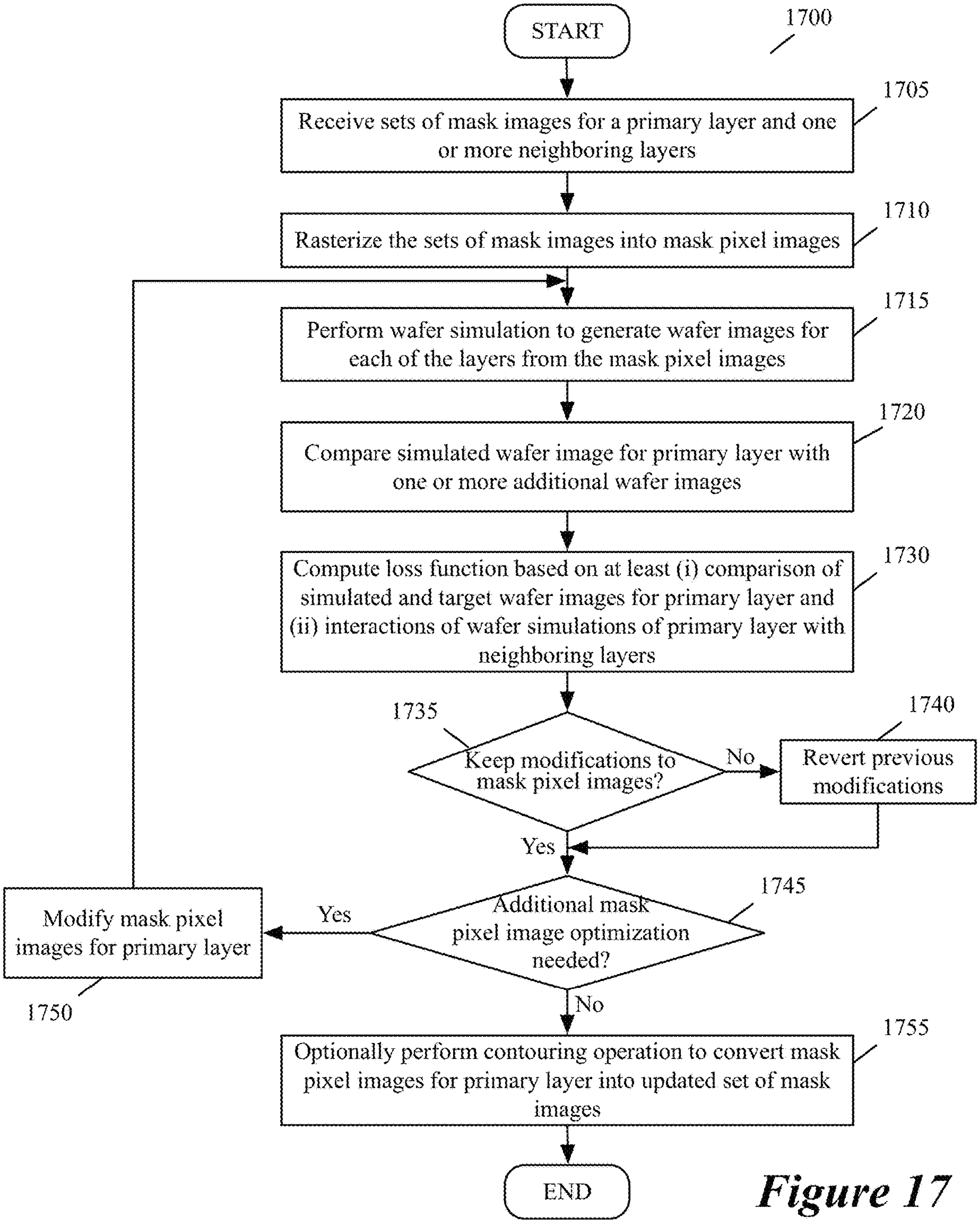
FIG. 17 conceptually illustrates a process of some embodiments for performing wafer simulation to optimize a mask layout for a single layer of an IC design layout.

FIG. 17 conceptually illustrates a process 1700 of some embodiments for performing wafer simulation to optimize a mask layout for a single (primary) layer of an IC design layout while accounting for other layers of the design layout. The design layout is a design for fabricating the IC (i.e., for fabricating the multiple layers of the IC) and the mask layout is used to generate a set of masks that will be used to fabricate the IC based on the design layout. In some embodiments, a mask design or mask production tool (or another EDA tool) performs the process 1700 to optimize one mask image corresponding to the primary layer in order to produce one or more optimized masks for fabricating that layer. In other embodiments, the process 1700 is performed to optimize a set of multiple mask images for the primary layer in order to produce a set of masks for fabricating that single layer. In optimizing these masks, the mask design process accounts for the predicted manufactured shapes of components of multi-layer interfaces (MLIs) that span the primary layer by also accounting for the predicted manufactured shapes (or idealized manufactured shapes) of the components of those MLIs in other layers.

As noted, an MLI is present when two or more IC components in two or more layers of the design layout (e.g., a via and an interconnect wire segment, a contact and an interconnect wire segment, two wire segments in two different metal/wiring layers) form a z-axis component and need to be aligned. Thus, for a metal layer, each portion of an interconnect wire segment that overlaps with a z-axis connection (e.g., a via, a contact, etc.) belongs to an MLI that includes the interconnect wire segment and the z-axis connection. For a via layer, each via belongs to two different MLIs with the two metal layer interconnect wire segments that are connected by the via (in two different layers).

The process 1700 begins by receiving (at 1705) a mask layout that includes sets of mask images for a primary layer and, in some embodiments, for one or more neighboring layers. The mask layout includes mask images that will be used to produce the layers of the design layout, including the primary layer and the neighboring layers. In some embodiments, any layers adjacent to the primary layer are included (e.g., for a metal (wiring) layer, one or more via layers). In some embodiments, MLIs can span more than two layers or can span non-adjacent layers (e.g., a capacitor formed between two metal layers). The mask images, after optimization, are used in some embodiments to generate sets of one or more masks for each layer. Specifically, each mask is used in manufacturing of its corresponding layer. For example, the mask(s) fabricated from the set of mask images for the primary layer are used to manufacture the primary layer, and the mask(s) fabricated from the set of mask images for each neighboring layer are used to manufacture each of these neighboring layers.

Next, the process 1700 rasterizes (at 1710) the sets of mask images into respective sets of mask pixel images. Because the sets of mask images define at least a portion of the mask layout in the geometric domain, these mask images are rasterized (pixelized) to define that portion of the mask layout in the pixel domain. Each mask pixel image in corresponds to a different mask image the respective set of mask images. It should be noted that other embodiments perform all of the operations in the contour domain, in which case the rasterization operation 1710 can be skipped.

In some embodiments, the image rasterization produces white pixels for fully-filled pixels (e.g., pixels that are not covered by any transparent shapes and thus represent fully opaque areas of the corresponding masks), black pixels for fully-empty pixels (e.g., pixels that are fully covered by transparent shapes and thus represent fully transparent areas of the corresponding masks), and grey pixels for partially-filled pixels (i.e., pixels that are partially covered by one or more transparent shapes). In some of these embodiments, fully filled pixels are represented with the numerical value 1.0, fully empty pixels are represented as 0.0, and partially filled pixels are represented with a value in the range [0,1] representative of the area of the pixel which is filled by transparent areas (e.g., a pixel that is 50% filled will have a value of 0.5). Before rasterizing a mask image, some embodiments decompose the mask image into several sections (e.g., several transparent areas or transparent area portions), which are then individually rasterized.

Figure 18:
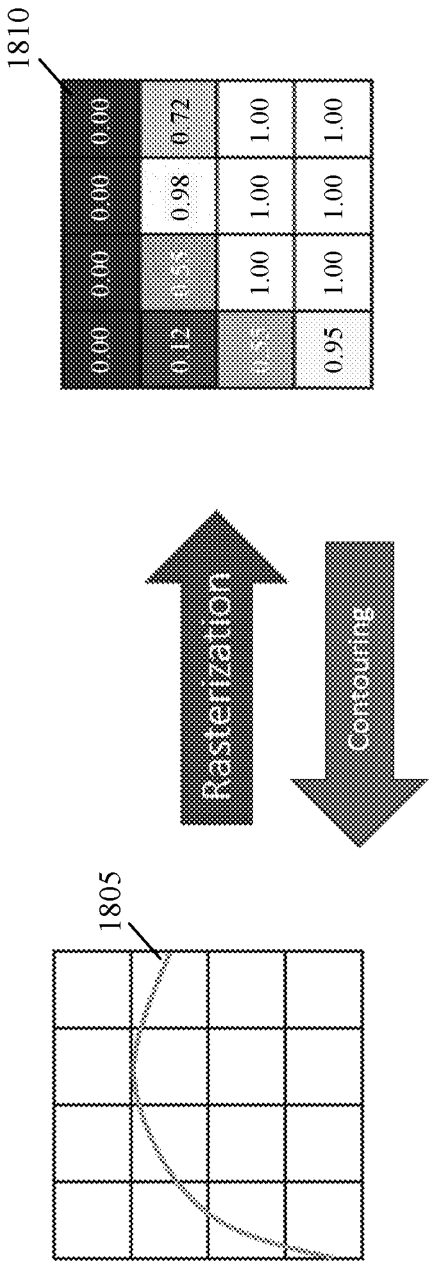
FIG. 18 illustrates an example of a curved edge that is converted into a pixel-dose map through rasterization.

A rasterized mask image is also referred to as a pixel dose map, and the numerical values referred to as pixel dose values. FIG. 18 illustrates an example of a curved edge 1805 that is converted into a pixel dose map 1810 through rasterization. This is an example of a raster tone map (RTM), in which the pixel data that is created by rasterization has three kinds of pixels: exterior pixels with a pixel dose value 0, interior pixels with a pixel dose value 1 and edge pixels with pixel dose values greater than 0 and smaller than 1.

In some embodiments, edge pixels correspond to the areas where the original geometry data had an edge, and the dose value of any one pixel corresponds to the area of the pixel covered by that geometry data. The accuracy of rasterization depends on the pixel size used for sampling the geometries such that the pixel value, or dose, indicates the normalized area of the geometry data overlapping the corresponding pixel area. As indicated in FIG. 18, contouring is the opposite process to rasterization. Contouring reconstructs the geometry data from the pixel data.

Instead of RTMs, other embodiments use continuous tone maps (CTMs) or quantized tone maps (QTMs). In such tone maps, the pixel values are in a range that starts below a threshold value and ends above a threshold value. In CTM or QTM, the data typically varies more gradually from pixel to pixel than the rasterized data. Also, in some embodiments of CTM or QTM, the pixels with values below the threshold value are exterior pixels, the pixels with values above the threshold value are interior pixels, and the pixels with values at or near the threshold values are edge pixels. CTM and QTM values are often used when the source of pixel data is computational lithography. QTM values are quantized two-dimensional values of a continuous function and the pixel values do not directly encode the area coverage.

Since both rasterization and contouring operations are computationally intensive, some embodiments stay in the pixel-based computing domain for purposes of efficiency. For instance, mask image optimization of some embodiments is performed completely in the pixel domain (i.e., mask pixel images are optimized rather than mask contour images from which the mask pixel images were rasterized) in order to eliminate the need for conversion to and from the contour domain.

In some embodiments a machine-trained (MT) network (e.g., a neural network) is used to rasterize the sets of mask images. In such embodiments, this MT network receives the sets of mask images and generates the sets of mask pixel images as output. Other embodiments rasterize the sets of mask images using other algorithmic processes or any other suitable process.

Next, the process 1700 performs (at 1715) a wafer simulation operation to generate wafer images for each of the layers (i.e., the primary layer and the one or more neighboring layers) from the sets of mask pixel images. The process 1700 generates, from a given set of mask images for a layer, a corresponding set of one or more wafer images including representations of IC components that are predicted to be manufactured on that layer (i.e., the predicted manufactured shapes for these IC components). That is, the wafer simulation simulates what would be manufactured on a wafer using masks generated from the set of mask images for a layer.

Some embodiments perform a set of operations (e.g., referred to above mathematically as a forward operator) to perform the wafer simulation, which simulate the different steps in manufacturing an IC using a set of masks. Further information regarding these wafer simulation operations to generate wafer images from mask pixel images will be described below. In other embodiments, the wafer simulation operation is performed by an MT network (e.g., a neural network, different from the network used to generate the mask pixel images). In such embodiments, this MT network receives each set of mask pixel images for a layer as input and produces the corresponding set of wafer images for the layer as output. In still other embodiments, the wafer simulation operation is performed using other algorithmic processes or any other suitable process.

In some embodiments, the wafer simulation is performed for the primary layer each iteration of the operations 1715-1740, because the mask pixel images for this primary layer may be modified at each iteration. On the other hand, the mask pixel images for the neighboring layers are not modified during the process and thus wafer simulation only needs to be performed once for these neighboring layers in some embodiments. In some such embodiments, the wafer simulation operations can even be performed beforehand so that the mask images of the neighboring layers are not needed as inputs to the process (i.e., the precomputed wafer images are used as inputs for these neighboring layers). Furthermore, some embodiments use idealized versions of the other neighboring layers (e.g., the design layout or a target image based on the design layout) rather than simulated wafer images for the neighboring layers. In addition, if the MLIs are used to inform weights for the comparison of the simulated wafer image to the target image for the primary layer, then some embodiments only simulate the wafer image for the primary layer.

Next, with the wafer images having been simulated based on the mask pixel images, the process 1700 compares (at 1720) the simulated wafer image for the primary layer with one or more additional wafer images. This may involve comparing the simulated wafer image for the primary layer to the target image for that layer as well as to simulated and/or idealized images for one or more additional layers.

As at least one portion of these comparisons, the optimizer compares the simulated wafer image and the target wafer image for the primary layer. A target wafer image, in some embodiments, represents the desired placement of the IC components on the corresponding wafer. For example, a target wafer image for a metal layer shows the desired placement and shape of each metal segment for that layer. Hence, to determine whether a simulated wafer image for the metal layer meets criteria that specifies how the metal segments should be fabricated, the simulated wafer image is compared with the target wafer image. As described above, the target wafer image often does not exactly match the design layout, because the design layout may have non-manufacturable straight lines and sharp corners. Instead, the manufacturing process will typically result in some curvilinear features, such as rounded corners. A target wafer image can be generated from layers of a design layout using various methods for transforming these sharp lines and corners into more rounded (and thus more physically manufacturable) features, such as a low pass filter, Gaussian convolutions, or another corner rounding algorithm.

In some embodiments, the simulated and target wafer images are compared by computing a loss function term that quantifies a difference between the primary layer simulated wafer images and the target wafer images for that primary layer. The loss function of some embodiments, when used for optimizing a layer, includes a different term for each wafer image for that layer and for each target wafer image for that layer.

The loss function term that compares the simulated image for the primary layer to the target image for that layer also accounts for the overlaps with other layers in some embodiments. Specifically, rather than treat all of the differences between the simulated image and the target image equally, some embodiments weight different portions of the simulated wafer shapes more heavily based on their relevance to MLIs. Specifically, in some embodiments, sections along each contour (e.g., each pixel or a subset of the pixels) is assigned a weight value, which weights the cost incurred based on that section being different from the target image. The overlapping regions are assigned higher weight values than the non-overlapping regions, and within an overlap more critical regions are assigned higher weight values than less critical regions. The loss function therefore weights differences in the more critical regions the highest, and thus the optimization process is biased towards solutions (i.e., mask images) that focus most on aligning the most critical regions with the target image.

Some embodiments both compare the simulated image for the primary layer to the target image along with additional comparisons of at least portions of the simulated image for the primary layer to simulated (or idealized) images for the other layers, in order to account for the MLIs. In some such embodiments, all portions of the simulated wafer shapes are treated equally in the single layer comparison. Different embodiments use different techniques to perform the additional (multi-layer aware) comparisons, which involve comparing the shapes of components on the primary layer with the shapes of components on other layers. Specifically, some embodiments compare the predicted shape (or multiple predicted shapes) in the simulated wafer image for the primary layer component with the predicted shape or shapes in the simulated wafer image for the other layer component to quantify a predicted aggregate shape for the MLI. Different embodiments compare the predicted shapes in the different layers by assessing the similarity and/or the differences of the shapes (e.g., looking for the contours of the shapes to line up), or the extent of the correlation between the shapes. Other embodiments compute the intersection of the shapes (i.e., the overlap of the two shapes, irrespective of whether the contours line up).

In performing the comparison, some embodiments treat overlap regions of the predicted shapes as more important to the loss function computation than non-overlap regions. Furthermore, when performing the comparison within an overlapping region (i.e., when directly assessing the MLI), some embodiments treat certain portions of that overlap region (e.g., those portions most critical to maintaining an adequate overlap) as more important than other portions of the overlap region (e.g., edges that are less likely to affect the adequacy of the overlap if moved). Some embodiments assign weight values to different portions of the predicted shape for a component that quantify the importance of that portion of the shape for establishing and maintaining the MLI (i.e., their importance to the resiliency of the overlap between shapes from multiple layers). Different embodiments may perform these comparisons in different manners.

Some embodiments compare a single predicted shape for the primary layer component of the MLI with a single predicted shape for the other layer component. Specifically, such embodiments use the nominal predicted shape without any misalignment for each of the components to perform this comparison. Other embodiments, however, account for multiple variations of the predicted shapes either on all of the layers being evaluated or at least on the primary layer. For instance, some embodiments account for manufacturing process variations in at least two different dimensions of (i) component shape size (e.g., due to different exposure and/or depth of focus variations) and (ii) component misalignment. As described above, some embodiments compute the predicted shapes accounting for minimum, nominal, and maximum process variations (where minimum and maximum process variations may represent a particular number of standard deviations in different directions from the nominal process variation, or another measure that is not necessarily the most extreme process variation possible). In addition, some embodiments compute the predicted shapes accounting for potential misalignments in at least the four cardinal directions within the plane of the layer. Thus, some embodiments compute fifteen different predicted shapes for each layer, accounting for five different options in the misalignment dimension of manufacturing process variations (four cardinal directions as well as the option with no misalignment) and the three different options in the size dimension of manufacturing process variations (maximum, nominal, and minimum). Other embodiments may also include different or additional options in the size dimension of manufacturing process variations and/or additional misalignments, such as misalignments in the ordinal (intercardinal) directions.

Whether performing one comparison or multiple such comparisons, different embodiments also use different techniques to perform the comparison and generate a value that can be assessed in the loss function for a given MLI. For instance, some embodiments enumerate the different possible predicted shapes (as described above) and intersections between these shapes in different layers. Some such embodiments calculate a resiliency score based on the minimum overlap of the predicted shapes from the primary layer and the other layer. If, for instance, fifteen different comparisons between predicted shapes in two layers are made, some embodiments identify the worst case of these fifteen comparisons (e.g., the smallest area) and use that to calculate a score for the MLI. As described below by reference to FIG. 24, other embodiments take each of these comparisons and then compute an intersection between them, which will be equivalent to or worse than the worst case of the individual comparisons. Some embodiments compute the area of this minimum overlap and use the area to compute the score for the MLI.

Other embodiments use a set of evaluation points for each shape in the primary layer that is part of an MLI. In this case, some embodiments weight the evaluation points based on whether the evaluation points are part of the overlap region of the shape and thus have an effect on the MLI. For those evaluation points that are within the overlap region, some embodiments designate points as more or less critical to the overlap (as in the approach described above that assigns weights for points in the comparison to the target image). Weights are assigned to the evaluation points based on these different categories, and the evaluation points for each shape are compared against the simulated wafer image of the appropriate neighboring layer. In some such embodiments, the optimization process evaluates whether each evaluation point is located on the correct side of the boundary of the shape in the other layer (e.g., on the interior or exterior of the shape). Some embodiments assign a cost to each evaluation point, with these costs then weighted (i.e., using the assigned weights).

Still other embodiments may use other, different techniques to compute the loss function term that accounts for the MLIs. For instance, some embodiments calculate tolerance regions for each primary layer component shape in the simulated region, which are used to constrain the boundaries of that primary layer shape (by assessing a cost for the primary layer shape extending outside the tolerance region). Some embodiments define the tolerance region for a given primary layer shape based on the location and shape of the shape in the other layer with which the primary layer shape forms an MLI (as well as the shape of the primary layer component). In this formulation, the primary layer shape can be anywhere within the boundaries of the tolerance region (although the location of the primary layer shape is still constrained based on the single-layer cost). Some such embodiments assess no cost for the primary layer shape being contained within the tolerance region, then assess additional cost based on the extent to which the primary layer shape extends outside of the tolerance region.

Returning to FIG. 17, the process 1700 then computes (at 1730) a value for a loss function based on at least (i) a comparison of the simulated and target wafer images for the primary layer and (ii) interactions of the wafer simulations of the primary layer with the neighboring layers (e.g., with the primary layer). In some embodiments, this loss function is given by a variation to Equation 3, in which each evaluation point is weighted based on its importance to an MLI. Other embodiments use Equation 5 below, which includes weighted terms for the single-layer comparison and for the MLIs (with additional optional weighting of each MLI within the MLI term).

More specifically, to incorporate the cross-layer alignment issues (the MLIs), the loss function of some embodiments includes a manufacturability score associated with various locations of the simulated wafers (i.e., locations at which MLIs are present). Conjunctively or alternatively, in some embodiments, the loss function also includes an extreme process variation score associated with all layers for which wafer images were produced during the wafer simulation. In other embodiments, the consideration of process variations is incorporated into both the comparison term (i.e., comparing the simulated and target wafer images) and the total manufacturability score term of the loss function.

When split into two separate terms, the total manufacturability score relates to misalignment issues that can occur when manufacturing multiple layers of an IC, while the extreme process variation score relates to varying process conditions that can occur when manufacturing one or more layers of an IC. Both the total manufacturability score and the extreme process variation score can be computed based on z-axis analysis (e.g., z-axis analysis, conjunctive analysis, simplified conjunctive analysis) in some embodiments.

The process 1700 then determines (at 1735) whether to keep the last set of modifications made to the mask pixel images. In some embodiments, this is an assessment as to whether the last set of modifications made the simulated wafer image better or worse (e.g., as measured by the loss function). Some embodiments perform the assessment on the basis of the overall wafer image (i.e., the total loss function computation). Other embodiments assess each predicted wafer shape and/or each MLI individually and determine for each wafer shape and/or each MLI whether or not to keep the modifications made to the mask layout that are identified as relevant to that shape and/or MLI.

Some embodiments strictly keep a mask layout modification when the modification makes the predicted wafer shape worse and revert a modification when the modification improves the predicted wafer shape. Other embodiments, in order to escape local minima of the loss function (i.e., with the goal of finding a better local minima), will sometimes accept modifications that worsen a predicted wafer shape (or the overall simulated wafer). Typically, the iterative optimization process is more willing to accept such worse solutions earlier in the optimization process (i.e., in the earlier iterations) while more of the solution space is explored, as compared to later in the optimization process.

If the optimization process determines to not keep the modifications to the mask pixel images, the process 1700 reverts (at 1740) the previous modifications. As noted, some embodiments perform this assessment and reversion for the entirety of the modifications to the mask images, while other embodiments perform the assessment and reversion individually for each modification to the mask layout (e.g., for each shape and/or MLI in the predicted wafer).

The process 1700 then determines (at 1745) whether additional pixel image optimization is needed. Some embodiments use a set of one or more criteria to determine whether mask pixel image modification is needed. Specifically, some embodiments require a minimum deviation of the primary layer wafer image(s) from the target image(s) for that layer. Such a criterion specifies how close the simulated wafer images based on the current mask images should be to the target images in order to consider the mask images optimized.

In some embodiments, the set of criteria for determining whether to make additional modifications to the mask images specifies a minimum threshold value for the loss function such that if the total loss function is below this threshold then modification is no longer needed. In other embodiments, the mask image modification is performed for a specified number of iterations, after which point the process 1700 exits from the iterative modification loop. Yet other embodiments perform the modification for a maximum number of iterations but can exit the loop earlier if the loss function value falls below a threshold.

If additional mask pixel optimization is needed, the process 1700 then modifies (at 1750) the mask pixel images for the primary layer. In some embodiments, modifications to a mask pixel image includes the addition, removal, modification, or migration of one or more SRAFs in a mask pixel image (by changing one or more pixel values of one or more pixels in the mask pixel image). SRAFs are additional transparent areas in a mask that let more light through onto the substrate (i.e., the wafer) without creating additional shapes for any of the layers on the substrate. The modifications can also add, remove, or modify the primary shapes in the mask that correspond to the desired IC components of the primary layer (e.g., enlarging or shrinking one or more sides of these shapes).

To identify modifications to the mask images, some embodiments use the loss function and its terms to compute a set of one or more gradients. In some such embodiments, the process computes gradients of the loss function with respect to each pixel in the mask pixel image. In other embodiments, the process computes gradients of the loss function (i) with respect to each pixel in each of the primary layer wafer simulation images and (ii) with respect to each area of intersection between predicted IC components in the primary layer and components in the neighboring layers.

In some such embodiments, the optimizer computes gradients of the wafer image comparison term of the loss function with respect to each pixel of the mask image. The mask image optimizer also computes gradients of the cross-layer interaction term with respect to each MLI. These gradients allow the optimizer to identify which pixel or pixels of a mask image to modify, and how much to modify the identified pixels.

Based on these gradients, one or more predicted IC components and one or more pixels of those predicted IC components are identified as needing modification. In identifying that placement of one or more predicted IC components have to be modified based on placement of one or more other predicted IC components, the optimizer identifies at least one modification to make to at least one mask pixel image in the first mask pixel image set.

When performing multiple iterations of optimization, in some embodiments the gradients also indicate to the optimizer which pixels that were previously modified are producing better or worse shapes in the simulated layouts than prior to that most recent modification. For example, during a first iteration of optimization, the optimizer might identify that a particular pixel value of a particular mask image should be increased (e.g., pushing an edge of a mask shape in a particular direction). During a second iteration of the optimization, if the optimizer identifies from the newly computed gradients that the particular pixel is producing a worse corresponding predicted manufactured shape in the simulated wafer than prior to the attempted optimization (i.e., that the new value of the pixel causes the mask image to result in a simulated wafer image less like the target wafer image), then the optimizer will instead decrease the particular pixel during the second optimization iteration.

To determine the modifications to make to the mask shapes (i.e., the shapes in the mask pixel images or directly in the mask images), some embodiments use a correlation between design layout shapes (which correspond to the components of the eventually manufactured IC and the predicted component shapes of the simulated wafer) and the mask shapes. Referring to FIGS. 13 and 14A-B, each of the design layout shapes 1301-1306 has a corresponding set of one or more mask shapes 1411-1419. For instance, the mask shapes 1414 and 1418 in FIG. 14A (as well as SRAF shapes 1420 and 1421 in FIG. 14B) are used to produce the component corresponding to the design layout shape 1304.

Thus, if the application of the loss function identifies that certain changes need to be made to a specific portion of a predicted component shape in the simulated wafer image, the optimization process translates those changes into changes to the corresponding mask shapes. These changes can include modification or movement of the existing mask shapes as well as addition of new mask shapes or removal of existing mask shapes (e.g., addition or removal of SRAFs). Some embodiments directly translate from the gradients to mask shape modifications. For instance, in some embodiments these gradients specify directions in which to modify each pixel of the mask pixel image, which results in modified mask shapes.

In other embodiments, the mask shape modifications are based more on the correlation of the predicted manufactured component shapes and the mask shapes. Specifically, some embodiments compute the changes that should be made to the predicted manufactured component shapes (e.g., enlarging certain portions of these shapes, shrinking portions of the shape, stretching the shapes, etc.) in order to meet both the loss function components (matching the target wafer image and assuring overlap resiliency to process variations such as misalignment). From these desired changes to the predicted manufactured shapes, the optimization process determines changes to the mask shapes likely to cause the desired changes during manufacturing and applies these changes to the mask pixel image.

Figure 19:
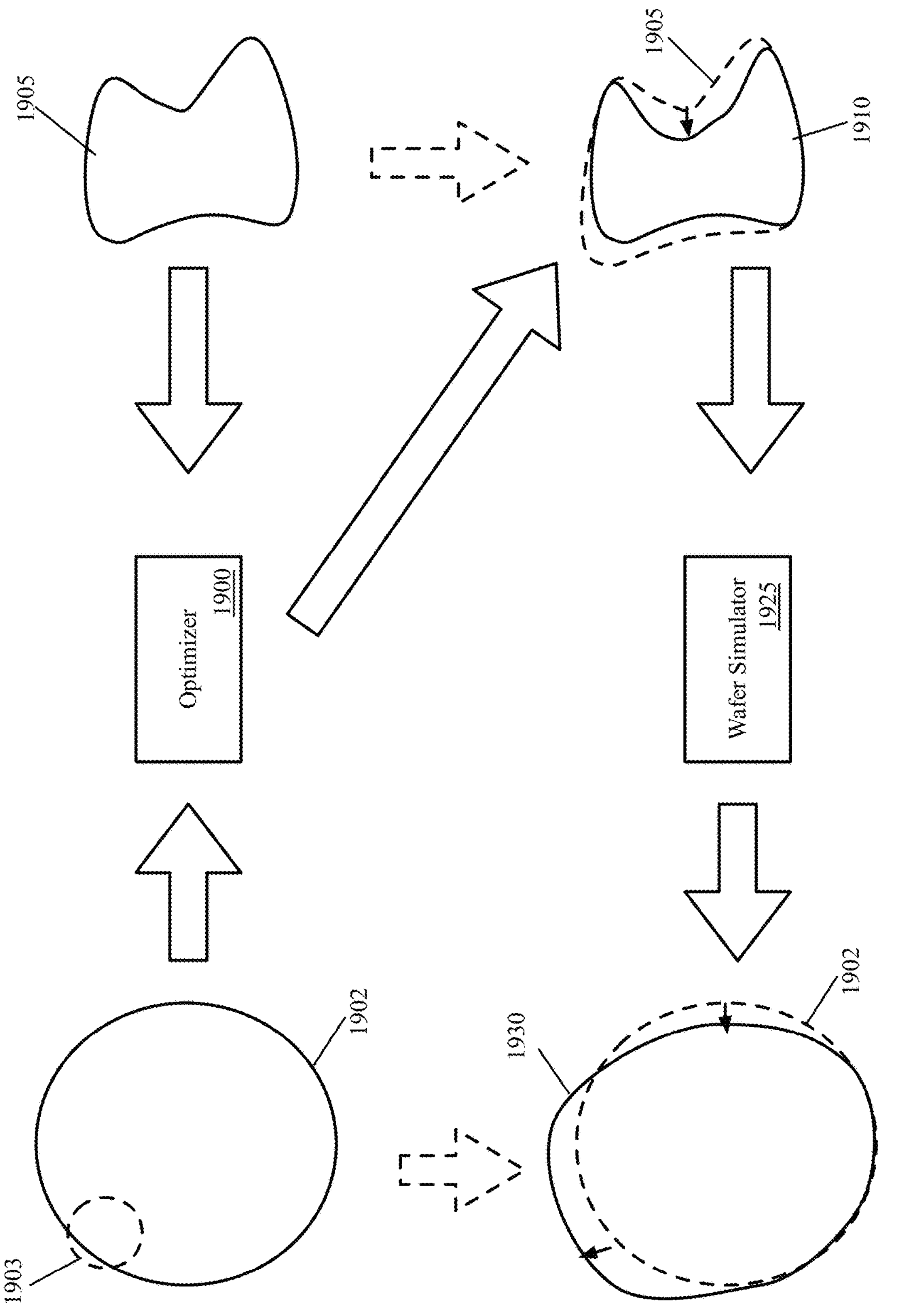
FIG. 19 conceptually illustrates an optimizer modifying contours of a circular metal plate shape.

FIG. 19 conceptually illustrates an optimizer modifying contours of a circular metal plate shape 1902 (e.g., representing a plate of a capacitor). As shown, an optimizer 1900 takes as input the circular shape metal plate 1902 and a current mask layout shape 1905 that corresponds (at least in part) to the metal plate shape 1902 in the simulated wafer image. As discussed above, in some embodiments shapes in the mask layout do not necessarily map 1:1 to the shapes manufactured on the wafer (or predicted on the simulated wafer). Additional mask shapes, such as smaller SRAFs and neighboring mask shapes that primarily affect other wafer shapes, may also have an effect on the manufactured (and simulated) wafer shapes.

The metal plate shape 1902 does not currently overlap with a via shape 1903, so the loss function used by the optimizer 1900 indicates that it is important for the boundary of the metal plate shape 1902 to be moved outward in this upper left region of the shape. As such, the optimizer 1900 outputs a modified mask shape 1910 (while also modifying other mask layout shapes in the same neighborhood of the mask layout). The modified mask shape 1910 is shown in solid line compared to the dashed line used for the previous mask shape 1905. The arrows show that the right side of the mask shape 1910 is pulled inwards but the right side is pulled outwards (to the left). The modifications to the right side could be because the target wafer shape is narrower than the simulated wafer shape 1902 and there are no constraints on the right side of the shape 1902 because the multi-layer overlap is located on the left side of the shape. The figure also shows that when the new mask shape 1910 is provided to the wafer simulator 1925 (along with the rest of the mask layout or at least a region of the mask layout), the wafer simulator 1925 outputs a modified oval shape 1930, which will now fully overlap with the via shape.

Having made the modifications to the mask pixel images for the primary layer, the process 1700 then returns to operation 1715 to perform wafer simulation using the modified set of mask pixel images for the primary layer. As noted, in some embodiments, wafer simulation only needs to be performed by the primary layer each iteration because only the primary layer mask images are modified.

On the other hand, once the process 1700 determines that mask pixel image modification is not needed, the process 1700 optionally performs (at 1755) a contouring operation to convert the mask pixel images for the primary layer into an updated set of mask images. In some embodiments, this operation is performed when at least one modification to at least one mask pixel image was made. In the unlikely case that no modifications were made, the set of mask images still corresponds to the set of mask pixel images, and the contouring operation is not necessary. After this conversion is performed, the process 1700 ends.

The above process 1700 describes modifying mask pixel images at each iteration. It should be noted that other embodiments modify the mask images (i.e., the contoured mask images) rather than the mask pixel images. In some such embodiments, modifications are made to a mask image by modifying, adding, and/or removing mask shapes in the mask image, as opposed to the pixel value changes that can be made to mask pixel images. Because mask images themselves are modified in these embodiments, after modifying at least one mask pixel image for the primary layer, the process 1700 returns to operation 1710 to rasterize the modified set of mask images into a modified set of mask pixel images, which are then used in the wafer simulation operation.

In some embodiments, the primary layer (i.e., the layer being optimized) is a metal layer of the design layout and at least one neighboring layer is a via layer of the design layout. In such embodiments, the simulated wafer images of the primary layer include the metal line end components and via pads (if present) of the metal layer as well as the via holes of the neighboring via layer. If there is not proper overhang of a particular metal line end on its corresponding via hole (or on the corresponding via pad, if via pads are present), then the mask image(s) of the primary layer are modified to rectify the issue. Adding, removing, modifying, and/or migrating of SRAFs can be performed for one or more mask images to attempt to fix these overhang issues. It should be noted that optimization of the overhang between wire segment and adjacent via is merely one example, and that other types of interfaces between layers (e.g., between a metal layer and a contact layer) can be optimized as well.

In some embodiments, the primary layer is adjacent to multiple layers of the design layout (e.g., a metal layer adjacent to two via layers or to a via layer and a contact layer, a via layer that is adjacent to two metal layers, etc.). In some such embodiments, the process considers interactions between the primary layer and two or more layers. For instance, one end of a wire segment in a metal layer might intersect a via in a first via layer while the other end of the same wire segment intersects a via in a second via layer, and both of these intersections are considered for optimization purposes (i.e., both intersections factor into the loss function used for optimization). Some embodiments not only consider layers adjacent to the primary layer during mask image optimization, but also factor in interaction with other layers of the design layout as well (e.g., alignment between one metal layer (the primary layer) and a subsequent metal layer that connects to the primary layer with vias. One of ordinary skill would understand that any set of layers of a design layout (e.g., adjacent layers, non-adjacent layers, all layers of the design layout, all layers of a particular type, etc.) can be considered when performing wafer simulation to optimize mask images of one or more layers.

As described above, various different approaches can be used to incorporate consideration of additional layers into the optimization problem for a primary layer. As mentioned, some embodiments use a loss function term that compares the simulated image for the primary layer to the target image for that layer while accounting for the overlaps with other layers. Specifically, rather than treat all of the differences between the simulated image and the target image equally, some embodiments weight different portions of the simulated wafer shapes more heavily based on their relevance to MLIs.

Figure 20:
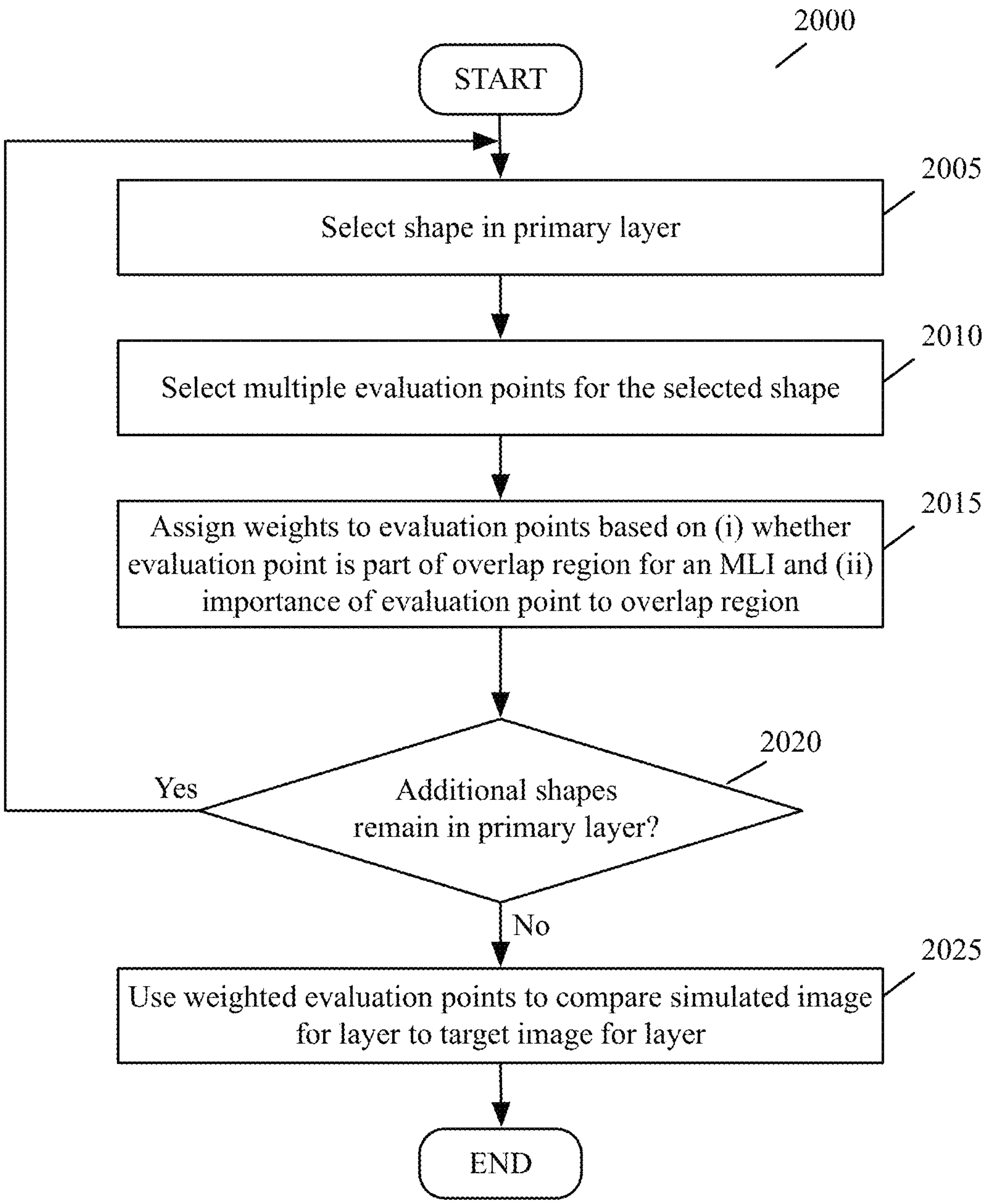
FIG. 20 conceptually illustrates a process of some embodiments for comparing the simulated image for a layer to the target image for a layer while accounting for overlaps.

FIG. 20 conceptually illustrates a process 2000 of some embodiments for comparing the simulated image for a layer to the target image for a layer while accounting for overlaps. The process 2000, in some embodiments, is performed by an optimizer at operation 1720 of FIG. 17 (i.e., at each iteration of the process 1700). This approach does not directly compare the shapes in the simulated image of the primary layer to the shapes in the neighboring layer but instead uses the presence of MLIs formed by components in the primary layer and a neighboring layer to weight the comparison between the simulated wafer and the target image for the primary layer.

As shown, the process 2000 begins by selecting (at 2005) a shape in the primary layer (i.e., the layer being optimized). In some embodiments, operations 2005-2015 are performed for each shape in the primary layer, irrespective of whether that shape belongs to an MLI or not. Other embodiments only perform the operations for the shapes that belong to MLIs. In addition, it should be understood that this is a conceptual process and that some embodiments perform these operations in parallel for multiple shapes at one time.

The process 2000 then selects (at 2010) multiple evaluation points for the selected shape. In some embodiments, these evaluation points are along the contour of the shape, while in other embodiments the evaluation points also include the interior of the shape. Furthermore, some embodiments compare areas between shapes when computing the loss single-layer loss function and thus also include evaluation points outside of each shape. In some embodiments, the evaluation points are each pixel in the wafer image either along the contour or throughout the entirety of the shape (e.g., for a pixelized wafer image), or a specific subset of the pixels (e.g., every other pixel, every fourth pixel, etc.). In other embodiments, the evaluation points are located different distances along a contour (for a contour-based wafer image). For instance, in some embodiments the distance between evaluation points is based on the gate pitch and or metal pitch used in the manufacturing process for the IC (e.g., a particular number of nm).

Figure 21:
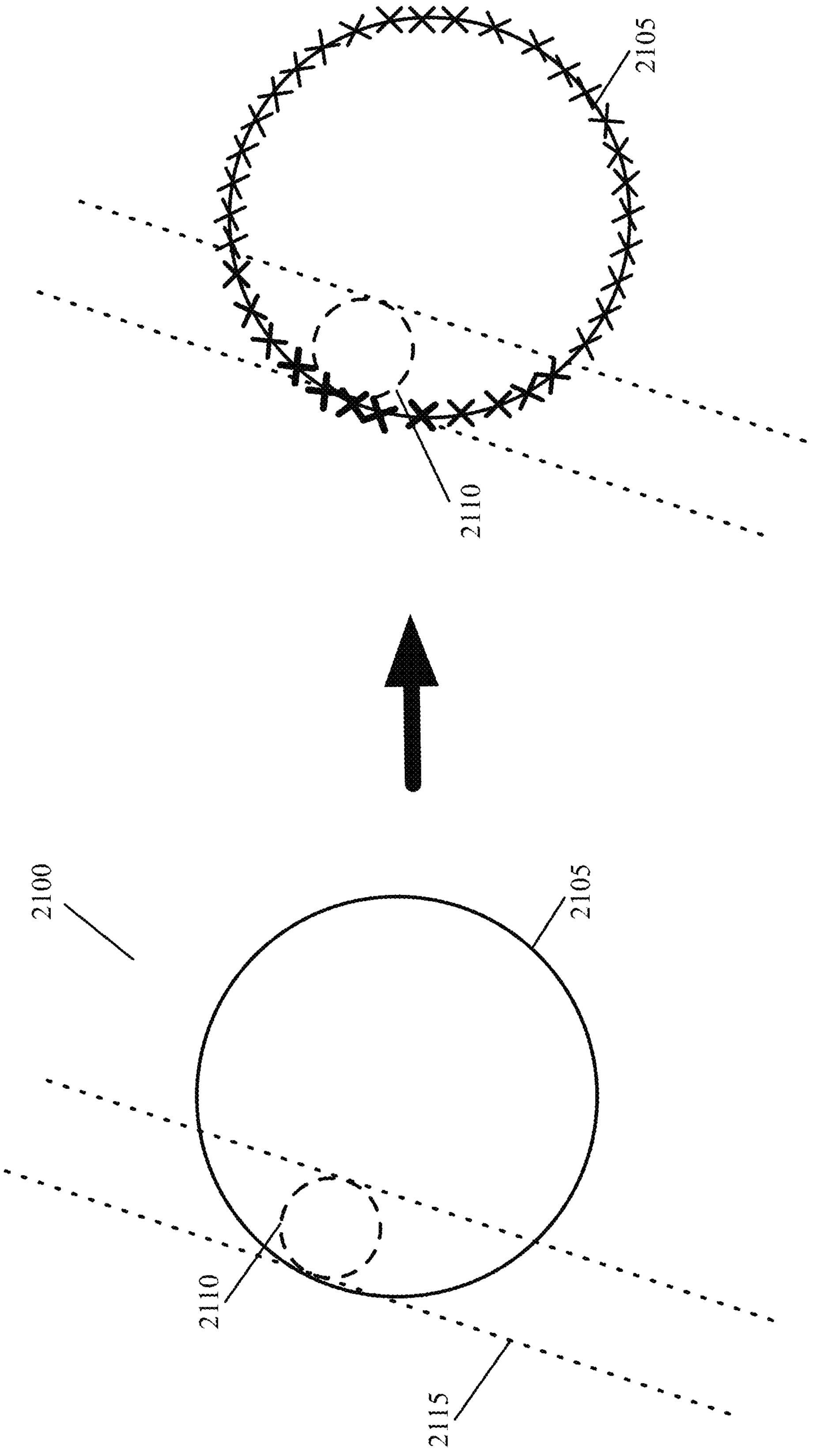
FIG. 21 conceptually illustrates a multi-layer interface between shapes in neighboring layers with a set of evaluation points identified along the contours of the primary layer shape in the simulated wafer image.

FIG. 21 conceptually illustrates a multi-layer interface 2100 between shapes in neighboring layers with a set of evaluation points identified along the contours of the primary layer shape in the simulated wafer image. The left side of this figure shows a larger circular shape 2105, which represents a plate in a metal layer (e.g., one half of a pair of plates that form a capacitor), in the context of multiple other layers with which the shape 2105 forms a multi-layer component. The capacitive plate represented by shape 2105 connects through a via, represented by a shape 2110 (i.e., in a neighboring via layer), to a wire represented by shape 2115 (i.e., in another metal layer). In this example, the overlap of concern is the metal plate and the via (the via layer can be separately optimized to ensure overlap with both the wire and the metal plate). The right side of the figure shows a set of evaluation points (represented by X's) defined for the primary layer shape 2105 representing a capacitive plate component. In this case, the evaluation points are selected along the contour of the shape 2105.

Figure 22:
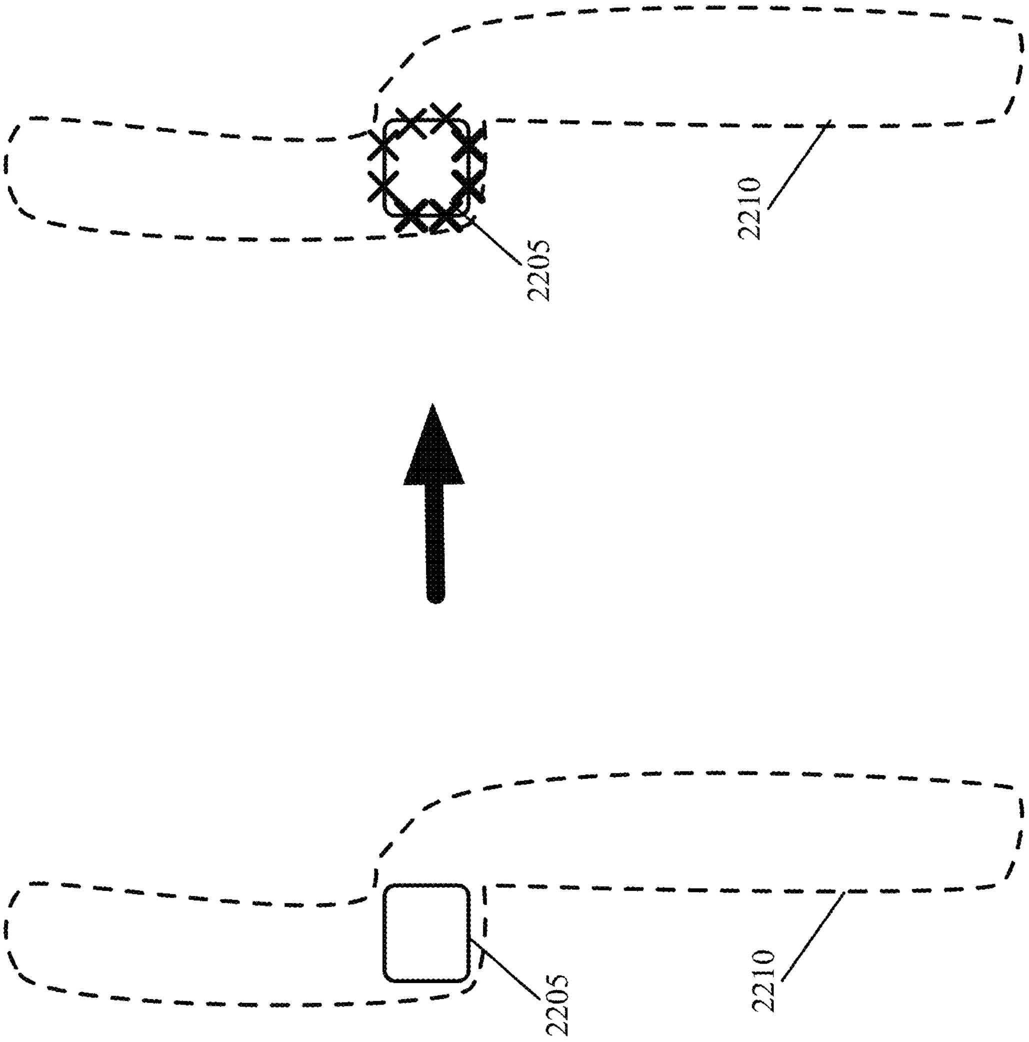
FIG. 22 conceptually illustrates another example of the selection of evaluation points, for a via shape that forms a multi-layer interface with a wire segment shape.

FIG. 22 conceptually illustrates another example of the selection of evaluation points, in this case for a via shape 2205 that forms a multi-layer interface with a wire segment shape 2210. The via shape is nestled into a bend in the wire segment such that the bottom and left sides of the via border the sides of the wire segment while the top and right sides of the via border the interior of the wire segment. The right side of this figure again shows a set of evaluation points (represented by X's) defined along the contour of the primary layer shape 2205 (the via component).

The process 2000 then assigns (at 2015) weights to the evaluation points based on (i) whether the evaluation point is part of an overlap region for an MLI and (ii) the importance of the evaluation point to the overlap region. In some embodiments, evaluation points that are not part of an overlap region (e.g., all points for components that are not part of any MLIs) are assigned the lowest weight value. Within an overlap region, evaluation points that are more critical to the resiliency of the MLI are weighted higher than less critical evaluation points.

Thus, in FIG. 21, the evaluation points closest to the via (shown using the thickest lines) are given the highest weights. The evaluation points that are further from the via but still within the overlap region (shown using lines with an intermediate thickness) are given an intermediate weight value, and the evaluation points completely outside of the overlap region are given the lowest weight value. In this case, the total overlap region is based on the area of the wire segment 2115 to which the via 2110 connects the metal plate 2105. It should be noted that the lowest weight values, for those points outside the overlap region are not necessarily zero values. The optimizer will still attempt to adjust the mask images such that these portions of the shapes match the target image but will be more willing to accept error for these portions than for more critical regions of the shapes.

In FIG. 22, all of the evaluation points along the via shape 2205 are part of the overlap region, as the via is fully enclosed by the wire segment shape 2210. However, two sides of the via 2205 border the wire segment (the bottom and left sides), whereas the other two sides border the interior of the wire segment (the top and right sides), due to the bent nature of the wire segment 2210 and the location of the via 2205. As such, the left and bottom sides of the via shape 2205 are deemed more critical to the maintenance of the MLI and the evaluation points on these sides are considered more critical (as shown by the thicker Xs in this figure).

In some embodiments, to identify the criticality and assign weight values to the evaluation points, the optimizer determines a distance between the evaluation points and the shape in the other layer. For instance, if the evaluation point is located on a first shape, some embodiments identify a line orthogonal to the tangent of the shape at that evaluation point, and determine the distance (i.e., within the x-y plane) from that evaluation point to the second shape (i.e., the shape in another layer). It should be noted that the simulated wafer images for two layers each have their own x-y plane, but these can be lined up by ignoring the z-axis and treating the two sets of shapes as being located within the same x-y plane (so long as those x-y planes are themselves aligned based on the design layout). If the evaluation point is on the interior of the second shape or is intended to be within the interior of the second shape (as is the case with the via shape 2205), some embodiments always consider this part of the overlap region, and then assign criticality (weight value) based on the distance. In the case of FIG. 22, the distance from the evaluation points on the top of the via shape 2205 and the right side of the via shape to the wire segment are significantly larger than the distances from the evaluation points on the bottom and left sides of the via shape 2205. If the evaluation point is on the exterior of the second shape and is intended to be (as is the case with the metal plate 2105), the point could be a non-overlap evaluation point. Other embodiments may use different computational techniques, or a user (e.g., a chip designer) can assign the weight values manually.

Returning to FIG. 20, the process 2000 determines (at 2020) whether additional shapes remain in the primary layer. Some embodiments assign evaluation points to all of the shapes representing all components in the layer, including those components that are not part of an MLI. For such shapes, all of the evaluation points are part of the non-overlap region and are assigned weights accordingly. If additional shapes remain, the process 2000 returns to 2005 to select the next shape and assign weights to the evaluation points of that shape.

Once weights have been assigned to evaluation points for the entire layer, the process uses (at 2025) the weighted evaluation points to compare the simulated image for the layer to the target image for the layer. In some embodiments, the simulated wafer image is compared to the target image by determining the difference between the simulated wafer image pixel values at each evaluation point (i.e., at each x-y coordinate). Some embodiments use the pixel dose values for each evaluation point (e.g., each pixel or a subset of the pixels) and compare the values between the simulated wafer image and the target wafer image, with greater differences equaling higher cost. Other embodiments determine the distance between evaluation points along the contours of each shape in the simulated wafer image and the equivalent contours in the target image, with larger distances equaling larger cost.

Irrespective of the difference measurement used, the costs are then multiplied by the weight values for each evaluation point such that the points deemed more important (i.e., those critical to the MLIs, and thus the proper functioning of the IC) are given greater weight in the loss function. As a result, when the loss function is used to (i) assess the effects of previously made modifications to the mask images for the primary layer and (ii) determine subsequent modifications to these mask images, the optimizer gives higher priority to modifications that move the evaluation points deemed more critical towards the target image. That is, the optimizer aims to identify changes to the mask images such that the entirety of the simulated wafer image matches the target image (all differences from the target image are important for various other reasons, such as parasitic effects), but the points most critical to MLIs are deemed the most important.

As discussed, some embodiments do not only compare the simulated wafer image to the target image. Instead, other embodiments use both (i) a loss function term that compares the simulated image for the primary layer to the target image as well as (ii) an additional loss function term that accounts for the MLIs. Different embodiments may apply different weights to the two loss function terms. In some such embodiments, all portions of the simulated wafer shapes are treated equally in the first (single layer) loss function term (i.e., as compared to the above-described approach using different weights for different regions in the simulated wafer image). Different embodiments use different techniques to compute the additional (multi-layer aware) loss function term, which involve comparing the shapes of components on the primary layer with the shapes of components on other layers.

Figure 23:
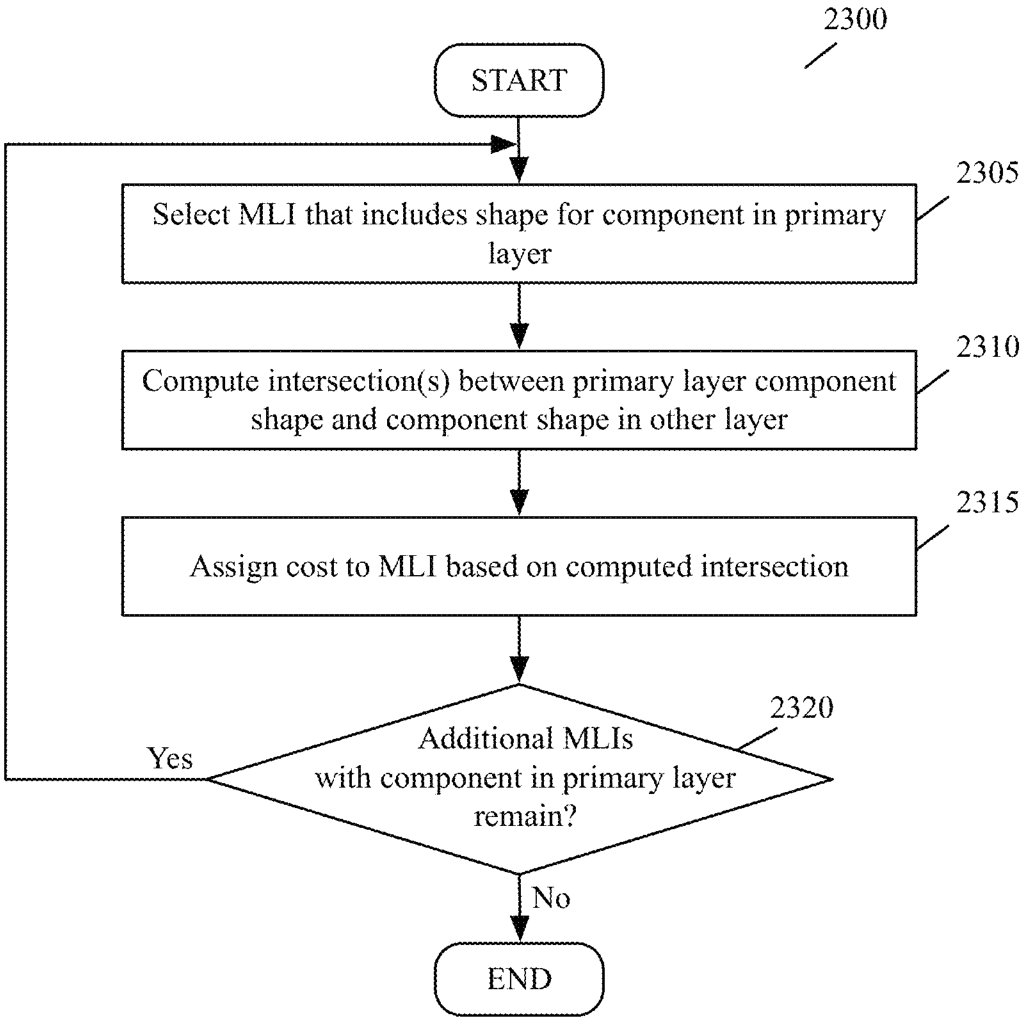
FIG. 23 conceptually illustrates a process of some embodiments for assigning costs to MLIs in a simulated wafer image based on the intersections of the components of the MLIs.

For instance, for a given MLI that includes a shape in the primary layer and a shape in another layer, some embodiments compute the intersection of these shapes and define a cost for the MLI that is based on the area of this intersection (e.g., that is inversely proportional to the intersection). Some embodiments generate numerous simulated wafer images for the primary layer (and, in some cases, for the other layer) based on different possible misalignment and/or process variation errors. For at least a subset of these pairs of wafer images (i.e., one simulated wafer image of the primary layer and either a simulated or optimized wafer image of the other layer), the optimizer computes the intersection of the two shapes. Different embodiments either use the minimum of these intersections as the overlap area (representing a worst-case scenario), compute the logical intersection of all of the intersection areas as the overlap area (representing a highly unlikely but potentially even worse scenario), or compute the average area (representing an expected area), then determine the cost based on that computed area FIG. 23 conceptually illustrates a process 2300 of some embodiments for assigning costs to MLIs in a simulated wafer image based on the intersections of the components of the MLIs. The process 2300, in some embodiments, is performed by an optimizer at operation 1720 of FIG. 17 (i.e., at each iteration of the process 1700). This approach is one of multiple different approaches that compares the shapes in the simulated image of the primary layer to shapes in one or more neighboring layers.

As shown, the process 2300 begins by selecting (at 2305) an MLI that includes a component shape in the primary layer. That is, in some embodiments, the operations 2310 and 2315 are performed for each MLI in the design layout that includes (i) a component in the primary layer and (ii) a component in at least one additional layer. Some embodiments compute a separate cost for each MLI in the design layout. In addition, it should be understood that this is a conceptual process and that some embodiments perform these operations in parallel for multiple MLIs at one time.

Next, the process 2300 computes (at 2310) the intersection(s) between the primary layer component shape and the component shape in the other layer (i.e., the intersection of the shapes forming the MLI). As described further by reference to FIG. 24, some embodiments compute multiple such intersections based on the multiple different simulated images generated for the primary layer (or for both the primary layer and the other layers). Each intersection can be calculated using the pixel dose values for the shapes in the rasterized simulated wafer images, in some embodiments.

The process 2300 then assigns (at 2315) a cost to the MLI based on this computed intersection or intersections. Some embodiments base the cost off of the smallest intersection (i.e., the smallest overlap), while other embodiments base the cost off of the logical intersection of each of these calculated intersections (i.e., the intersection of the overlaps).

The process 2300 then determines (at 2320) whether additional MLIs with components in the primary layer remain. If additional MLIs remain, the process 2300 returns to 2305 to select and compute a cost for the next MLI. Some embodiments compute a cost for each MLI with a component in the primary layer.

In some embodiments, a superimposed wafer image of the multiple layers' wafer images is created to determine the overlap of components of an MLI (e.g., a wire segment line end and a via) for each image. This superimposed wafer image is in some embodiments computed based on the wafer images, and using wafer shape intersection operations, 'location-specific resiliency scores' are computed to represent successful overhang, or partial overhang, at each via location, in the presence of misalignment. These location-specific resiliency scores can be computed, as individual loss function terms, for each area of intersection of a primary layer with an adjacent layer.

Figure 24:
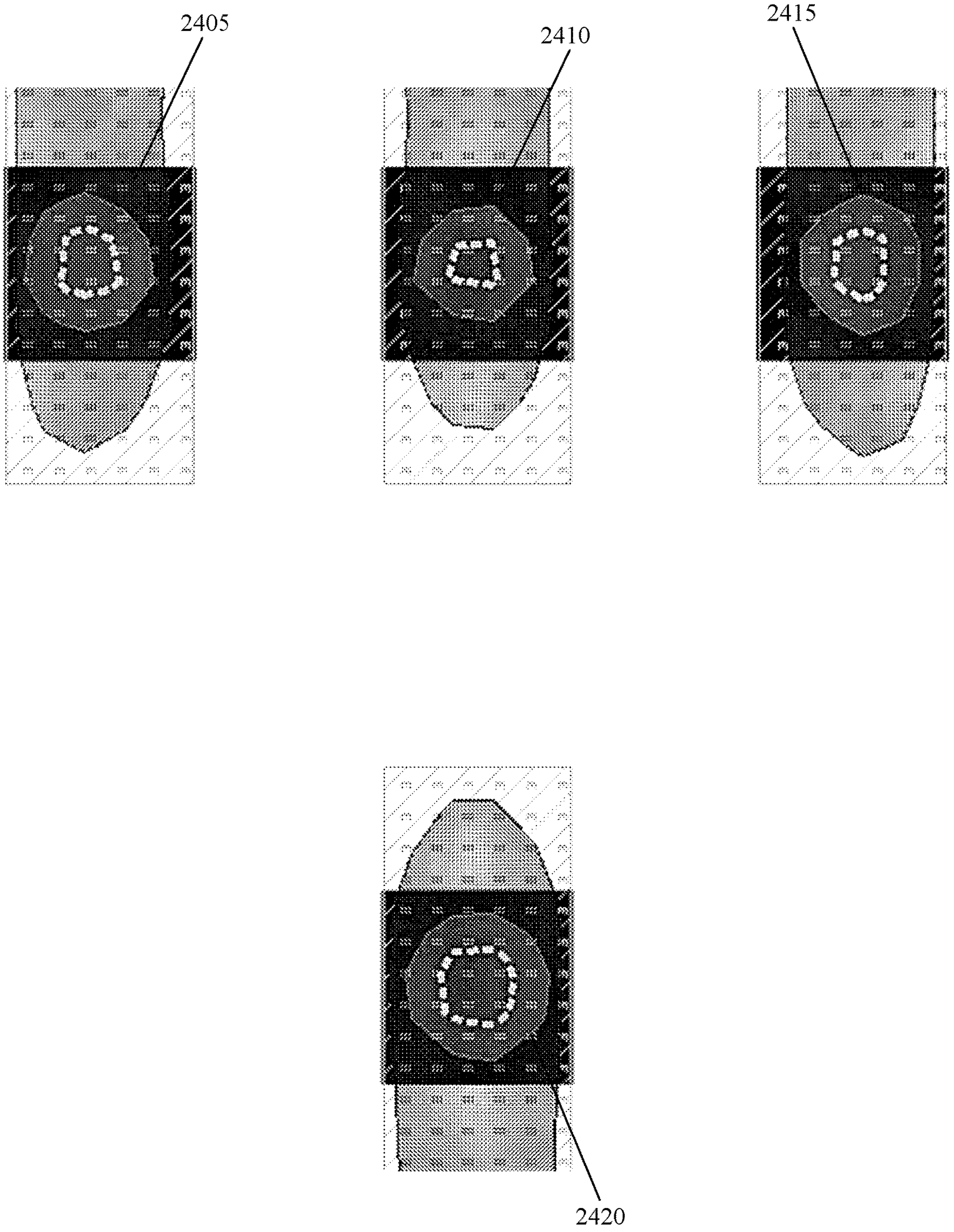
FIG. 24 illustrates an example of the resilience and susceptibility to misalignment for multiple different intersections between components on multiple layers.

FIG. 24 illustrates an example of the resilience and susceptibility to misalignment for multiple different intersections 2405-2420 between components on multiple layers. In this case, four examples are provided showing the interfaces between vias and metal wire segment ends. In this figure, a thick dashed line shows a polygonal figure representative of the resiliency of each via hole to coverage issues in the presence of misalignment, with all misalignment directions and magnitudes considered up to a certain maximum misalignment value. Higher resiliency to misalignment is indicated in these cases by a larger area of the dashed-line polygon, which shows that the top center via-wire intersection 2410 has the lowest resilience to manufacturing variations and misalignments (this has the smallest dashed-line polygon). On the other hand, the bottom via-wire intersection 2420 has the largest resilience to manufacturing variations and misalignments. While this figure specifically illustrates the intersections between via holes and metal wire segment ends, it should be understood that the multi-layer intersections could include intersections between via holes and via pads, via pads and metal wire segments ends, contacts and metal wire segment ends, etc.

In some embodiments, the resiliency of a component intersection instance for two components on neighboring layers (e.g., as represented by the dashed polygons in FIG. 24) is computed using the simulated wafer images by determining the intersections (i.e., the overlap) of the two components over various different manufacturing conditions and then determining the intersection of all of these overlaps (i.e., the polygon that is part of all of the individual two-component intersections). A single intersection between the two components, for instance, is computed between the minimum via contour and minimum metal contour for a single misalignment condition. Similar intersections can be computed for each combination of process conditions and misalignment conditions. For instance, rather than using the minimum contours, the nominal or maximum contours are used for some of the intersections. In addition, reasonably expected misalignments in various different directions (e.g., left, right, up, down) are considered. Some embodiments consider each combination of (i) misalignment direction (or no misalignment) and (ii) process condition set and determine the intersection polygon of the two components for each of these combinations, then determine the overall intersection of these intersection polygons as the overall resiliency polygon. For instance, some embodiments consider three different sets of process conditions and four different misalignment directions for each set of process conditions, for a total of twelve intersection polygons between a given pair of components. The area of the resulting component coverage resiliency polygon is then indicative of the resilience of the associated pair of components to coverage-related issues in the presence of manufacturing variations and misalignments. As described further below, some embodiments also provide different weight to different sections of the intersection area when performing the computation (i.e., based on the importance of the different sections in handling misalignments).

To compute the area of an intersection (cross-sectional overlap) between two components of an MLI (i.e., between a first predicted shape in the primary layer and a second predicted shape in another layer), some embodiments multiply the pixel dose value of each pixel in the primary layer simulated wafer image (i.e., in the region of the MLI for which the intersection is computed) with the pixel dose value for the equivalent pixel (i.e., having the same coordinate in the x, y plane) in the other layer. Thus, coordinates that are in the interior region of both shapes will have a value of 1.0 (1.0×1.0) and coordinates that are on the exterior of either shape will have a value of 0.0 (0.0× any pixel dose value). Pixels along the contour of one or both shapes will have a smaller value, with at least one of the pixel dose values being in the range (0, 1). A coordinate that is fully within one of the shapes but is an edge pixel for the other shape will have the value of the pixel dose value of the other shape, because that value is multiplied by 1.0. Coordinates that are on the edge of both shapes can have those two values multiplied; to the extent the multiplication of the pixel dose values of these overlapping edge pixels does not exactly represent the area of intersection, the error introduced is typically minimal on the scale of the entire shape. Other embodiments, rather than multiply the edge pixels together, take the average of the two pixel dose values.

Some embodiments perform these intersection calculations for each pair of intersecting components in a primary layer (the layer being optimized) and a neighboring layer of an IC. Some such embodiments then assign resiliency scores that are proportional to the area of these intersection polygons. The resiliency scores (which are effectively inversely related to the cost) can then be further computed for different manufacturing process conditions, with the results aggregated to produce a single location-specific resiliency score $S_{li}$ for a single location (i.e., for a single overlap of a via and a wire segment). The single-location resiliency score $S_{li}$ is further scaled to vary between the values of 0 and 1 (inclusively) in some embodiments.

For example, in FIG. 24, the top-center via hole's coverage resiliency polygon 2410 is in some embodiments assigned a single-location resiliency score closer to zero, while the bottom-center via hole's coverage resiliency polygon is assigned a single-location resiliency score of 1.0 or close to 1.0. In other embodiments, a score closer to 1.0 indicates less resiliency while a score closer to zero indicates greater resiliency (e.g., as the goal is to minimize the scores within the loss function). In some embodiments, multiple single-location scores are then further aggregated into a combined via component resiliency component, which is then applied a weight and included in the loss function for the optimization of the primary layer's mask image(s) (e.g., the mask image(s) of the metal layer or the via layer). Additional scores are likewise computed for other manufacturability issues in some embodiments (e.g., manufacturability issues relating to spacing between shapes on a same layer or relating to widths of shapes on a same layer), such that the overall process of optimizing one or more mask images for one or more IC layers is not limited to overlap resiliency computations only.

In some embodiments, an aggregated combination of all resiliency scores for all multi-layer interfaces is denoted as a total manufacturability score. An example of aggregating scores to achieve a total manufacturability score includes first taking the sum (over all violation locations) of all location-specific scores Si for each specific manufacturability issue (such as overhang resiliency, or wire width), and summing these to produce an issue-specific total manufacturability score ISC:

$$ISC = \sum S_i \tag{4}$$

In some embodiments, the issue-specific manufacturability scores are then further weighted and combined to produce a total manufacturability score:

$$\text{Total manufacturability score} = \Sigma \alpha_i \text{ISC},$$

which is assigned a further weighting and included in the loss function:

$$H = \int\int |f(\psi) - \phi| + w_{tms} * \sum \alpha_i ISC \tag{5}$$

The weight $\alpha_i$ is included in the total manufacturability score in some embodiments to weigh different issue-specific manufacturability scores more than others. For instance, the overlaps between wire segments and vias might be weighted differently than the overlaps between wire segments and contacts, or for a via layer the overlaps between the vias and wire segments in a first metal layer might be weighted differently than the overlaps between the vias and wire segments in a second metal layer. Furthermore, when computing the issue-specific manufacturability score for a given manufacturing issue, some embodiments weight each of the location-specific scores (the Si) differently.

The last weighting value $w_{tms}$ is applied to the total manufacturability score within the loss function in order to influence how much the various multi-layer manufacturability issues influence the mask image optimizations in comparison to the primary layer comparisons of simulated and target wafer images. For instance, if the total manufacturability score weight is assigned a value of 0.1, then single-layer wafer image comparison has more influence on the overall loss function and thus on the modifications made to optimize the mask images. Rather than apply the weighting value to the total manufacturability term, some embodiments instead apply a weighting value less than 1 to the other comparison term of the loss function (i.e., so that the total manufacturability score has more influence over the loss function than the comparison term). In some embodiments, the weighting between loss function terms and between specific issues is specified by a mask designer. It should be understood that the example equations shown here is exemplary and that other aggregation methods may be used in other embodiments to compute a total manufacturability score for a layer.

The total manufacturability score is in some embodiments used to guide an optimizer to optimize one or more mask images for one or more portions of the silicon contours more than for other portions, and to do so automatically. In some embodiments, the optimizer produces an optimized mask image that leads to extended wafer contours more in one direction than another (e.g., such that multi-layer interface coverage is maximized on a per-interface (e.g., a per-via component instance) basis). The optimizer does so in the anticipation of misalignment between layers during silicon wafer processing. More specifically, the mask image is optimized in some embodiments to anticipate a variety of misalignment possibilities and effectively pre-compensate for any or all of them.

Once a loss function is computed, it's single value output indicates how similar the simulated wafer images look compared to the target wafer images (i.e., it indicates how similar the representations of IC components in the simulated wafer images look compared to the representations of IC components in the target wafer images). This information indicates how well the mask images will generate a mask that will produce an IC as close as possible to the design layout of the IC. In some embodiments, the smaller the loss function's value, the closer the simulated wafer images are to the target wafer images. In such embodiments, the optimizer aims to iteratively modify one or more of the mask images to reduce the loss function value as much as possible (i.e., to reduce the loss function as close to 0 as possible). In other embodiments, the larger the loss function's value, the closer the simulated wafer images are to the target wafer images. In such embodiments, the optimizer aims to iteratively modify one or more of the mask images to increase the loss function value as much as possible (i.e., to increase the loss function as close to a defined value, such as 1 or 100, as possible).

Using the loss function and the terms in the loss function, the optimizer can modify one or more mask images. For instance, the optimizer in some embodiments computes one or more gradients of the loss function's terms to determine how to modify the mask images. In such embodiments, when optimizing one mask image, the optimizer computes gradients of the term $|f(\psi)-\phi|$ with respect to each pixel of the mask image, and gradients on the term $w_{tms} * \Sigma \alpha_i$ISC with respect to each multi-layer interface that was used in generating the total manufacturability score. When optimizing multiple mask images, the optimizer computes those same gradients for each mask image it is optimizing.

These gradients allow the optimizer to identify which pixel or pixels of a mask image to modify, and how much to modify the identified pixels. When performing multiple iterations of optimization of a mask image, the gradients also indicate to the optimizer which pixels it previously modified are worse than before they were modified. For example, during a first iteration of optimization of a particular mask image, the optimizer sees from the gradients that a particular pixel should be increased. During a second iteration of the optimization, the optimizer sees from the newly computed gradients that the particular pixel is worse than before the first optimization iteration (i.e., that the new value of the pixel causes the mask image to result in a simulated wafer image less like the target wafer image). As such, the optimizer knows to decrease the particular pixel during this second optimization iteration.

The above technique that measures the resiliency to misalignment and other manufacturing process variations by computing the minimum intersection is one potential method for comparing the primary layer to one or more other layers and incorporating this comparison into the loss function used by the optimization process. Other embodiments, however, use different techniques to add additional multi-layer aware costs into the loss function being optimized.

For instance, when comparing a particular predicted manufactured shape in a simulated wafer image for a layer to a shape in another layer, the optimizer assigns greater import to certain portions of the primary layer shape than to other portions of the shape. This assignment of greater import can be due to the portion of the shape having different levels of import to the resiliency of overlap for a particular multi-layer interface region.

Some such embodiments use a set of evaluation points for each shape in the primary layer that is part of an MLI. Some embodiments weight the evaluation points based on whether the evaluation points are part of the overlap region of the shape and thus have an effect on the MLI. For those evaluation points that are within the overlap region, some embodiments designate points as more or less critical to the overlap (as in the approach described above that assigns weights for points in the comparison to the target image). Weights are assigned to the evaluation points based on these different categories, and the evaluation points for each shape are compared against the simulated wafer image of the appropriate neighboring layer. In some such embodiments, the optimization process evaluates whether each evaluation point is located on the correct side of the boundary of the shape in the other layer (e.g., on the interior or exterior of the shape). Some embodiments assign a cost to each evaluation point, with these costs then weighted (i.e., using the assigned weights).

Some embodiments, for each predicted manufactured shape in the simulated wafer image, identify a set of evaluation points, and then cost each of these evaluation points. These evaluation points can be each pixel or a subset of the pixels (e.g., in a pixelized wafer image), or can be located different distances along a contour (in a contour-based wafer image). In the latter case, each evaluation point may be associated with a region of the contour.

Figure 25:
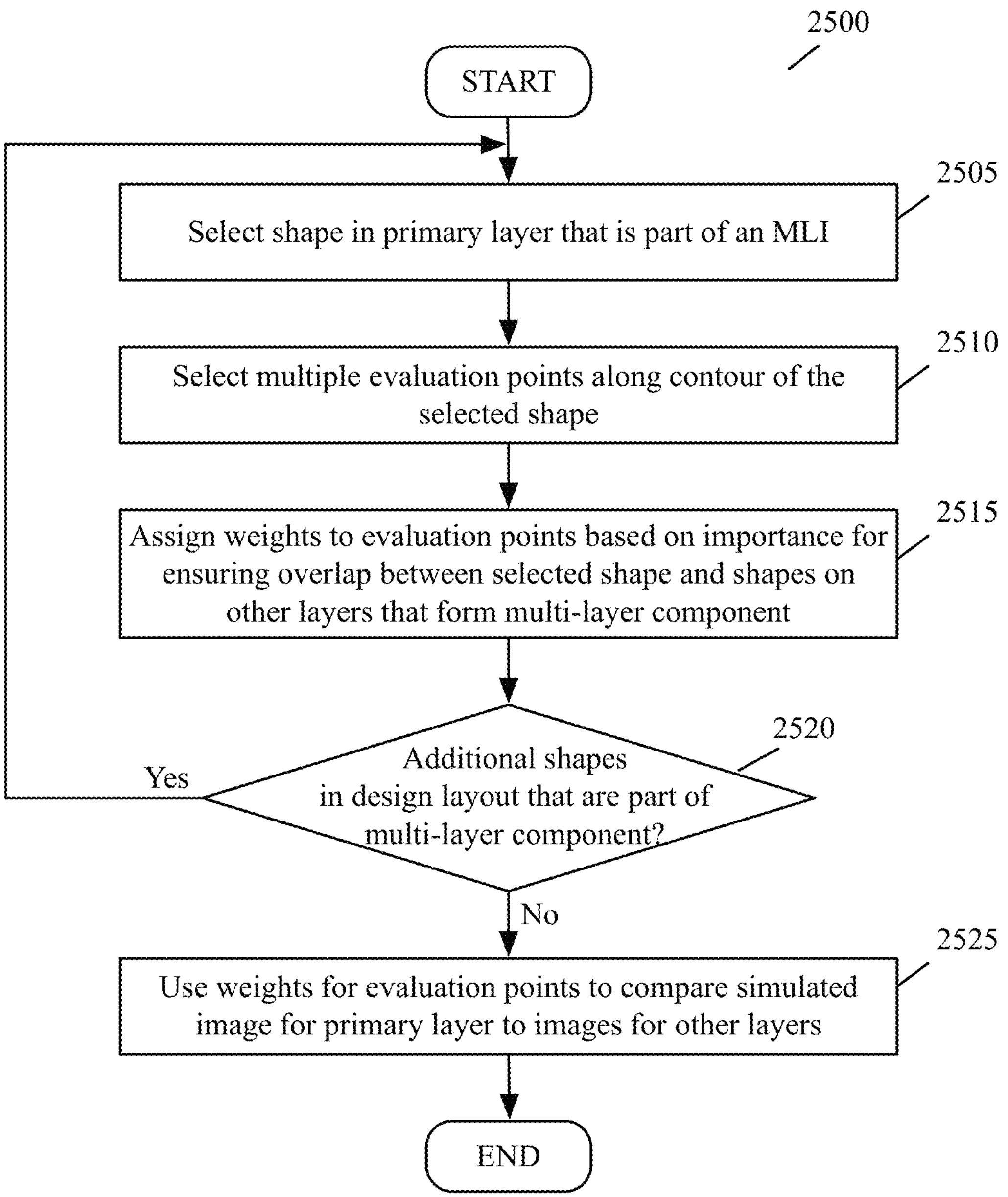
FIG. 25 conceptually illustrates a process of some embodiments for using multiple evaluation points for each of multiple shapes to compare the simulated image for a primary layer to images for other layers.

FIG. 25 conceptually illustrates a process 2500 of some embodiments for using multiple evaluation points for each of multiple shapes to compare the simulated image for a primary layer to images for other layers. The process 2500 is performed by the mask optimizer in some embodiments (e.g., on the fly during optimization). Specifically, in some embodiments the process 2500 is performed by the optimizer at operation 1720 of FIG. 17 (i.e., at each iteration of the process 1700). This approach is another approach of some embodiments that compares the shapes in the simulated image of the primary layer to shapes in one or more neighboring layers.

As shown, the process 2500 begins by selecting (at 2505) a shape in the primary layer (i.e., the layer being optimized) that is part of an MLI. In some embodiments, the operations 2510 and 2515 are performed for each shape in the primary layer. In addition, it should be understood that this is a conceptual process and that some embodiments perform these operations in parallel for multiple simulated wafer shapes at one time.

Next, the process selects (at 2510) a set of multiple evaluation points for the selected shape. In some embodiments, these evaluation points are along the contour of the shape, while in other embodiments the evaluation points also include the interior of the shape. In addition, in some embodiments, the evaluation points are also located in the region around the contour of the shape. In some embodiments, the evaluation points are each pixel in the wafer image (e.g., for a pixelized wafer image) or a specific subset of the pixels (e.g., every other pixel, every fourth pixel, etc.). In other embodiments, the evaluation points are located different distances (e.g., distances along a contour for a contour-based wafer image) and/or different distances within the interior of the shape. For instance, in some embodiments the distance between evaluation points is based on the gate pitch and or metal pitch used in the manufacturing process for the IC (e.g., a particular number of nm). FIGS. 21 and 22, described above relating to the selection of evaluation points for simulated wafer image to target wafer image comparisons, illustrate multi-layer interfaces with evaluation points identified along the contours of the primary layer shapes (although, as noted, in some embodiments the evaluation points are also located on the interior of the shapes).

The process 2500 then assigns (at 2515) weights to the evaluation points based on their relative importance for ensuring the overlap between the selected shape and the shapes on other layers that form the multi-layer component. The groups of evaluation points, in some embodiments, include (i) evaluation points that do not have overlap with another layer, (ii) evaluation points that overlap with another layer but are not as critical to the resiliency of the overlap, and (iii) evaluation points that are critical to the resiliency of the overlap.

In some embodiments, to identify the criticality and assign weight values to the evaluation points, the optimizer uses a set of lookup tables that assign these weight values (or specify how to assign the weight values) based on (i) the layers involved in the MLI and (ii) the type of MLI. For instance, some embodiments differentiate between MLIs formed by vias and line ends, vias and capacitive plates, pairs of capacitive plates, vias intersecting with the middle of a straight line segment, vias intersecting with a corner of a line segment, etc. Typically, the number of different types of MLIs is a relatively small number such that specifying a lookup table for each MLI type is reasonable. In addition, because different wiring layers will typically have different wire thicknesses, specifying the layer is important.

The lookup table for a specific layer group (e.g., layer pair) and MLI type is used by the optimizer to determine the weights for each evaluation point in the primary layer shape. For each MLI type and layer group, different lookup tables are used depending on which of the components of the MLI is in the primary layer. For example, a via and a wire segment will have weights assigned differently for their respective evaluation points. In some embodiments, the lookup table specifics weights for a subset of the evaluation points and the optimizer interpolates between these assigned weights for the rest of the evaluation points.

Figure 26:
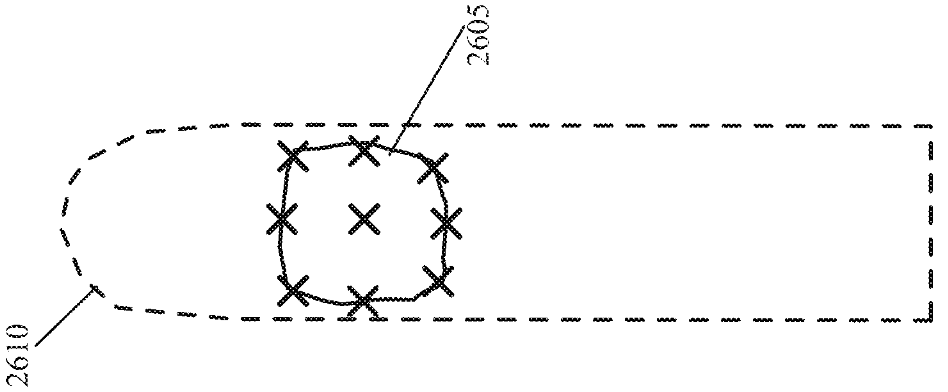
FIG. 26 conceptually illustrates a via shape and a wire segment shape, with the via located somewhat near the end of the wire segment, with evaluation points for the via shape.

FIG. 26 conceptually illustrates a via shape 2605 and a wire segment shape 2610, with the via located somewhat near the end of the wire segment (but not so close that there is a concern of the via being located past the end of the wire segment). This figure also shows nine evaluation points for the via shape 2605—one located at the center of the shape, four at each "corner" of the nearly-square shape, and four in the middle of each side of the shape. In some embodiments, for this type of shape, the lookup table specifies that the evaluation point in the middle of the shape is the least important to the shape being fully within the line segment (and being large enough) and thus will be assigned the lowest weight values. The two evaluation points in the middle of the left and right sides are assigned the highest weight values because these are most important to the shape being located within the line segment. The two evaluation points in the middle of the top and bottom sides are only more important than the center evaluation point, while the four corner evaluation points are more important than the top and bottom points but less important than the right and left points. For other evaluation point weights, in some embodiments the optimizer interpolates between the specified weights from the lookup table. In this example, evaluation points near the center would have lower weights while evaluation points closer to the right and left edges would have higher weights than evaluation points closer to the top and bottom edges. Other embodiments may use different computational techniques, or a user (e.g., a chip designer) can assign the weight values manually.

The process 2500 next determines (at 2520) whether the design layout includes additional shapes that belong to a multi-layer component. It should be noted that shapes that do not include any multi-layer connections are still optimized, but only to match the target wafer image (i.e., multi-layer alignment considerations need not be considered for such shapes). In addition, it should be noted that the process 2800 is a conceptual process, and the optimizer in some embodiments actually determines evaluation points for numerous shapes in parallel rather than one shape at a time. If additional shapes that are part of multi-layer components in the design layout remain, the process 2800 returns to 2805 to select another such shape.

Once evaluation points have been selected and grouped (or ranked) for all of the shapes, the process 2500 uses (at 2525) the grouped evaluation points to compare the simulated image for the primary layer to the images for the other layers. That is, the evaluation points are used to generate a cost for either each point or for the MLI as a whole. Different embodiments may use different techniques to calculate these costs.

For example, some embodiments identify, for each evaluation point, whether that evaluation point is located within, on the boundary of, or outside of the shape in the other layer. This can be ascertained based on the pixel dose value for the corresponding pixel in the other layer in some embodiments. That is, if the corresponding pixel has a value of 1.0, then the evaluation point is located within the interior of the other shape; if the corresponding pixel has a value of 0.0, then the evaluation point is located exterior to the other shape; if the corresponding pixel has a value between 0 and 1, then the evaluation point is on the boundary of the other shape.

For shapes that should be exterior to the other shape (e.g., line ends that intersect vias), some embodiments impose costs based on contour evaluation points being located on the interior of the shape. As such, some embodiments only assign evaluation points along the contours of certain shapes in certain MLIs (e.g., exterior shapes of an MLI). For shapes that should be interior to the other shape (e.g., vias within line ends), costs are imposed based on evaluation points being located on the exterior of the shape. Some embodiments also impose costs for being located on the boundary, while other embodiments do not impose such costs because in certain cases the boundaries should line up. In some embodiments, costs are imposed if an interior evaluation point is located on the boundary of the shape in the other layer.

Figure 27:
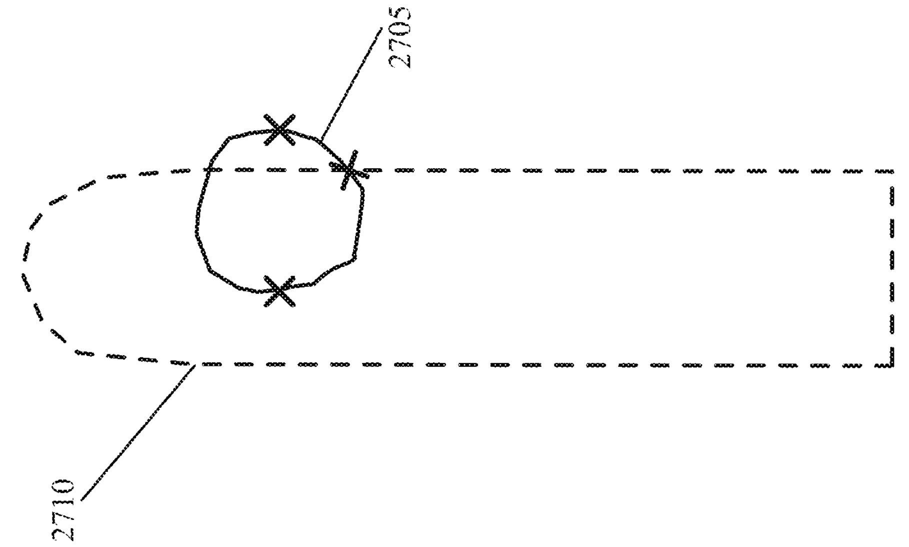
FIG. 27 conceptually illustrates a simulated via shape that is partially located outside of a line segment shape in another layer.

FIG. 27 conceptually illustrates a simulated via shape 2705 that is partially located outside of a line segment shape 2710 in another layer. The figure also illustrates a first evaluation point for the via shape 2705 located on the interior of the line segment shape 2710, a second evaluation point located on the boundary of the line segment shape, and a third evaluation point located outside of the line segment shape boundary. Some embodiments would impose a significant cost on this third evaluation point. Because this is an important (highly weighted) evaluation point, a modification to the mask that results in such a misalignment would be highly penalized.

In some such embodiments, the loss function is expressed as a sum over the evaluation points, with each evaluation point having two costs that can be weighted differently for each point. More specifically, some embodiments define a single-layer cost for the evaluation point (i.e., based on the difference between the shape in the simulated wafer image and the shape in the target wafer image) and a multi-layer aware cost for the evaluation point (based on the overlap with another shape in the simulated wafer image for a different layer). In some such embodiments, for each evaluation point each of the costs is weighted based on a relative importance. Some embodiments have the same weight for all of the single-layer costs, with the cost simply based on the difference between the shape (or pixel value) in the simulated wafer image and the shape (or pixel value) in the target wafer image. In other embodiments, certain points may be weighted more heavily than others. As discussed above, design layouts often have components with rectilinear (straight-line) edges, but the actual manufactured shapes are in-part curvilinear and thus certain contours of the as-manufactured shapes will never exactly match the design layout. Using corner rounding and other techniques to generate the target wafer images can improve this, but in certain cases even the corner-rounded target wafer images will have certain portions that cannot be matched exactly. Some embodiments thus weight the costs for these points less than the costs for points that should more closely match the target wafer images, so that the gradients will cause the mask updates to push more on the latter evaluation points than the former evaluation points.

The optimizer then modifies the mask pixel images for the primary layer based on this loss function. As described previously, this involves taking the gradient of each pixel (or contour) of the mask images with respect to the loss function in an attempt to push the loss function towards a local minimum (though this may involve making the loss function worse in the short run in order to escape a sub-optimal local minimum and find a better local minimum). Examples of the mask image modifications (the addition, removal, and moving of SRAFs) are described above by reference to FIGS. 14A-B and 15A-B.

The above description provides several different approaches that different embodiments use to compute the loss function using information from other layers to inform the modification of the mask layouts for a primary layer. One of ordinary skill in the art will understand that other embodiments may use other, different techniques to compute the loss function term that accounts for the MLIs.

For instance, some embodiments calculate one or more tolerance regions for each primary layer component shape in the simulated region, which are used to constrain the boundaries of that primary layer shape (by assessing a cost for the primary layer shape extending outside the tolerance region). In some embodiments, the tolerance regions are used specifically to account for misalignments of a shape. Some such embodiments assess no cost for the primary layer shape being contained within the tolerance region, then assess additional cost based on the extent to which the primary layer shape extends outside of the tolerance region.

Some embodiments define a set of multiple tolerance regions for a given primary layer shape based on the location and shape of the shape in the other layer with which the primary layer shape forms an MLI (as well as the shape of the primary layer component). In some such embodiments, a first tolerance region represents an acceptable range of misalignments, a second tolerance region represents a somewhat acceptable range of misalignments, and a third tolerance region represents an unacceptable range of misalignments. In this formulation, no costs are imposed if the primary layer shape is located anywhere within the boundaries of the first tolerance region (although the location of the primary layer shape is still constrained based on the single-layer cost). A first level of costs are imposed if the primary layer shape is located partially outside of the first tolerance region but within the second tolerance region. A much higher cost is imposed if the primary layer shape is located at all outside of the second tolerance region (and thus within the third tolerance region), such that mask image modifications resulting in such a scenario are likely to be rejected. Some embodiments impose the third tolerance region as a constraint, such that any mask image modifications that result in a scenario with the primary layer shape extending into this third tolerance region as outright rejected.

Figure 28:
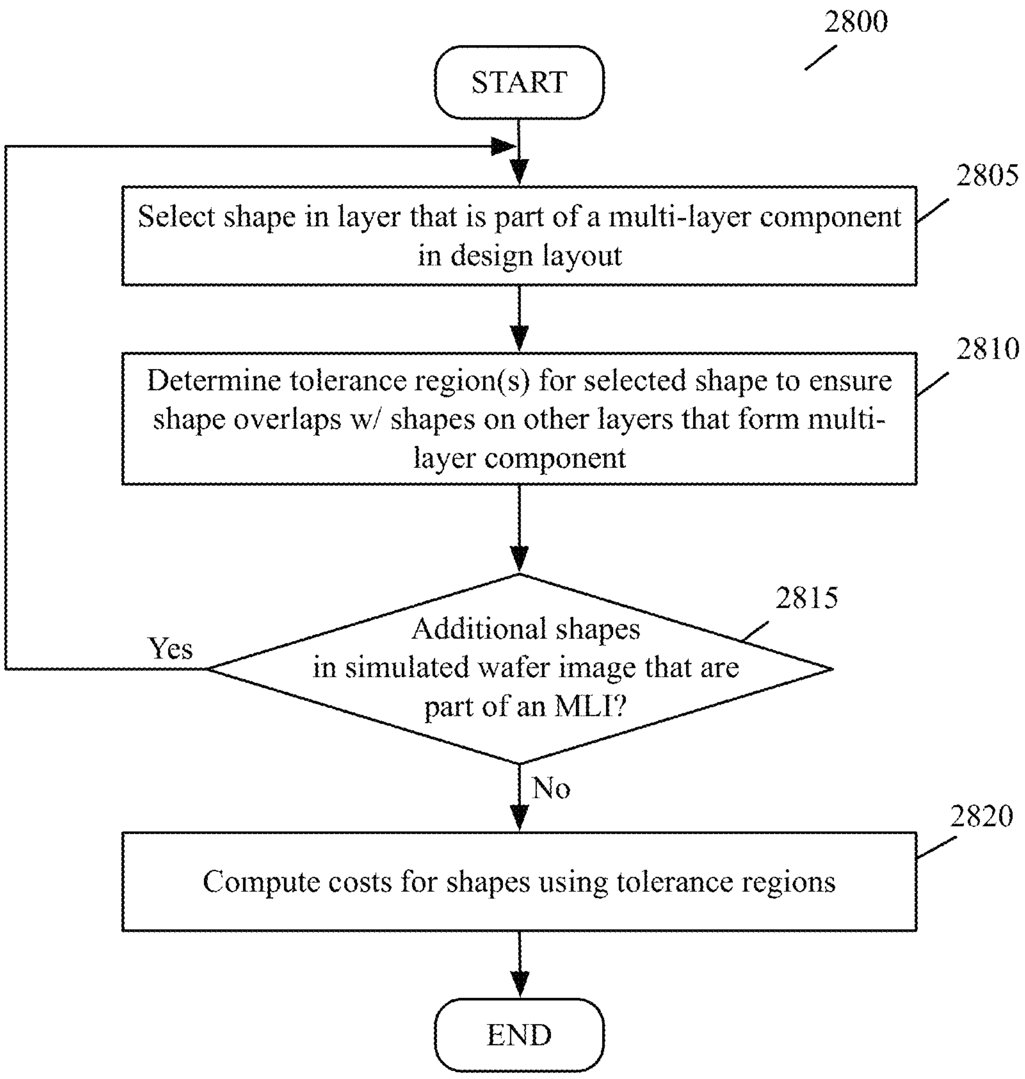
FIG. 28 conceptually illustrates a process of some embodiments for using tolerance regions for shapes in the simulated wafer for a layer to compute costs for the MLIs including shapes in that layer.

FIG. 28 conceptually illustrates a process 2800 of some embodiments for using tolerance regions for shapes in the simulated wafer for a layer to compute costs for the MLIs including shapes in that layer. The process 2800 is performed by the mask optimizer in some embodiments (e.g., on the fly during optimization). In other embodiments, the process 2800 is performed in part prior to optimization (i.e., the determination of the tolerance regions) and in part during optimization (i.e., the adjusting of the masks based on the evaluation points).

As shown, the process 2800 begins by selecting (at 2805) a shape in a current layer (i.e., the layer being optimized) that is part of a multi-layer component in the design layout. If performed prior to the optimizer generating simulated wafer images, these shapes may refer to the specific shapes in the design layout. In other embodiments, the process 2800 is performed during optimization, and the shapes refer to the predicted manufactured shapes in the simulated and/or target wafer images (which should correspond to design layout shapes).

The process 2800 then determines (at 2810) one or more tolerance regions for the selected shape to ensure that the shape overlaps with one or more shapes on other layers that form a multi-layer component. In some embodiments, the tolerance region is an area in the wafer image within which the outer bounds of the contour can move with the overlap still being resilient to misalignment and/or other process variations. The tolerance region, in some embodiments, is generated automatedly by the optimizer by determining where the selected shape can be located and still fully overlap the shape(s) in other layer(s) with which the selected shape forms a multi-layer component. In other embodiments, the tolerance region may be defined manually (e.g., by a user of the mask production tool that includes the optimizer).

Figure 29:
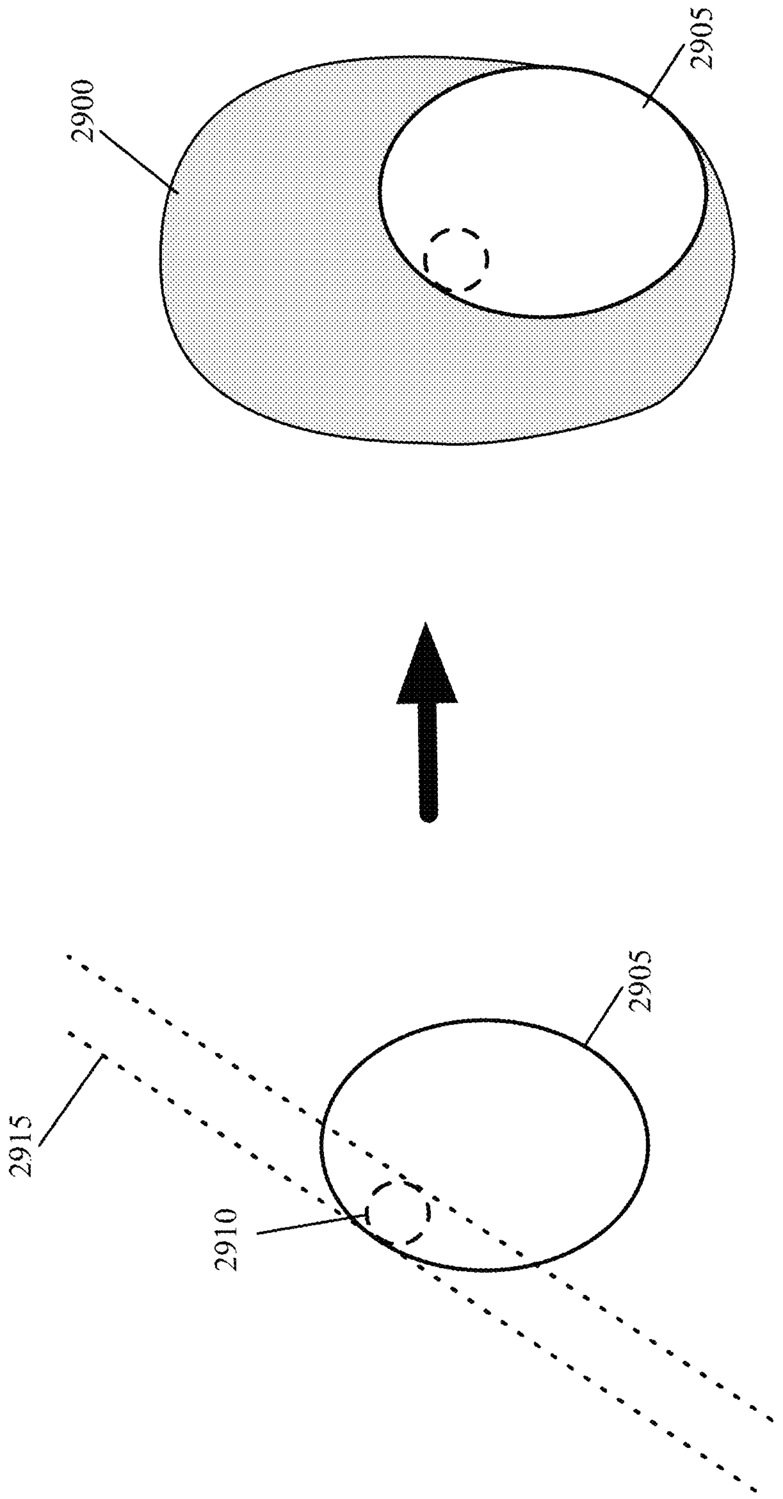
FIG. 29 conceptually illustrates an example of a tolerance region for an oval shape that overlaps with a via shape.

FIG. 29 conceptually illustrates an example of a tolerance region for an oval shape 2905 that overlaps with a via shape 2910. The left side of this figure shows the oval shape 2905, which represents a plate in a metal layer (e.g., one half of a pair of capacitive plates that form a capacitor), in the context of multiple other layers with which the shape 2905 forms a multi-layer component. The capacitive plate represented by shape 2905 connects through a via, represented by a shape 2910 (i.e., in a neighboring via layer), to a wire represented by shape 2915 (i.e., in another metal layer). In this example, the overlap of concern is the metal plate and the via (the via layer can be separately optimized to ensure overlap with both the wire and the metal plate). As such, the optimizer defines a tolerance region 2900 represented by the gray area in the right side of the figure. This tolerance region 2900 is an area within which the contours of the oval shape 2905 should ideally be contained, so that the oval shape 2905 overlaps the entirety of the via shape 2910. The tolerance region 2900, in this case, shares a boundary at the bottom right with the actual shape 2905 but is significantly larger than the shape 2905 in the left and upper areas because if the contours of the oval shape 2905 were to move in this direction then the resiliency of the overlap would be maintained (or potentially increased). It should be noted that the contours of the shape 2905 might also be restricted by other factors, such as ensuring adequate overlap with the location of the other capacitive plate that forms the capacitor.

In some embodiments, the tolerance region is calculated using the pixel coordinates (i.e., x-y coordinates) of the primary layer and other layer shapes. For a given MLI in which the primary layer shape needs to fully encompass the shape in the other layer, some embodiments effectively move the primary layer shape around within the x-y plane so as to fully enclose the smaller shape in the other layer while aligning with the boundary of the smaller shape on one side (or at one point). The union of the outer bounds of the primary layer shape throughout these movements can then form the tolerance region. In the example shown in FIG. 29, if the shape 2905 is moved throughout the x-y plane while always bounding the shape 2910 at one point, the tolerance region shape 2900 is identified.

Other embodiments compute a set of distances across the primary layer shape in various different directions (e.g., the four cardinal and four ordinal directions, or a larger set of directions. For each particular direction, a line can be drawn from the center of the enclosed shape in the other layer to the boundary of that shape in the opposite direction, then the computed distance in the particular direction measured from that point to identify the boundary of the tolerance region. In the example shown in FIG. 29, for instance, the distance across the oval shape 2905 in the left-right (cast-west) direction through the center of the shape can be measured. The right boundary of the tolerance region 2900 is then computed as this measured distance from the left edge of the via shape 2910.

Figure 30:
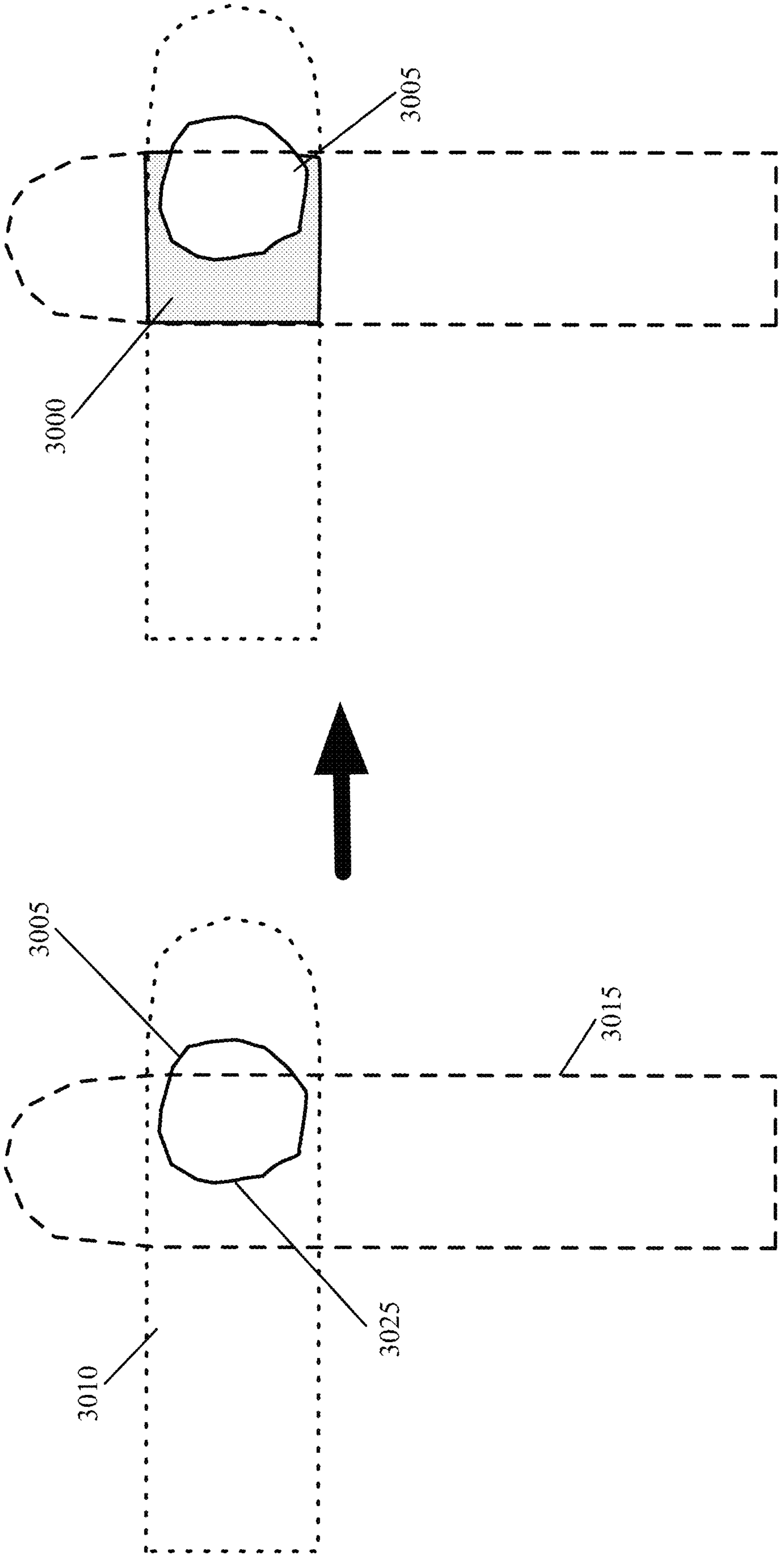
FIG. 30 conceptually illustrates an example of a tolerance region for a via shape that connects two wires in different metal layers.

FIG. 30 conceptually illustrates another example of a tolerance region for a via shape 3005 that connects two wires in different metal layers. The left side of the figure shows the via shape 3005 as well as two wire segment shapes 3010 and 3015. The two wire segments represented by these shapes are in two different metal layers and are connected by the via. As shown, the simulated via shape 3005 is currently entirely within the first wire segment 3010 (that runs left-right) but is too far to the right and thus located partially outside the boundaries of the second wire segment 3015 (that runs up-down). In this example, the overlap of concern for the via shape 3005 is with both of the wire segments. As such, the right side of the figure shows the tolerance region 3000 in gray as the intersection of these two wire segments. That is, the via shape 3005 should be located within this square (or approximately square) region 3000. the via shape 3005 is currently partly outside of this region, and thus costs will be imposed on the via shape that will cause modification of the mask images in an attempt to move the contours back to the left (preferably without just shrinking the via shape).

In some embodiments, when the primary layer shape should be fully enclosed by one or more shapes in other layers (as in FIG. 30), the tolerance region is simply the boundaries of these shapes. That is, the primary layer shape is constrained to ensure that this shape fully overlaps the shapes in other layers that should enclose it.

Returning to FIG. 28, the process 2800 then determines (at 2815) whether the simulated wafer image includes additional shapes that belong to an MLI. It should be noted that shapes that do not include any multi-layer connections are still optimized, but only to match the target wafer image (i.e., multi-layer alignment considerations need not be considered for such shapes). In addition, it should be noted that the process 2800 is a conceptual process, and the optimizer in some embodiments actually determines tolerance regions for numerous shapes in parallel rather than one shape at a time. If additional shapes that are part of multi-layer components in the design layout remain, the process 2800 returns to 2805 to select another such shape.

Once tolerance regions are designated for all of the shapes, the process 2800 computes (at 2820) costs for the shapes using the tolerance regions. This process, in some embodiments, involves identifying a cost for each shape in the layer that belongs to an MLI. Specifically, some embodiments ensure that the shape fits fully within its tolerance region. If a shape is fully within its tolerance region, then the cost is zero. If the shape is partially or fully outside of its tolerance region, higher costs are imposed.

To determine whether a shape is inside or outside of the tolerance region, some embodiments compare the pixel values of the shape to pixel values assigned to the tolerance region. In some embodiments, the tolerance region is treated like a shape, with values of 1.0 for the interior of the region, values between 0 and 1 for the boundary, and values of 0.0 outside of the boundary. The pixel locations that form the contour of the primary layer shape (i.e., those pixels with a pixel value between 0 and 1) are identified in the tolerance region, and ideally all of these pixel locations have non-zero values in the tolerance region. Cost is imposed based on, e.g., the length of the primary layer shape contour that is outside of the tolerance region. Some embodiments also define a second tolerance region that is concentric with but outside of the first tolerance region, and impose different amounts of cost based on whether the primary layer shape is outside of the first tolerance region but within the second tolerance region (higher cost than fully within the tolerance region) or if the primary layer shape also exceeds the second tolerance region (a higher cost than if the shape is entirely within the boundary region but exceeds the first tolerance region) and is therefore located in a third tolerance region (which can be defined as the area outside of the second tolerance region).

Furthermore, in some embodiments, the modification of the mask layout images is at least in part constrained by the tolerance region. For instance, modifications that would likely cause a shape to be moved or otherwise modified so as to be outside of the first tolerance region are discouraged, and modifications that would likely cause a shape to be moved or otherwise modified so as to be outside of the second tolerance region are prohibited. This can be done by imposing a cost on the gradients computed with respect to the mask layout shapes in some embodiments.

The above description provides various different examples of techniques that may be used to incorporate additional (e.g., neighboring) layers into the consideration of a simulated wafer image for iterative mask optimization. These various techniques use different loss functions that are effectively one term for considering single-layer costs (i.e., the differences between the simulated wafer image and a target wafer image) and a second term for considering multi-layer aware costs that aim to produce masks for which the multi-layer overlap regions will be resistant to process variations during the fabrication process.

The loss function used by the optimizer of some embodiments considers misalignments between components of adjacent layers (as specified by the total manufacturability score) when optimizing one or more mask images for a layer. In some embodiments, this loss function term (as well as the comparison term) accounts for extreme process conditions that can occur during manufacturing of the primary layer or the adjacent layers (e.g., due to the depth of focus and/or exposure strength used when shining light through the mask during the wafer production process, or to the dosage used during the mask-making process).

In other embodiments, the loss function includes a separate term that considers the extreme process conditions that can occur when manufacturing the adjacent layers. That is, a first term (e.g., the total manufacturability score) considers process variations due to misalignments while a second term (described below) considers other process variations during the manufacturing process. The misalignment variations can result in the manufactured components (or predicted manufactured shapes for these components during simulation) moving left, right, up, down, or a combination thereof in the plane of a layer. The other process variations (e.g., depth of focus and exposure strength) can result in the manufactured components (or predicted manufactured shapes for these components during simulation) being larger or smaller than optimal. As such, some embodiments consider the minimum, nominal (average), and maximum process variation for each predicted manufactured shape and factor these possibilities into a separate term in the loss function.

Thus, either each simulated wafer image for a layer includes multiple sets of predicted shapes or multiple wafer images are simulated, with each set of predicted shapes in each wafer image associated with a different set of process conditions. These sets of process conditions in some embodiments includes at least a set of minimum process conditions, a set of maximum process conditions, and a set of nominal process conditions. These different set of process conditions represent different manufacturing process parameters, and each set of process conditions includes a different value for each manufacturing process parameter.

The set of manufacturing process parameters in some embodiments includes one or more manufacturing process parameters related to at least one of depth of focus and strength of exposure used during a wafer production process. In such embodiments, each mask image in each mask image set is created to represent the different manufacturing process parameters that can occur during the wafer production process. Conjunctively or alternatively, the set of manufacturing process parameters includes one or more manufacturing process parameters related to dosage used during a mask making process. In such embodiments, each mask image in each mask image set is created to represent the different manufacturing process parameters that can occur during the mask making production process (i.e., the mask generation process).

To compute a loss function that considers the extreme manufacturing process parameters (i.e., the extreme sets of process conditions), some embodiments compute an additional term, to include in the loss function, that specifically accounts for the extreme manufacturing process parameters of adjacent layers (e.g., referred to as an extreme process variation score). The computation of the extreme process variation score is in some embodiments similar to the computation of the total manufacturability score mentioned above. For example, some embodiments use the maximum contours of the vias and the minimum contours of the metal wire segments, as these sets of contours will show the minimum overlap of the wire segments on the via pads based on the different process conditions that can occur. Other embodiments use the minimum contours of each component belonging to a particular MLI, or use various different combinations of the minimum, nominal, and maximum contours when assessing a particular MLI.

Using these different contours, some embodiments compute resiliency polygons (as described above), which are assigned resiliency scores to aggregate into the extreme process variation score $\Sigma\beta_j PVS$. This score can then be included in the below loss function:

$$H = \int\int |f(\psi) - \phi| + w_{tms} * \sum \alpha_i ISC + w_{PVS} * \sum \beta_j PVS \tag{6}$$

It will be appreciated by those skilled in the art that other aggregation methods are employed in some embodiments to compute a process variation for layers' multi-layer interfaces, and the above is intended to be exemplary. Weighting factors $\beta_j$ are included in the extreme process variation score in some embodiments to weigh different MLI's individual resiliency scores more than others. The weight $w_{pvs}$ is in some embodiments applied to the extreme process variation score in the loss function, which can be defined by the mask layout designer to specify how much this value affects the resulting value of the loss function.

Figure 31:
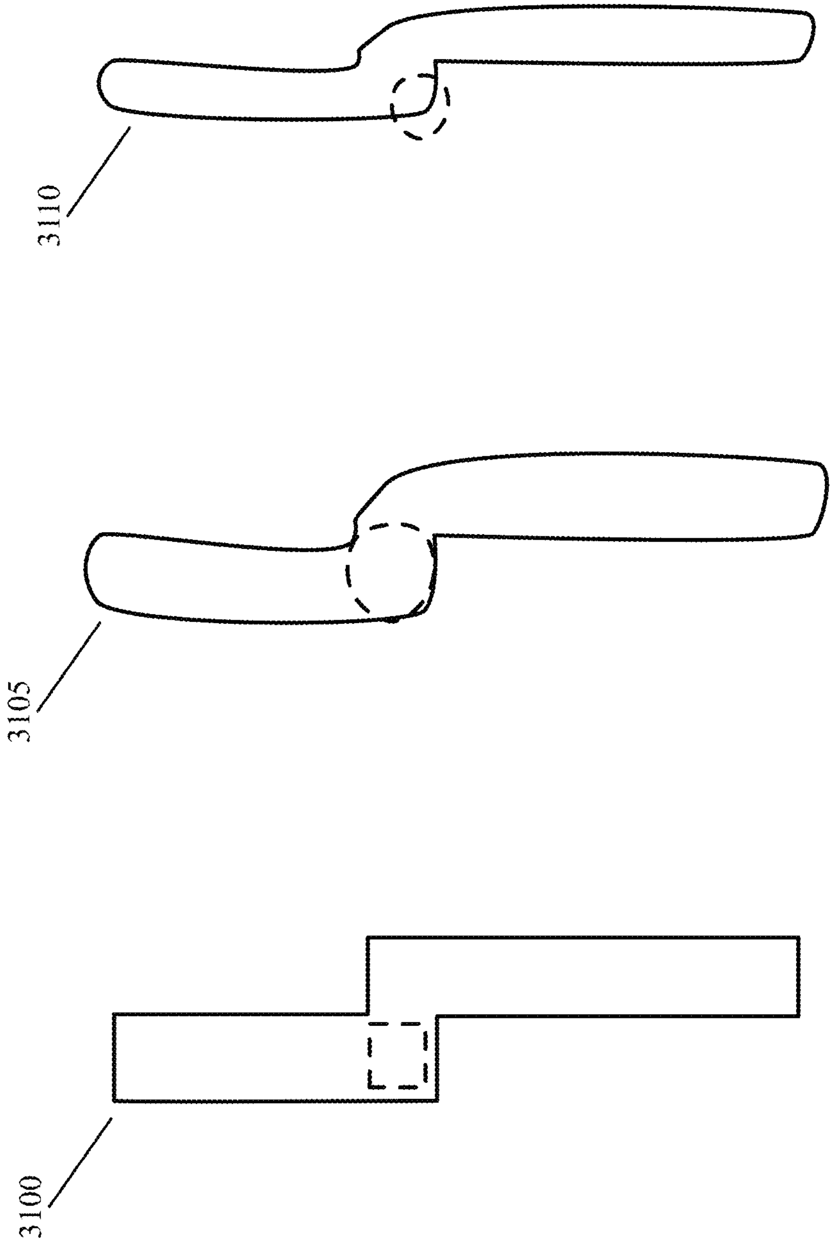
FIG. 31 conceptually illustrates an example of a multi-layer interface that includes an interconnect segment of a metal layer and a via of a neighboring via layer.

FIG. 31 conceptually illustrates an example of a multi-layer interface that includes an interconnect segment (shown with a solid line) of a metal layer and a via (shown with a dashed line) of a neighboring via layer. The figure shows these components in a design layout 3100, a first wafer simulation 3105 for a first extreme process variation, and a second wafer simulation 3110 for a second extreme process variation. The design layout 3100 shows that the interconnect line segment is a rectilinear line segment that has a jog in the middle of the segment. The via location is a rectangle that fits within this jog.

The first wafer simulation 3105 shows the results for a first extreme process variation that produces larger component shapes; in this case, the overlap area between the via and the interconnect segment is large and would not pose a manufacturing problem. However, the second wafer simulation 3110 shows the results for a second extreme process variation that produces smaller component shapes. In this latter case, not only are the predicted component shapes smaller but this results in significantly less overlap because of the jog in the interconnect segment. As such, this multi-layer interface is less resistant than ideal to extreme process variations (at least on the low end of the component shape sizes) and the mask images should be adjusted to compensate for this.

In some embodiments, rather than optimizing the mask(s) for one layer of the design layout at a time, some embodiments concurrently optimize the mask images of multiple layers (e.g., for via-metal or metal-via-metal layers) to produce multiple optimized mask images for multiple layers at once. Specifically, some embodiments simulate wafer images for multiple layers (e.g., multiple adjacent layers) based on the mask images for those multiple layers and use those simulated wafer images to update the mask images for the layers.

Figure 32:
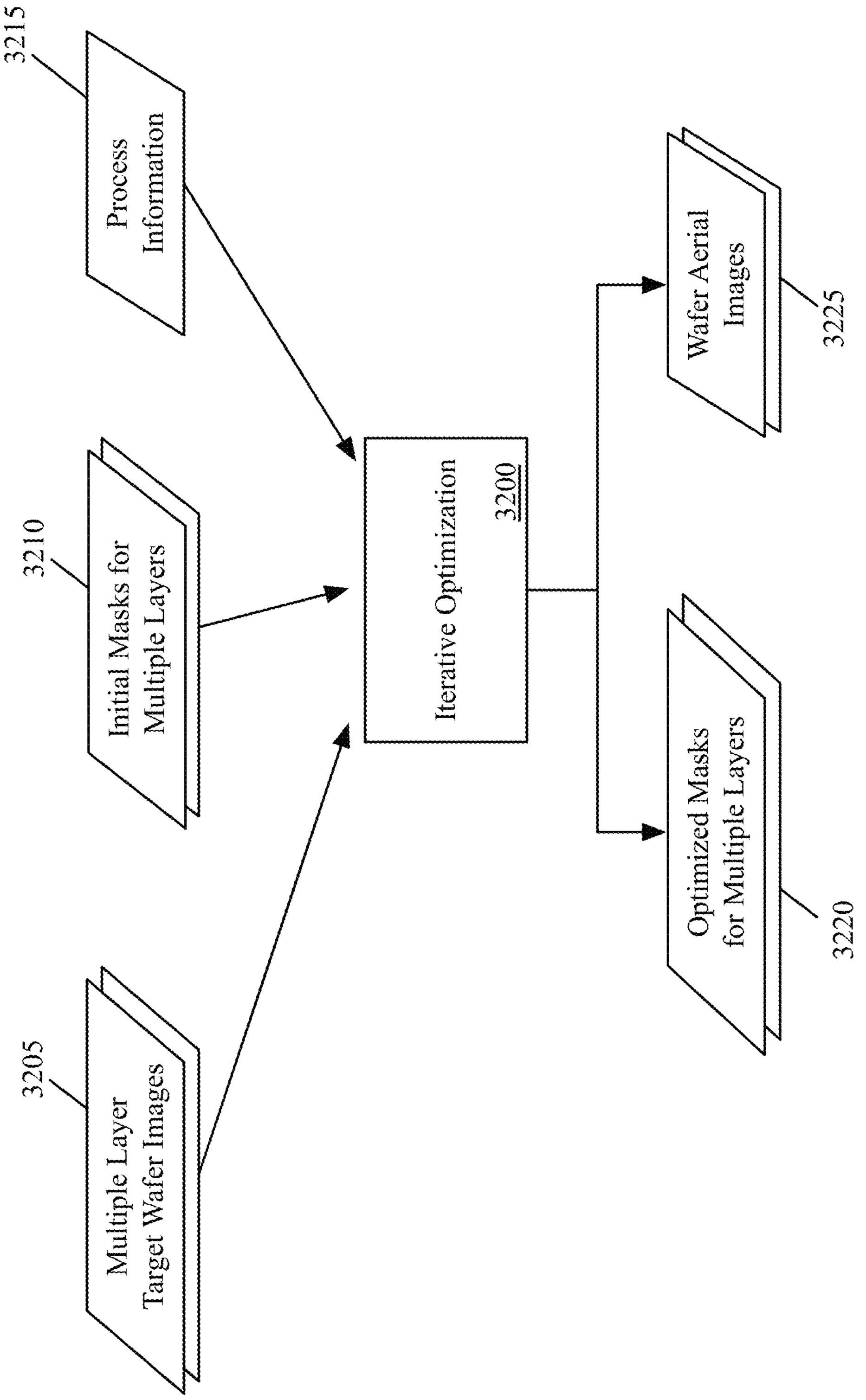
FIG. 32 conceptually illustrates an example of a high level mask image co-optimization process that uses inputs corresponding to multiple layers to produce optimized mask images for the multiple layers FIG. 33 conceptually illustrates a process of some embodiments for performing wafer simulation.

FIG. 32 conceptually illustrates an example of a high level mask image co-optimization process that uses inputs corresponding to multiple layers to produce optimized mask images (or optimized sets of mask images) for the multiple layers. As shown, the inputs to this optimization process 3200 include target wafer images 3205 for each of the multiple layers to be optimized (rather than a single primary layer) and the initial masks 3210 for each of those layers. In some embodiments, prior to performing the co-optimization operations, each of the sets of mask images is individually optimized in a single layer manner using traditional mask image optimization (i.e., without accounting for multi-layer interaction). In other embodiments, the individual layer mask image optimizations are adjacent-layer aware, as described above. After the initial optimization, additional iterations are performed in some embodiments to perform co-optimization. A secondary input is again process information 3215 (e.g., the process model, process variability or conditions, etc.).

Whereas only optimizing a single layer of masks as described by reference to FIG. 17, the optimization process 3200 of some embodiments can modify the masks of multiple layers during each iteration. In some embodiments, the layers for which the masks are optimized are a pair of neighboring layers (e.g., a via layer and a metal layer, a contact layer and a metal layer), a set of three subsequent layers (e.g., a metal layer and two via layers, a via layer and two metal layers, a metal layer with a via layer on one side and a contact layer on the other side, etc.).

Because the masks for each of the layers can change each iteration, the optimization process 3200 performs wafer simulation for each of the multiple layers during each iteration in some embodiments. The predicted manufactured shapes of the simulated wafer images are compared to the target wafer images (e.g., with each layer considered on its own) and the interactions between the predicted manufactured shapes of the multiple layers are considered. Some embodiments use the same resiliency scores for each overlap that are described above to cost the overlap regions of the simulated wafer images, but apply optimizations to the mask images for multiple layers during at least some of the iterations. As shown, the output of the iterative optimization process 3200 is a set of optimized masks 3220 for each of the multiple layers and, optionally, one or more wafer aerial images 3225 for each of the layers.

Effectively, this optimization is a co-optimization of multiple-layer mask images at once. In some embodiments, at each iteration, the multiple-layer wafer aerial images are processed and aggregated to produce combined overhang resiliency components at each layer interface, which are then applied a weight and included in a multi-layer loss function $H_m$ for the optimization of layers in that layer interface. The multi-layer loss function $H_m$ therefore sums the individual layer loss functions (e.g., sums multiple instances of the term |f(φ)−ϕ|, with one instance of this term per layer being optimized), and then adds the weighted total manufacturability score:

$$H_M = \sum \int \int |f(\psi) - \phi| + w_{tms} * \sum \alpha_i ISC \tag{7}$$

As a result, the resulting layer mask images are effectively co-optimized on a per-location (or, in some embodiments, on a per wafer shape-edge) basis to ensure that each particular shape location or edge of the design layout is manufacturable (i.e., the interactions (such as multi-layer interface overhang areas) between the wafer shapes on the multiple layers are fully taken into account during the optimization process).

In some embodiments, the iterative optimizer 3200 performs a similar process to the process 1700 shown in FIG. 17, with some notable changes. Specifically, the optimizer simulates the wafer images for each of the layers being optimized during each iteration, because none of the layers are necessarily constant from one iteration to another. Furthermore, the loss function used to determine how to modify the various images includes terms for each layer's simulated wafer image(s) to target wafer image(s) comparison, as shown in Equation 7, as well as a term encompassing all of the MLIs across the layers. In some embodiments, for each mask image (e.g., for a particular layer) for which a wafer image comparison term |f(φ)−ϕ| is included in the loss function, the optimizer computes gradients of that term with respect to each pixel of the mask image for that particular layer. The mask image optimizer also computes gradients of the term $w_{tms}*\Sigma\alpha_i ISC$ with respect to each MLI.

In a given iteration, modifications may be made to the mask images for one layer or multiple layers. For a given multi-layer interface (MLI) that includes overlapping wafer shapes representing IC components in each of two layers, the modifications to the mask images for a given iteration may modify mask shapes used to fabricate both of those IC components (i.e., modification of the relevant mask shapes in both layers), one of the IC components (i.e., modification of the relevant mask shapes in only one of the layers), or neither of the IC components (i.e., no modification of the relevant mask shapes in either layer).

The modification of multiple mask images at one time can be advantageous as the specific locations of components in one layer in some embodiments relies on the locations of other components in other layers. In some such embodiments, the mask images, when optimized, will be used to generate one or more masks for the layers, with each mask used in manufacturing of its corresponding layer.

Figure 33:
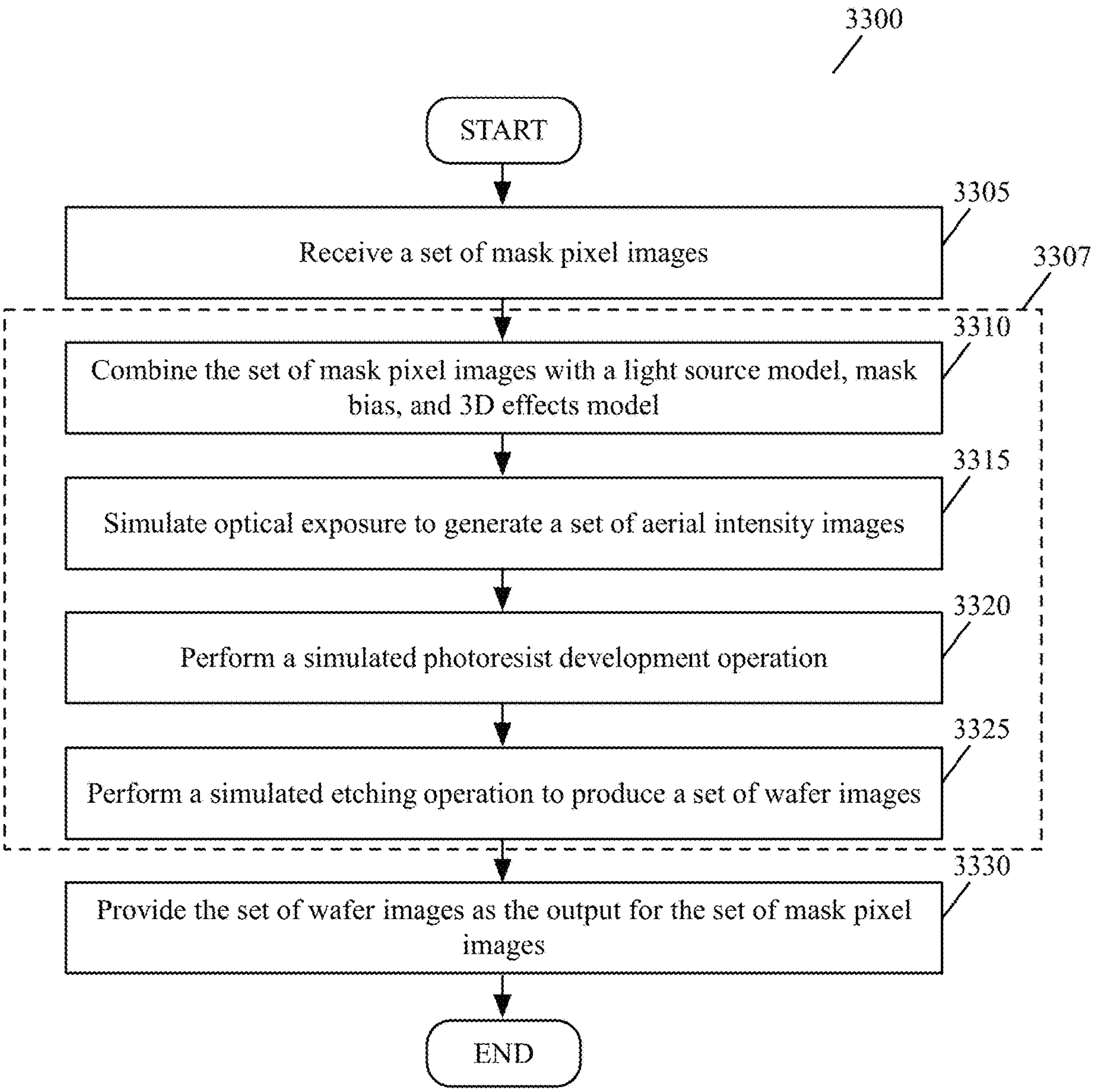

As discussed previously, some embodiments perform wafer simulation to generate simulated wafer images from mask pixel images, then use the simulated wafer images to modify the mask pixel images (or the mask images corresponding to those mask pixel images). FIG. 33 conceptually illustrates a process 3300 of some embodiments for performing wafer simulation. This process 3300 is performed in some embodiments by a wafer simulator (e.g., part of the mask production or other EDA tool) that performs wafer simulation using input mask images as part of the process of optimizing the mask layout. In other embodiments, however, other algorithmic processes may perform the process 3300.

The process 3300 begins by receiving (at 3305) a set of mask pixel images. In some embodiments, the set of mask pixel images corresponds to one or more layers of a design layout. The design layout, in some embodiments, is a finalized design layout (i.e., physical design and layout verification has been completed at this point) for an IC. The mask pixel images, in some embodiments, are based on mask images (e.g., contour mask images) that are attempts to generate a mask layout for fabricating the IC according to the design layout.

The wafer simulator of some embodiments receives the set of one or more mask pixel images from a rasterizer that rasterizes a set of mask images to generate the set of mask pixel images. In other embodiments, the wafer simulator receives the mask pixel images from a machine-trained (MT) network (e.g., a neural network) that rasterizes the set of mask pixel images from the set of mask images. In yet other embodiments, the wafer simulator itself performs the rasterization of the mask images to produce the set of mask pixel images.

Next, the process 3300 performs a set of operations 3310-3325, which can be referred to collectively as a forward operator 3307. As described above, this forward operator 3307 is the simulation process that computes a simulated wafer image from a mask image. First, at 3310, the process 3300 combines the set of mask pixel images with a light source model, a mask bias, and a 3D effects model. At 3315, the process 3300 simulates optical exposure to generate a set of aerial intensity images. At 3320, the process 3300 performs a simulated photoresist development operation, and, at 3325, the process 3300 performs a simulated etching operation to produce a set of wafer images. These wafer images provide a simulation of what the wafer would look like when actually physically fabricated using the mask(s) associated with the set of mask pixel images.

Lastly, the process 3300 provides (at 3330) the set of wafer images as the output for the set of mask pixel images. Generating the set of wafer images from the forward operator 3307, the wafer simulator outputs the set of wafer images as its output. The process 3300 then ends. The set of wafer images can be used to modify mask images corresponding to the set of wafer images, for example, by computing a loss function that specifies a difference between the set of wafer images and a set of target wafer images (generated, e.g., using a low pass filter, Gaussian convolution, and/or corner rounding algorithm on an interconnect layer of a design layout). In some embodiments, after the wafer simulator generates the set of wafer images, a set of wafer contours is generated from the set of wafer images. In some of these embodiments, the set of wafer contours is used to modify the mask images, for example, by computing a loss function expressing the difference between the set of wafer contours and a set of target wafer contours.

The above-described process 3300 is performed by a wafer simulator that uses mask images to generate the simulated wafer images. Rather than using a wafer simulator, some embodiments use an MT network (e.g., a neural network) to produce the simulated wafer images that are then used to modify one or more mask images. Because multiple wafer aerial images (e.g., simulated wafer images for various different process conditions, including misalignments and different process extremes) are generated for each layer being optimized as well as the neighboring layers, some embodiments use an MT network to increase speed and efficiency of the wafer simulation (and therefore the optimization process).

Figure 34:
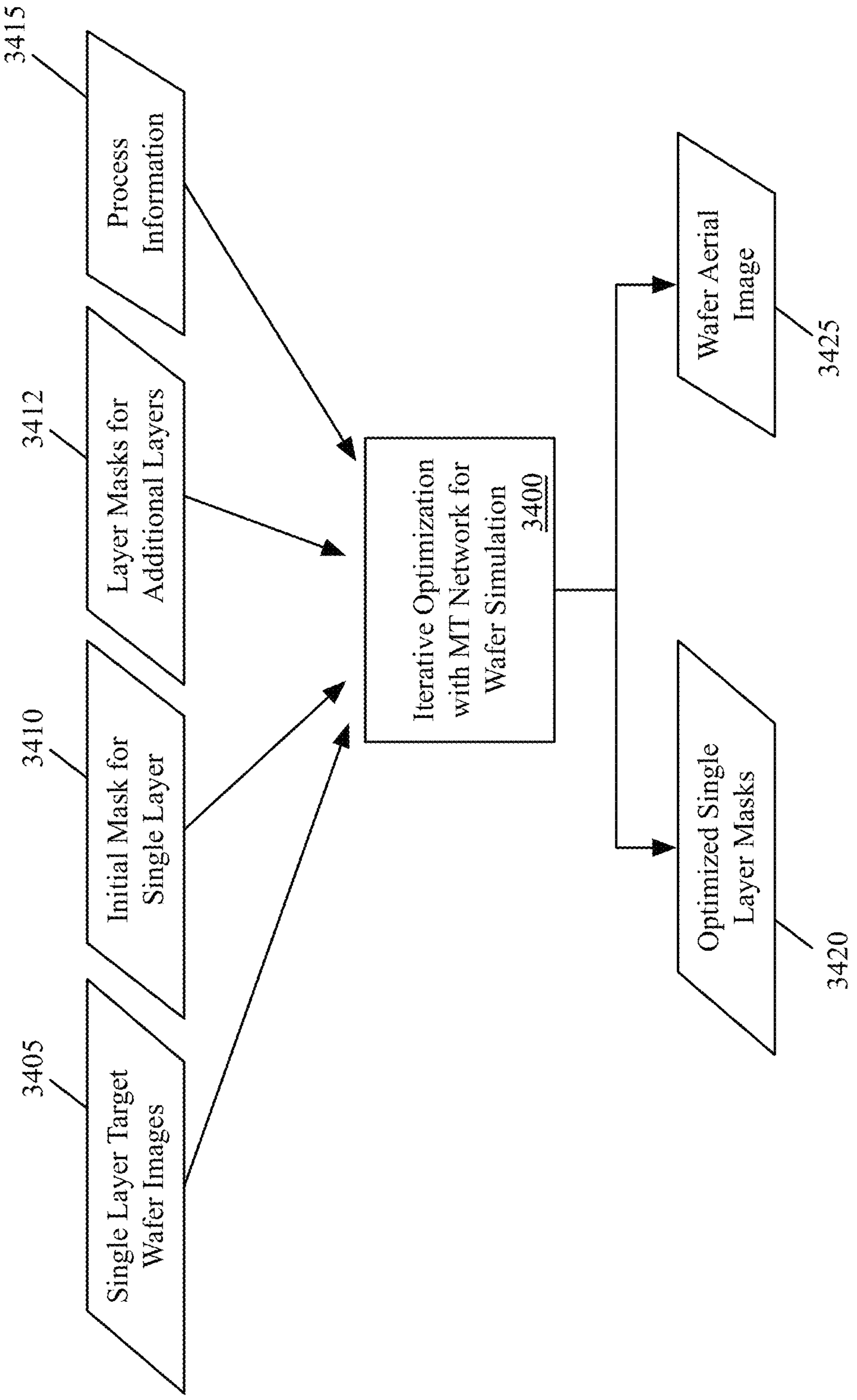
FIG. 34 conceptually illustrates an example of a high level mask image optimization process of some embodiments that uses inputs corresponding to multiple layers while leveraging deep learning to produce an optimized mask image for a single layer.

FIG. 34 conceptually illustrates an example of a high level mask image optimization process 3400 of some embodiments that uses inputs corresponding to multiple layers while leveraging deep learning (e.g., an MT network or networks) to produce an optimized mask image (or set of mask images) for a single layer. Like the optimization process 1600, the iterative optimization process 3400 receives as inputs target wafer image(s) 3405 for a single layer (the primary layer to optimize), an initial mask 3410 for that primary layer, the masks 3412 (which in some embodiments are already optimized) for one or more neighboring layers, and process information 3415 (e.g., the process model, process variability or conditions, etc.). The output of the optimization process 3400 is the same as for the process 1600, an optimized set of mask images 3420 for the primary layer as well as one or more wafer aerial images 3425 generated for the optimized mask layout.

Rather than performing a dedicated set of operations (e.g., as shown in FIG. 33) to determine the wafer aerial images for the input layer targets, the iterative optimization process 3400 generates these simulated wafer images using an MT network (e.g., a trained neural network). Such an MT network (or other deep learning model) can quickly infer wafer images for each layer based on the mask images received as input. In some embodiments, the implementation and approach described in U.S. patent application Ser. No. 16/949,270, now published as U.S. Patent Publication 2022/0128899, is used to determine the wafer aerial images from the layout design.

Because the MT network (or multiple MT networks to generate different wafer simulations for different process variations) is used only for inference during optimization (i.e., training will have been previously completed), the optimization process of such embodiments can run fairly quickly. As discussed above, the simulation for the adjacent layers (whether performed with an MT network or traditional wafer simulation need only be performed once (i.e., as an up-front operation) rather than every optimization iteration. Some embodiments compute the primary layer wafer simulation from the current mask images using a lithography simulation each iteration, after determining the wafer simulations for the adjacent layers once using the MT network. Other embodiments use the MT network for each simulated wafer image (i.e., each iteration through the optimization process). The implementation and approach described in U.S. Patent Publication 2022/0128899 is based on a convolutional neural network, and in particular a convolutional neural network with a U-net based architecture. In some embodiments, other high-performing computer-vision based neural networks are also deployed without departing from the spirit of the art.

Some embodiments use the MT network(s) for a multi-layer co-optimization process similar to that of FIG. 32. In this case, a mask-to-wafer digital twin (trained MT network) is used to quickly infer the simulated wafer aerial images corresponding to each of the layers being co-optimized, given the per-layer sets of mask images for a current iteration.

In some embodiments, prior to performing the co-optimization operations, each of the sets of mask images is individually optimized in a single layer manner using traditional mask image optimization (i.e., without accounting for multi-layer interaction). In other embodiments, the individual layer mask image optimizations are adjacent-layer aware, as described above. After the initial optimization, additional iterations are performed in some embodiments to perform co-optimization. In some such embodiments, the mask-to-wafer digital twin MT network is used to produce wafer aerial images for each of the multiple layers, given the mask images for each iteration. In some embodiments, these wafer images are then processed and aggregated to produce a manufacturability loss term or terms that are included in a multi-layer loss function $H_m$ within the co-optimization loop iterations. In some embodiments, one or more additional iterations are optionally employed using the full lithography simulation operations (e.g., shown in FIG. 33), rather than the mask-to-wafer digital twin MT networks.

As a result of these processes, multiple layers of mask images are co-optimized for optimal manufacturability, taking all interactions between the wafer shapes (such as overhang based on z-axis analysis, conjunctive analysis, or simplified conjunctive analysis) on the various layers into account. Additionally, the speed of the digital twin inference operation vastly improves the overall throughput and ensures tractability.

Figure 35:
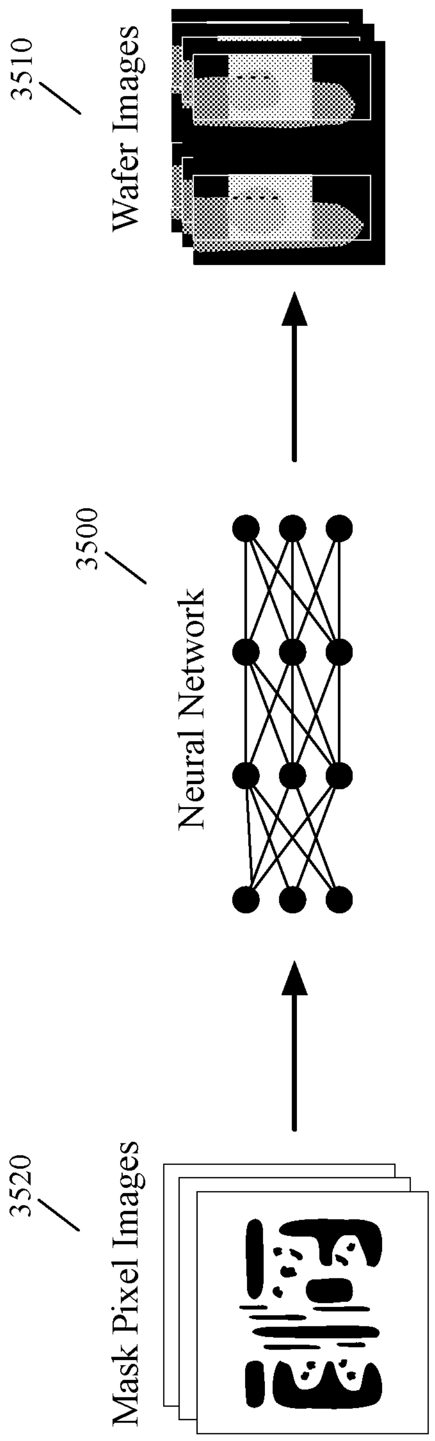
FIG. 35 conceptually illustrates the use of a neural network to produce an output of wafer images from a set of mask pixel images.

FIG. 35 conceptually illustrates the use of a neural network 3500 to produce an output of wafer images 3510 from a set of mask pixel images 3520. This figure illustrates the use of a neural network 3500 to infer wafer images 3510 from input data (mask pixel images) 3520. When neural networks are executed on modern GPU architectures, the inference time, even for relatively large designs, can be reduced to interactive time frames (i.e., within seconds). In some embodiments, each set of one or more mask pixel images 3520 for a particular layer of the design layout is provided as input to the neural network 3500, which outputs one or more wafer images 3510 for the layer (e.g., multiple different wafer images for different sets of process conditions). It should be noted that while some embodiments employ neural networks, other embodiments use other machine learning processes to formulate predictions as to the eventual shapes that would result once the IC is manufactured.

Figure 36:
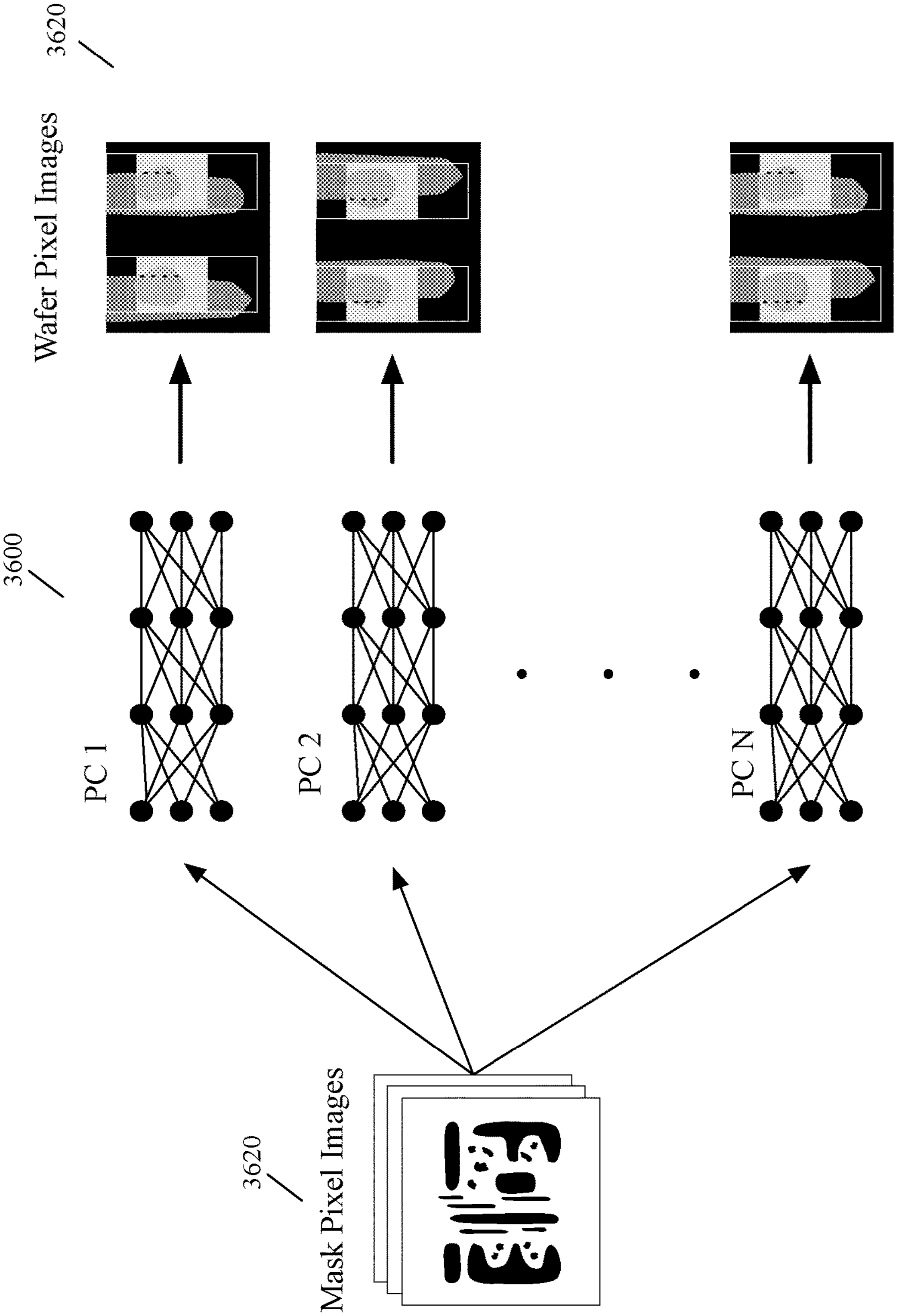
FIG. 36 conceptually illustrates multiple networks, each trained to generate a different wafer image for a different mask pixel image received as input.

Instead of one neural network, other embodiments use N neural networks, with each neural network producing one of N different predicted output wafer images for a set of one or more mask pixel images for a layer. For example, if generating multiple simulated wafer images (e.g., for different sets of process conditions) from a set of mask pixel images, multiple different copies of a single-output network can be used. For instance, one network might generate a simulated wafer image for the minimum process condition set and a first misalignment, a second network might generate a simulated wafer image for the maximum process condition set and the first misalignment, a third network might generate a simulated wafer image for the nominal process condition set and a second misalignment, etc., for each possible set of process conditions and misalignments. These multiple networks can be trained in parallel, such that the networks have the same network structure but different trained weight values. FIG. 36 conceptually illustrates multiple networks 3600, each trained to generate a different wafer image 3610 for a layer given a set of one or more mask pixel images 3620 received as input.

While FIGS. 35 and 36 illustrate the use of one or more neural networks to produce wafer images from mask pixel images, other embodiments use other algorithmic processes to generate wafer images. Still other embodiments use machine-trained networks to produce a first set of wafer images while using other algorithmic process to produce a second set of wafer images. Any suitable combination of machine-trained networks (e.g., neural networks) and other algorithmic processes may be used to perform the operations described throughout the specification.

Figure 37:
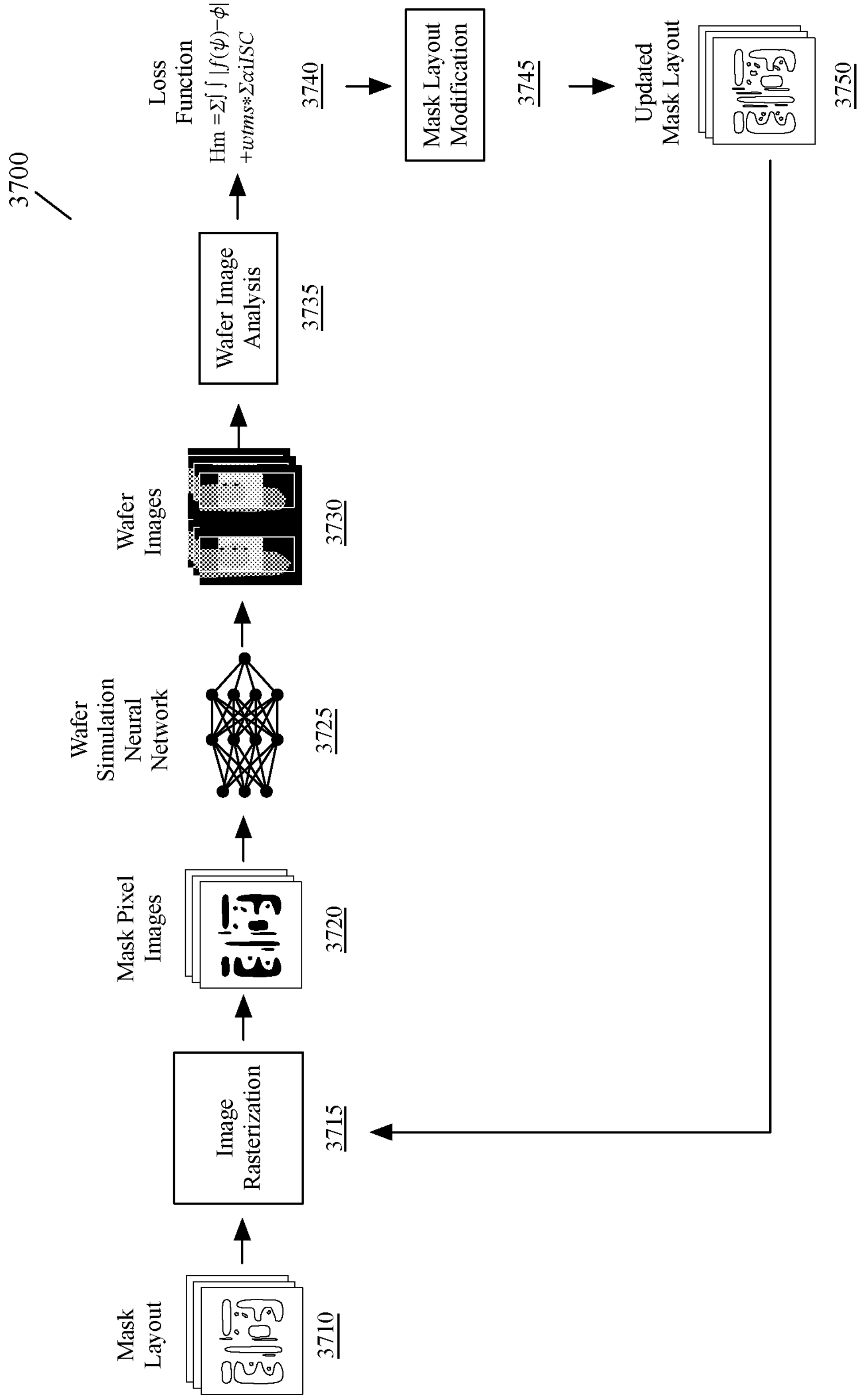
FIG. 37 illustrates a novel approach to perform mask image optimization by utilizing a wafer simulation neural network.

Furthermore, some embodiments use a machine-trained network (e.g., a neural network) to rasterize mask images into mask pixel images. A machine-trained network similar to the neural network 3500 or the neural networks 3600 may be used for rasterization. Examples of neural network models are described in U.S. patent application Ser. Nos. 16/949,270 and 17/992,870, now published respectively as U.S. Patent Publications 2022/0128899 and 2023/0168660, which are incorporated herein by reference FIG. 37 illustrates a novel approach 3700 to perform mask image optimization by utilizing a wafer simulation neural network. In this approach, at 3715, image rasterization is performed on a mask layout 3710 (or a layer of a mask layout) to produce one or more mask pixel images (e.g., one mask pixel image for each mask image in the mask layout 3710), which are referred to below as 2-D images (e.g., multi-channel 2-D images). Rasterization is the process of taking an image described in a geometrical/vector graphics format (shapes) and converting that image into a raster image (a series of pixels, dots or lines, which, when displayed together, create the image which was represented using shapes). In some embodiments, a machine-trained network performs the image rasterization 3715. In other embodiments, other algorithmic processes perform the rasterization 3715. An example of such a multi-channel 2-D image is a pixel dose map (like the pixel dose map 1810 of FIG. 18).

In some embodiments, the image rasterization process 3715 produces white pixels for fully-filled pixels (e.g., pixels not covering any shapes representing holes that will be produced on a mask from the mask layout), black pixels for fully-empty pixels (e.g., pixels fully covered by shapes representing holes that will be produced on a mask from the mask layout), and grey pixels for partially-filled pixels. In some of these embodiments, fully filled pixels are represented with the numerical value 1.0, fully empty pixels are represented as 0.0, and partially filled pixels are represented with a value in the range [0,1] representative of the area of the pixel which is filled by the shape (e.g., a pixel that is 50% filled will have a value of 0.5). Before rasterizing each mask image of the mask layout 3710, some embodiments decompose each mask image into several components (e.g., several transparent areas, several SRAFs, etc.), which are then individually rasterized.

The multi-channel 2-D images 3720 are then used as the primary input to the wafer simulation neural network 3725 (or set of multiple neural networks), which produces a set of one or more wafer images 3730. In some embodiments, the neural network 3725 produces wafer pixel images, which are then converted into wafer contours in post processing operation 3735. In other embodiments, the neural network 3725 produces the wafer contours directly. The different wafer images 3730 that are generated for a single layer correspond to different sets of process conditions and/or misalignment; in addition, some embodiments generate wafer images 3730 for multiple different layers of the design layout (based on different sets of mask images for corresponding mask layers). The machined-trained network 3725 is referred to in some embodiments as the "digital twin" of the lithographic simulation process that performs wafer simulation using mask pixel images.

In some embodiments, the wafer images 3730 produced by the trained neural network 3725 are analyzed to generate a value for the loss function 3740. To this end, the wafer images 3730 are supplied to a wafer image analysis operation 3735, which produces the loss function 3740 as output. As shown, this loss function 3740 (e.g., Equation 6 described above) includes terms that account for each of the sets of mask images of the mask layout 3710 that are being optimized. In this example, the loss function 3740 is a summation of individual loss functions, with each individual loss function included to optimize a different layer's mask image(s) of the mask layout 3710. When optimizing for only one layer of the mask layout 3710, the loss function 3740 would use Equation 5. When also considering extreme process conditions as a separate loss function term, the loss function 3740 would include an additional term for an extreme process variation score (as in Equation 7).

After generating the loss function 3740, some embodiments perform mask layout modification at 3745 to modify the mask layout 3710 using the loss function 3740. To perform these modifications, some embodiments compute a set of gradient computations on the terms of the loss function, which indicate how to modify one or more mask images of the mask layout 3710. The mask layout 3710 can then be modified based on these computed gradients. The result of this modification is an updated mask layout 3750. In some embodiments, multiple iterations of mask layout optimization are performed. In some such embodiments, after the mask layout is updated at 3750, the updated mask layout is again rasterized (at 3715) to generate a new set of mask pixel images, which are used to update the mask layout again.

In some embodiments, rather than modifying the mask layout 3710 (at operation 3745), other embodiments modify the mask pixel images 3720. In such embodiments, the mask pixel images are iteratively updated, and once optimization has ended, a contouring operation is performed to generate an optimized mask layout from the optimized mask pixel images. For example, in some embodiments, the mask layout 3710 is rasterized into a set of pixel dose maps (one pixel dose map per mask image), the set of pixel dose maps are modified at 3745, and once optimization is complete, the optimized pixel dose maps are converted back into the contour domain to get an optimized mask layout.

To train the neural network 3725, some embodiments use known input sets (e.g., known mask layouts) with known output sets (e.g., corresponding wafer images). To produce these known input/output sets, some embodiments use an algorithmic wafer simulation approach, such as the lithographic simulation process 3300 of FIG. 33. During training, groups of known input sets are rasterized, propagated through the neural network 3725, and post-processed to produce groups of output sets. The difference between each produced group of output sets and the known output sets of each group of known input sets is an error value that is backpropagated through the neural network 3725 to train its trainable parameters (e.g., its weight values, bias values, etc.). Some embodiments perform the training once per process technology, and then perform the operations of FIG. 37 to perform the mask layout optimization once or more than once during IC design.

Figure 38:
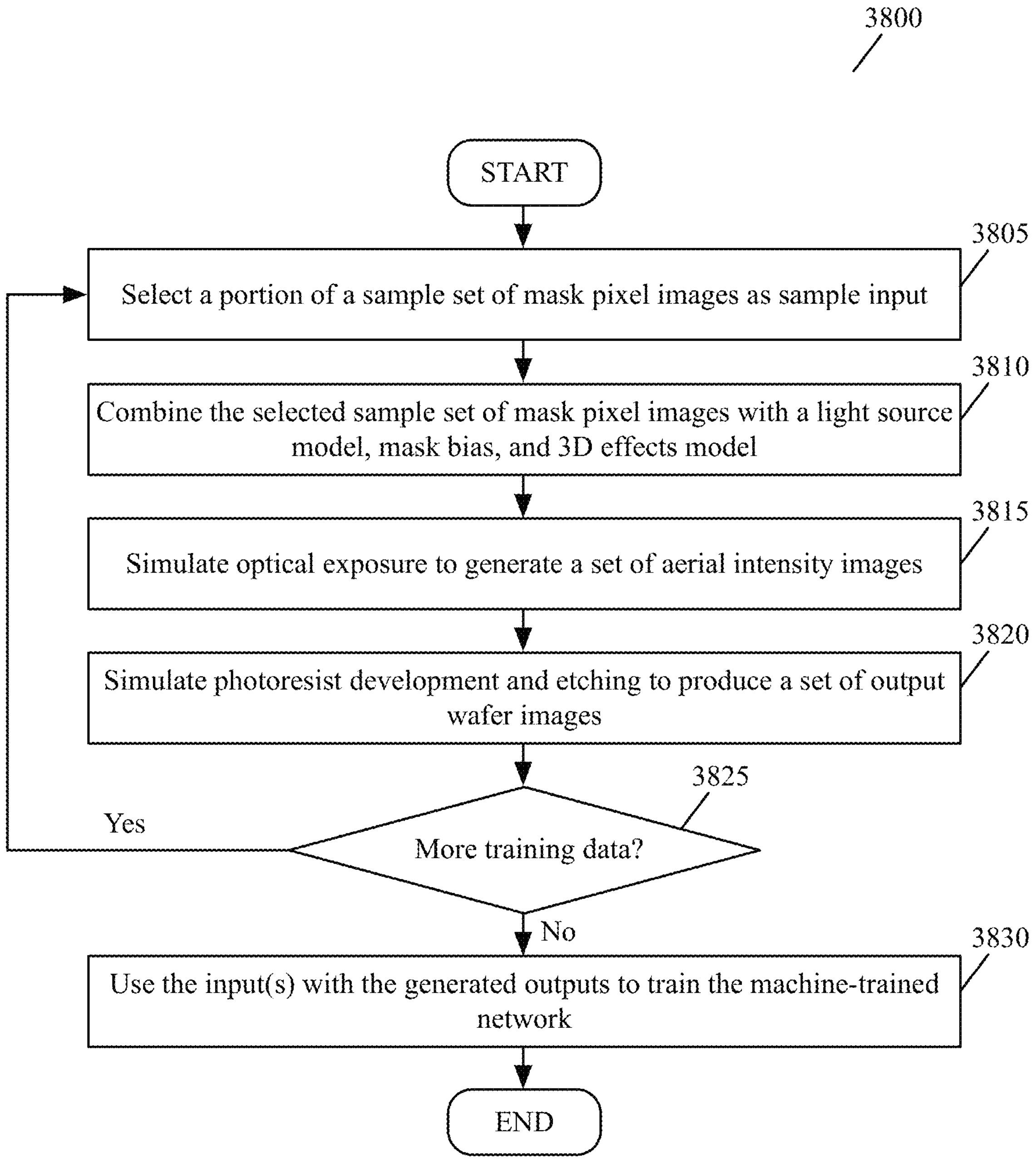
FIG. 38 conceptually illustrates a process of some embodiments for generating training data to train one or more MT networks to produce wafer images based on mask pixel images of a mask layout for an IC design or a portion of an IC design.

FIG. 38 conceptually illustrates a process 3800 of some embodiments for generating training data to train one or more MT networks (e.g., one or more neural networks) to produce wafer images based on mask pixel images of a mask layout for an IC design or a portion of an IC design. This process 3800 is performed in some embodiments to generate training data to use in training the configurable parameters of one or more MT networks (e.g., the networks shown in FIGS. 35-37) such that these MT networks can be used to optimize a mask layout that is produced for a design layout of an IC.

The process 3800 begins by initially selecting (at 3805) a portion of a sample set of mask pixel images as sample input for which the process needs to generate one or more predicted output wafer images. in some embodiments, the process 3800 uses multiple different sample mask layouts from which sample input mask pixel images are extracted. The extracted input mask pixel image set corresponds to a previously defined physical design, which may or may not have been used to manufacture an IC on a substrate (such as a silicon wafer). In some embodiments, the process 3800 selects a portion of a sample set of mask images from one or more mask layouts, and then rasterizes the mask images into mask pixel images.

Next, the process 3800 combines (at 3810) the selected sample set of mask pixel images with a light source model, mask bias, and 3D effects model, and simulates (at 3815) optical exposure to generate a set of aerial intensity images. The process 3800 then simulates (at 3820) photoresist development and etching to produce a set of known output wafer images. These known output wafer images indicate what the wafer would look like when fabricated using the mask(s) associated with the set of mask pixel images.

At 3825, the process 3800 determines whether a sufficient number of known input mask pixel images and output wafer images have been generated. If not, the process returns to 3805 to select another input set of mask pixel images from one or more previously defined mask layouts, and then repeats operations 3810-3820 to produce the simulated set of wafer images for this input mask pixel image set. As mentioned above, the selected input mask pixel images and their corresponding generated output wafer images represent known inputs with known outputs that are used to train the MT neural network in some embodiments.

Calculating a pattern to be manufactured on a substrate by calculating several wafer simulation patterns from several calculated mask images, which are calculated from several mask designs, can take significant time. Accordingly, some embodiments use the process 3800 of FIG. 38 to generate numerous sets of known inputs/outputs, and then use these known inputs/outputs (at 3830) to train an MT network (e.g., a neural network) so that this MT network can later be used to quickly produce predicted wafer images from input mask pixel images that are examined during mask optimization processes.

The process 3800 described above uses sample mask pixel images as input for training data of an MT network. In other embodiments, sample mask images (i.e., mask images that have not been rasterized into mask pixel images) are used as input for the training data. In such embodiments, the mask images will be used as input for the MT network to produce predicted wafer images.

Figure 39:
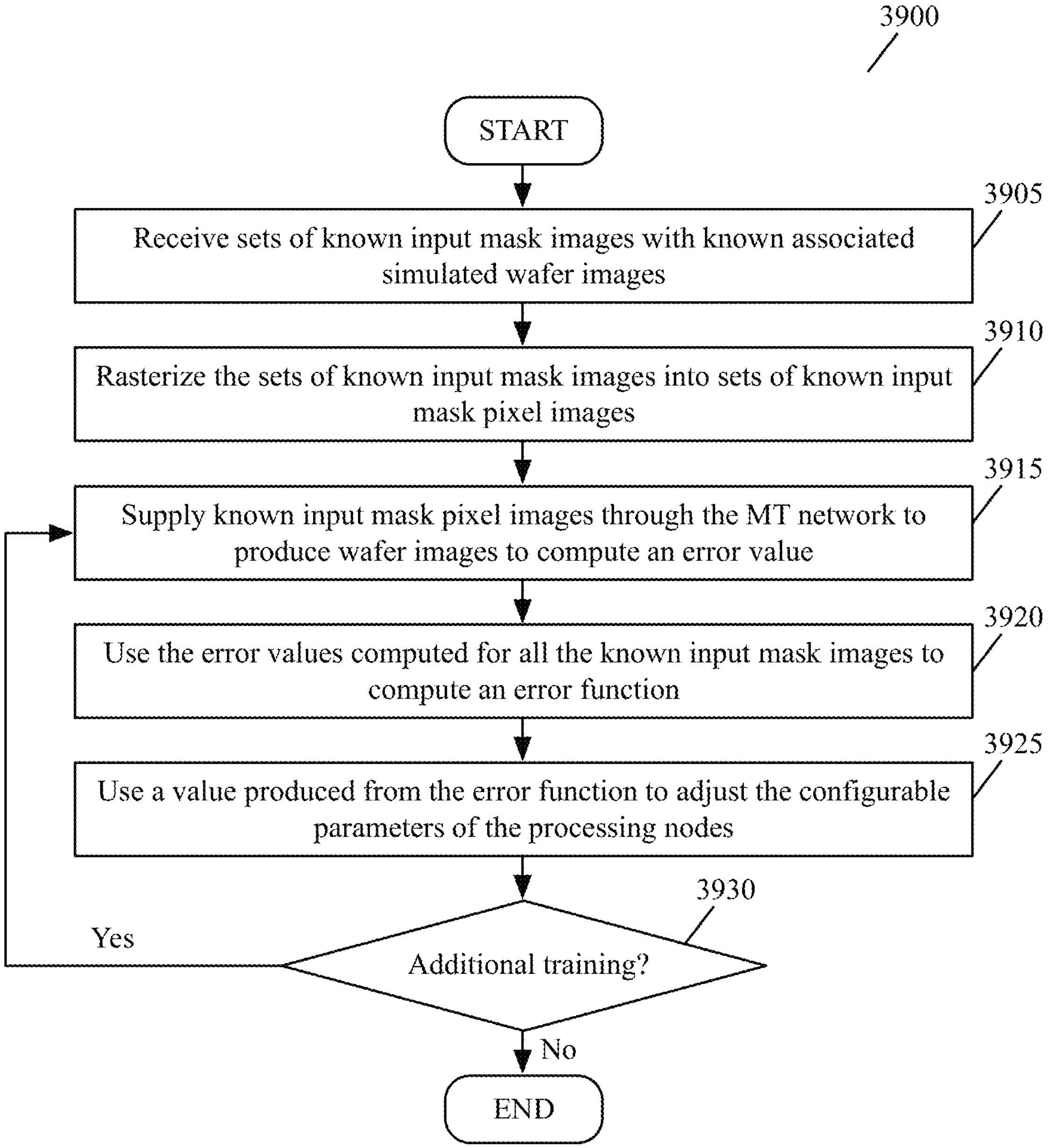
FIG. 39 conceptually illustrates a process of some embodiments for training the configurable parameters of an MT network with several processing nodes to use during optimization of a mask layout that is produced for a design layout of an IC.

FIG. 39 conceptually illustrates a process 3900 of some embodiments for training the configurable parameters of an MT network with several processing nodes to use during optimization of a mask layout that is produced for a design layout of an IC. This process 3900 is performed in some embodiments to train the MT network so that the network can be used to produce wafer images from mask images corresponding to one or more layers of the design layout during optimization of the mask images. The wafer images represent what would be manufactured for the layers when using fabricated masks based on the mask images. Once optimized, the mask images are be used to fabricate masks used in manufacturing an IC with the layers of the design layout.

The process 3900 begins by receiving (at 3905) sets of known input mask images with known associated simulated wafer images. The process 3900 of some embodiments receives sets of known input mask images from one or more mask layouts for one or more design layouts to train the MT network. For example, the sets of known input mask images in some embodiments include different known input mask images for different IC layer types, such as device layers, substrate layers, wiring/interconnect layers (i.e., metal layers), and intervening layers (e.g., via layers between two metal layers, contact layers between metal layers and device layers, etc.). Using different layer types' mask images in training the MT network ensures the MT network will be able to generate wafer images for different types of layers.

To generate the known associated simulated wafer images, some embodiments, before performing the process 3900, (1) rasterize the sets of known input mask images into sets of known input mask pixel images, and (2) perform a wafer simulation operation to generate the known associated simulated wafer images from the sets of known input mask pixel images (e.g., the process 3800 described above).

Next, the process 3900 rasterizes (at 3910) the sets of known input mask images into sets of known input mask pixel images. Some embodiments use another pre-trained MT network that rasterizes images into pixel images. In other embodiments, this is performed using other algorithmic processes. Other embodiments do not rasterize the known input mask images into known input mask pixel images, and instead use the mask images as the input for the MT network.

The process 3900 then supplies (at 3915) known input mask pixel images through the MT network. These input mask pixel images are propagated through the MT network to produce output wafer images. For each input mask pixel image, the output wafer image (or set of images) is compared with the known simulated wafer image for that input mask pixel image to compute an error value. Some embodiments compute the error value based on a difference between the output wafer images and the known associated simulated wafer images. After computing the error, the process 3900 uses (at 3920) the error values computed for all the known input mask images to compute a value for a loss (error) function.

Next, the process 3900 uses (at 3925) the value for the loss function to adjust the configurable parameters of the MT network's processing nodes. Once the loss function value is computed, some embodiments backpropagate the value through the MT network's processing nodes to determine gradients for the loss function with respect to each parameter, then use these gradients to adjust the configurable parameters (e.g., the weight values) of the processing nodes.

Lastly, the process 3900 determines (at 3930) whether additional training of the MT network's processing nodes is required. In some embodiments, multiple iterations (e.g., multiple batches) of known input mask images are propagated through the network to iteratively adjust the configurable parameters, until a set of criteria for completing the training is reached. This set of criteria can specify a minimum error threshold, a number of iterations, etc.

If the process 3900 determines that additional training is required, the process 3900 returns to 3915 to supply another batch of known input mask pixel images through the MT network and to continue adjusting the configurable parameters. If the set of criteria for ending the iterating is not met, the process 3900 continues to iterate through steps 3915-3925. Once the process 3900 determines that additional training is not required, the process 3900 ends.

Some embodiments perform mask layout optimization by considering multiple layers at a time in order to more efficiently and accurately optimize the mask layout. In such embodiments, because the mask layout optimization has already accounted for the effects of the layers on their adjacent layers, DFM rules defined for the mask layout and/or the design layout do not have to account for these effects as much as they would traditionally. As such, these methods of optimization allow for more lenient DFM rules.

Figure 40:
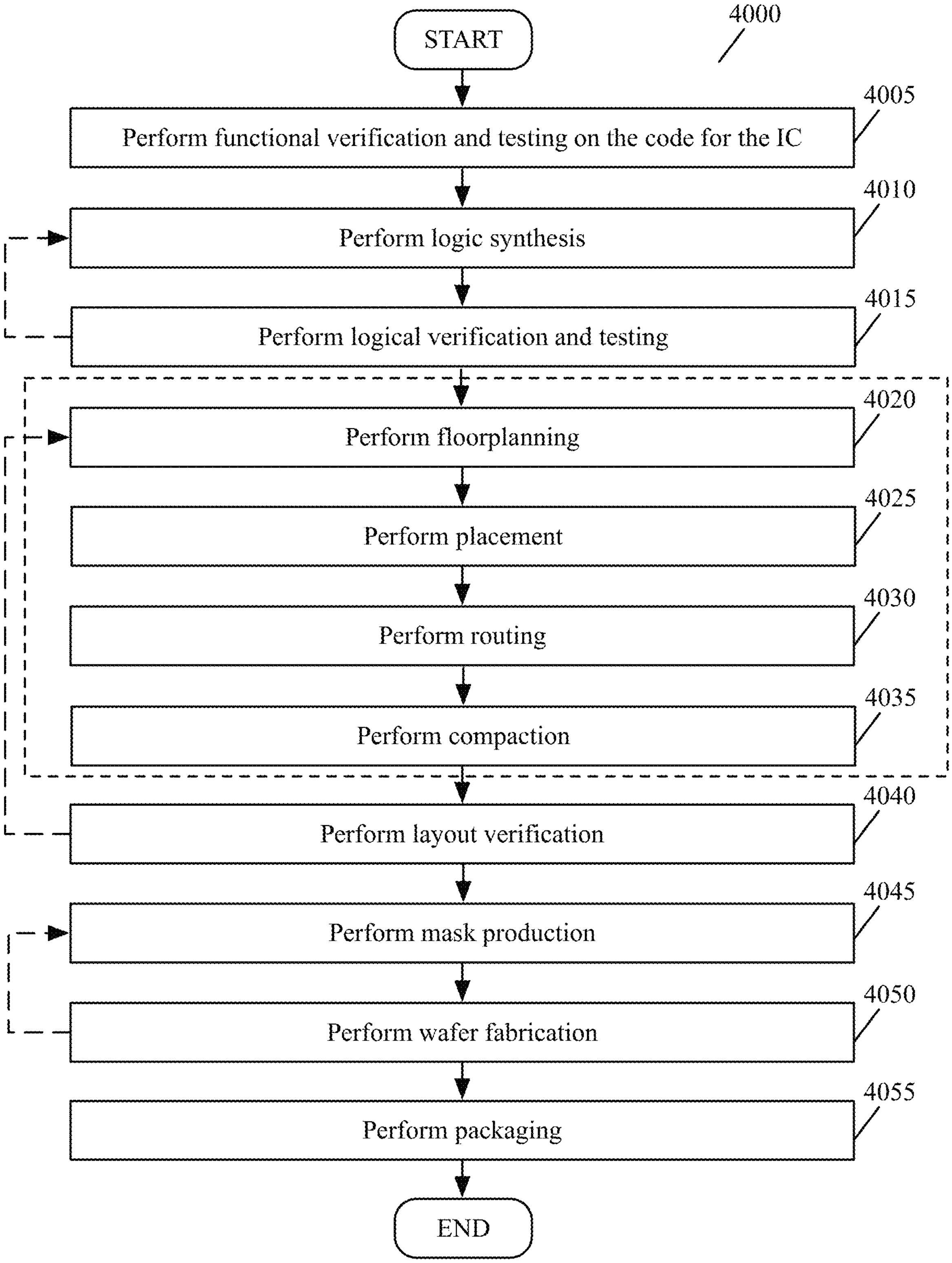
FIG. 40 conceptually illustrates a process of some embodiments for an overall EDA flow.

The above-described embodiments describe using multiple layers of a mask layout to optimize one or more of those mask layout layers. Mask layout optimization, and mask production more generally, is one step in the overall process to design and manufacture an IC. FIG. 40 conceptually illustrates an example of one such process for designing and manufacturing an IC. The process 4000 of this figure uses the mask optimization techniques described above to ensure that the masks produced from this process (i.e., that are used to fabricate wafers for ICs) are accurate and that the overlaps between layers are resilient to manufacturing process variations.

The process 4000 begins (at 4005) by defining the code that specifies the IC design and performing functional verification and testing on this code. In some embodiments, the process uses one of the common hardware description languages (HDL) to specify the code. The HDL code in some embodiments describes the desired structure, behavior, and timing of the IC. To perform functional verification and testing on the code for the IC, some embodiments specify one or more modules and/or circuit components in the code and check the specified modules and/or circuit components for functional accuracy.

Next, the process 4000 performs (at 4010) a synthesis operation, which converts the HDL description into a circuit representation that commonly includes digital circuit components, such as logic gates, flip-flops, and other larger digital components (e.g., adders, multipliers, etc.). The synthesis operation is typically performed by a synthesis tool.

At 4015, the process 4000 performs verification and testing on the circuit representation that is produced by the synthesis operation. In some embodiments, the verification and testing checks the circuit representation to determine whether this representation meets desired timing constraints and satisfies any other constraint of the HDL code. When the verification and testing fails (e.g., if a portion of the circuit representation fails to meet a constraint), the process 4000 returns to step 4010 (as denoted by a dashed arrow line) to reperform synthesis to modify the circuit representation to resolve this failure.

When the verification and testing at 4015 passes, the process 4000 performs a set of physical design operations 4018, which include operations 4020-4035 between which the process 4000 can iterate through multiple times as further described below. At 4020, the process 4000 performs a floorplanning operation that defines a general location for some or all of the circuit blocks (e.g., for various large circuit blocks). For instance, in some embodiments, floorplanning divides the design layout into one or more sections devoted to different purposes (e.g., ALU, memory, decoding, etc.), and assigns some or all of the circuit blocks to these sections based on the purposes served by these blocks.

At 4025, the process 4000 performs a placement operation, which is based on the floorplanning data and defines a specific location and orientation in the design layout for each circuit block. The placement operation in some embodiments is an automated process that tries to find an optimal placement for each circuit block based on one or more optimization criteria, such as congestion or estimated length of interconnects (e.g., metal wires) needed for connecting the nets associated with the circuit blocks. A net in some embodiments includes a set of two or more pins of one or more circuit blocks that need to be connected electrically (e.g., through a set of wires, contacts, and/or vias). After performing the placement operation, the process 4000 might return to the floorplanning operation if it determines that the floorplanning should be revised to improve the result of the placement operation.

Once the placement operation is completed satisfactorily, the process performs (at 4030) a routing operation to define the route needed to connect each net (i.e., to connect each set of pins that needs to be interconnected). Each defined route includes one or more interconnect segments (also called wire segments) that traverse one or more interconnect layers (also called wiring layers), and one or more vias and/or contacts that connect pins and/or wire segments on different wiring layers.

To define the routes, some embodiments divide the routing operation into a global routing operation and a detailed routing operation. For each net, global routing defines a global route that more generally defines the route for the net (e.g., defines a general area in the design layout traversed by the route). For instance, in some embodiments, the global router divides an IC into individual global routing areas, called Gcells. Then, a global route (Groute) is created for each net by listing the global routing areas (the Gcells) that the Groute for the net should pass through.

The detailed routing defines the actual route for each net (e.g., the route that connects the set of pins that forms the net). As mentioned above, each defined route includes one or more interconnect segments that traverse one or more interconnect layers, and one or more vias and/or contacts that connect pins and/or wire segments on different interconnect layers. In performing its detailed routing operation, the detailed router of some embodiments uses the global router's Groute data, e.g., by biasing its detail route search for the net to the Groute regions traversed by the Groute defined by the global router.

During or after the detailed routing operation, the process 4000 performs a design rule check (DRC) operation to ensure that the defined routes do not violate design rules. One example of the design rule check that is done for a route is to ensure that the route is not closer than an acceptable minimum spacing requirement on each layer traversed by the route to another route or another component in the design layout on that layer. Routes that violate minimum spacing constraints can cause undue capacitance and, in some cases, electrical shorts on the IC.

The process 4000 in some embodiments can iterate through the global and detailed routing multiple times to identify better Groutes for some nets in order to improve the detailed routes for these nets or other nets. Also, the process 4000 in some embodiments can return from either of these routing operations to an earlier operation in the EDA flow (e.g., to the placement operation) in order to improve the results of this earlier operation to improve the routes defined by the later routing operation.

After routing, the process 4000 performs (at 4035) compaction operations. In some embodiments, the compaction operation compresses the design layout in one or more directions to decrease the size of the IC die (e.g., to decrease the two-dimensional area of the IC die) that would be manufactured based on the design layout. Reducing the size of the IC improves the performance of the IC in some embodiments. A compacted design layout also lowers costs of the ICs manufactured using the design layout by allowing more ICs to be produced for a given wafer size.

After the compaction operation, the process 4000 performs a layout verification operation (at 4040) to ensure that the compacted design layout (e.g., the compacted routes in this design) to ensure that the layout meets one or more verification criteria. This verification operation includes a DRC operation that ensures that the compacted design layout does not violate design rules. One example of the DRC that is done for a route is to ensure that the route is not closer than an acceptable minimum spacing requirement on each layer traversed by the route to another route or another component in the design layout on that layer. Other examples of the DRC include performing minimum area, minimum width, and maximum curvature of shapes (e.g., routes, pins, contacts, vias, or other components) of items in the design layout.

The layout verification in some embodiments includes other operations, such as extraction. Extraction in some embodiments computes parasitic values (e.g., parasitic capacitance values or parasitic inductance values) exerted on items (e.g., wire segments) in the design layout. In some embodiments, the extraction operation computes capacitance coefficients for one or more conductive components in the design layout (e.g., for each wire segment of a route, or for the entirety of each route, in the design layout), and uses the capacitance coefficients to compute parasitic influence (e.g., capacitance, resistance, or inductance) on the conductive component(s).

After the compaction operation at 4035 or the subsequent verification operation 4040, the process 4000 in some embodiments can return to an earlier operation in the EDA flow (e.g., to the placement operation, to the global routing operation, or to the detailed routing operation) in order to improve the results of this earlier operation to improve the compacted design defined by the later compaction operation. For instance, when the design is not verified at 4040 (e.g., if a problem with the design is detected during verification), the process 4000 returns to an earlier physical design operation 4020 to 4035 to reperform this physical design operation, and any subsequent physical design operation, for a portion or for the entire design layout. In some embodiments, the design layout that exists after the compaction operation and that passes the subsequent verification operation 4040 on this layout is the end result of the physical design process, is called the physical design layout, and is used as the input to the subsequent operations 4045-4055 that form the manufacturing sub-process of the process 4000.

In some embodiments, the physical design sub-process includes other operations that are not displayed in FIG. 40. These other operations are not displayed for purposes of brevity. Examples of such operations include partitioning, power planning, and clock tree synthesis (CTS). In some embodiments, partitioning divides the design layout into similar-sized subsets and ensures a minimum number of connections between subsections. Power planning defines the power delivery network (PDN) that includes the interconnects for delivery power from the power supply circuit to circuits defined by the IC design layout. CTS in some embodiments defines a clock delivery network for delivering one or more clock signals to circuits defined by the IC design layout. CTS in some embodiments also inserts buffers and/or inverters along the clock signal paths on the clock delivery network in order to balance the load and decrease or eliminate any clock skew or delay.

The manufacturing sub-process includes a mask production operation (at 4045) that is performed in some embodiments once the physical design verification operation (at 4040) is performed, and the physical design layout is verified to pass the one or more verification criteria. In some embodiments, mask production includes mask layout generation, mask simulation, and wafer simulation. Mask layout generation defines the mask layout using commonly known techniques, such as OPC (optical proximity correction) and/or ILT (inverse lithography technology) operations.

During or after the mask layout generation, the process 4000 performs an MRC operation to ensure that the shapes defined in the mask layout do not violate MRC rules. Examples of the MRC rules include minimum spacing, minimum width, maximum curvature, and minimum area for shapes in the mask layout.

The mask simulation operation simulates the production of the mask using the generated mask layout. Mask simulation includes operations such as mask data preparation (MDP) and Mask Process Correction (MPC) in some embodiments. MDP in some embodiments prepares the mask layout for a mask writer. This operation in some embodiments includes "fracturing" the data into trapezoids, rectangles, or triangles. MPC in some embodiments geometrically modifies the shapes and/or assigns doses to the shapes to make the resulting shapes on the mask closer to the desired shape. MDP may use as input the generated mask layout or the results of MPC. MPC may be performed as part of a fracturing or other MDP operation. Other corrections may also be performed as part of fracturing or other MDP operations. Also, in some embodiments, the mask simulation operation calculates several possible mask images by using charged particle beam simulation.

The wafer simulation operation in some embodiments calculates possible patterns that would be produced on the manufactured IC by using the masks that would be generated based on the mask layout. In some embodiments, the wafer simulation operation includes a lithography simulation that uses the calculated mask images. Additional description of the mask generation, mask simulation, and wafer simulation operations is provided in U.S. Pat. No. 8,719,739, entitled "Method and System for Forming Patterns Using Charged Particle Beam Lithography", which is incorporated herein by reference.

After the wafer simulation is performed for a given mask layout, the produced wafer patterns are examined to determine whether the mask layout should be revised and/or to determine whether one or more physical design operations should be repeated in order to revise the physical design layout. In some embodiments, the wafer pattern examination involves comparing the produced simulated wafer pattern to an ideal target pattern (e.g., to ensure that the predicted wafer image is within a minimum deviation of the target wafer image). In some embodiments, the multi-layer aware mask layout optimization techniques described above are also part of the wafer pattern examination.

Conjunctively, or alternatively, this examination involves performing DRC checks on the produced wafer patterns that are predicted to appear on the IC die by the wafer simulator. In some embodiments, the process 4000 can iteratively repeat the sub-operations (i.e., the mask layout generation, the mask simulation, and the wafer simulation) of the mask production operation 4045 in order to improve the quality of the overall generated mask or can return to one of the earlier physical design operations 4018, as described above.

Once the mask layout is generated and verified, the process 4000 generates the masks specified for all the layers of the IC based on the mask layout. Mask generation transforms each mask image (also referred to as a mask layer, in some embodiments) of the mask layout into one or more lithographic masks in some embodiments. Once the masks are generated, the process 4000 performs (at 4050) wafer fabrication, which uses the generated masks to manufacture multiple IC dies on an IC wafer (e.g., a silicon wafer). The masks for the substrate and each wiring layer are used to generate the devices and wiring on the substrate and each wiring layer of each IC die. Each IC die is usually tested. During the testing of the IC dies, if it is determined that the IC has a defect because of its design or its masks, the process 4000 has to return to an earlier operation to improve its design layout, its mask layout, or its mask production operation. Lastly, the process 4000 performs (at 4055) packaging, which places each IC die in one chip package. Packaging in some embodiments includes slicing a wafer into multiple IC dies and placing each die on a substrate, which is then encapsulated to form a chip package. After performing packaging, the process 4000 ends.

Although several embodiments were described above by reference to performing mask layout optimization to optimize mask layouts for IC designs used to design and/or manufacture an IC, one of ordinary skill will realize that other embodiments are used to perform mask layout optimization for mask layouts for manufacturing silicon interposers (e.g., wiring patterns on silicon interposers).

Still other embodiments are used to design and manufacture other patterns on other types of substrates. For instance, some embodiments use the above-described mask optimization processes to produce optimized mask layouts for designing displays such as flat-panel displays (e.g., monitors, televisions, glasses, etc.) or curved displays (e.g., displays for virtual reality or augmented reality headsets). Such design layouts define patterns of controllable pixels on a display substrate. Still other embodiments use the above-described multi-layer aware mask optimization processes to produce mask layouts for manufacturing other patterns of other elements on other substrates.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 41:
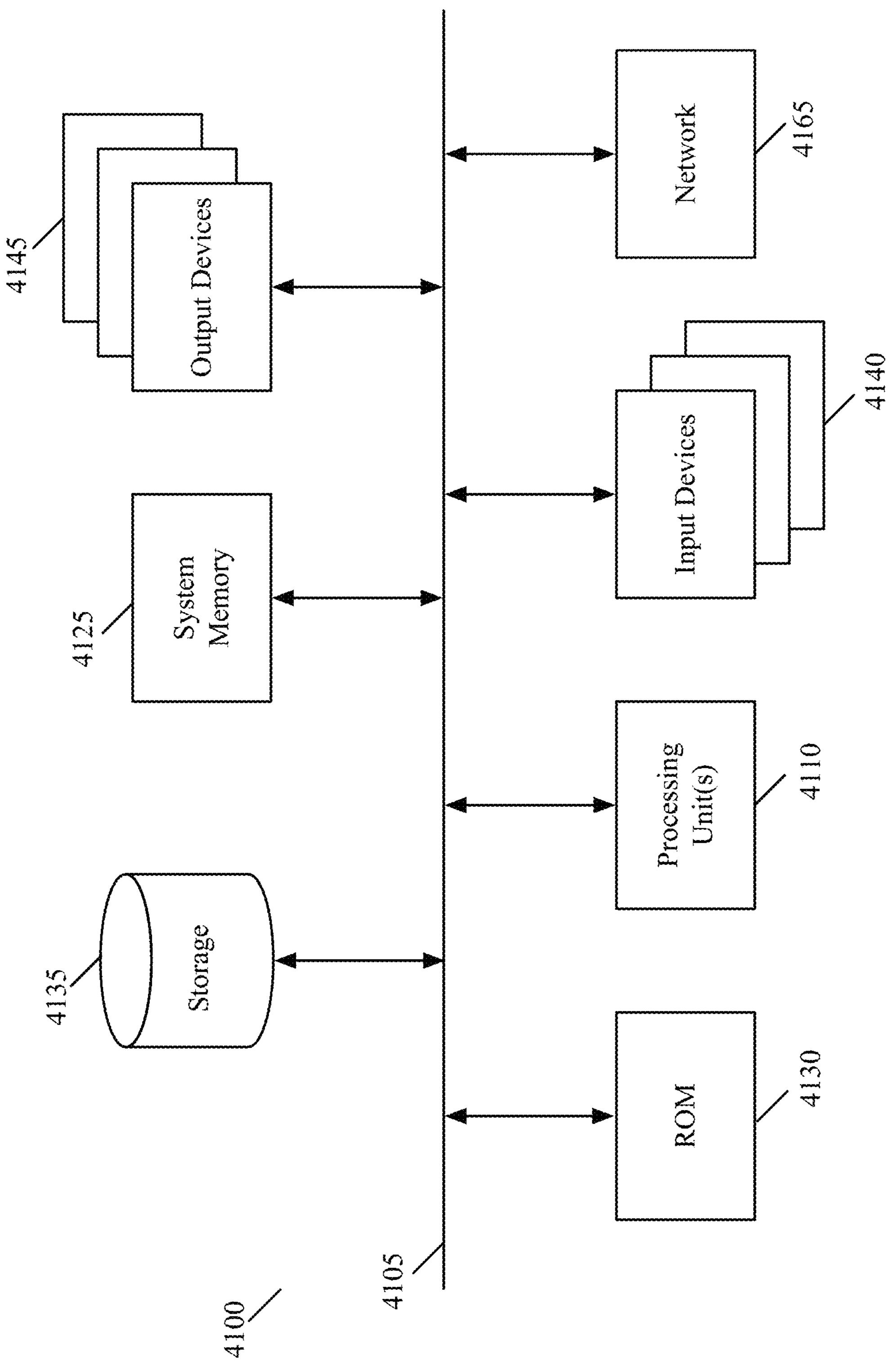
FIG. 41 conceptually illustrates a computer system with which some embodiments of the invention are implemented.

FIG. 41 conceptually illustrates a computer system 4100 with which some embodiments of the invention are implemented. The computer system 4100 can be used to implement any of the above-described computers and servers. As such, it can be used to execute any of the above-described processes. This computer system includes various types of non-transitory machine-readable media and interfaces for various other types of machine-readable media. Computer system 4100 includes a bus 4105, processing unit(s) 4110, a system memory 4125, a read-only memory 4130, a permanent storage device 4135, input devices 4140, and output devices 4145.

The bus 4105 collectively represents all system, peripheral, and chipset buses that communicatively connect the numerous internal devices of the computer system 4100. For instance, the bus 4105 communicatively connects the processing unit(s) 4110 with the read-only memory 4130, the system memory 4125, and the permanent storage device 4135.

From these various memory units, the processing unit(s) 4110 retrieve instructions to execute and data to process in order to execute the processes of the invention. The processing unit(s) may be a single processor or a multi-core processor in different embodiments. The read-only-memory (ROM) 4130 stores static data and instructions that are needed by the processing unit(s) 4110 and other modules of the computer system. The permanent storage device 4135, on the other hand, is a read-and-write memory device. This device is a non-volatile memory unit that stores instructions and data even when the computer system 4100 is off. Some embodiments of the invention use a mass-storage device (such as a magnetic or optical disk and its corresponding disk drive) as the permanent storage device 4135.

Other embodiments use a removable storage device (such as a flash drive, etc.) as the permanent storage device. Like the permanent storage device 4135, the system memory 4125 is a read-and-write memory device. However, unlike storage device 4135, the system memory is a volatile read-and-write memory, such a random-access memory. The system memory stores some of the instructions and data that the processor needs at runtime. In some embodiments, the invention's processes are stored in the system memory 4125, the permanent storage device 4135, and/or the read-only memory 4130. From these various memory units, the processing unit(s) 4110 retrieve instructions to execute and data to process in order to execute the processes of some embodiments.

The bus 4105 also connects to the input and output devices 4140 and 4145. The input devices enable the user to communicate information and select commands to the computer system. The input devices 4140 include alphanumeric keyboards and pointing devices (also called "cursor control devices"). The output devices 4145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 41, bus 4105 also couples computer system 4100 to a network 4165 through a network adapter (not shown). In this manner, the computer can be a part of a network of computers (such as a local area network ("LAN"), a wide area network ("WAN"), or an Intranet, or a network of networks, such as the Internet. Any or all components of computer system 4100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms “computer”, “server”, “processor”, and “memory” all refer to electronic or other technological devices. These terms exclude people or groups of people. For the purposes of the specification, the terms display or displaying means displaying on an electronic device. As used in this specification, the terms “computer readable medium,” “computer readable media,” and “machine readable medium” are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for modifying a mask layout for producing masks used to manufacture an integrated circuit (IC), the mask layout comprising a plurality of mask images for a plurality of layers of the IC, the method comprising:

identifying a first set of mask images corresponding to a first layer of the design layout and a second set of mask images corresponding to a second layer of the design layout;

formulating a problem that expresses (i) correlation between desired shapes of IC components and predicted as-manufactured shapes of the IC components that are produced through wafer simulation operations and (ii) sizes of overlaps between the predicted as-manufactured shapes of IC components of the first and second layers at locations in the design layout at which the first-layer IC components are intended to connect to the second-layer IC components, wherein the IC components comprise a plurality of components on the first layer and a plurality of vias on the second layer, each via connecting a component on the first layer to a component on another layer; and iteratively solving the problem by iteratively exploring modifications to both the first and second sets of mask images in order to identify modified first and second sets of mask images that result in predicted as-manufactured shapes for the plurality of components on the first layer and the plurality of vias on the second layer that (i) sufficiently correlate to the desired shapes of the plurality of components and plurality of vias and (ii) have sufficient overlap sizes at locations at which the vias are intended to connect to the first-layer components in the design layout.

2. The method of claim 1 further comprising identifying a third set of mask images corresponding to a third layer of the design layout, wherein:

the plurality of components on the first layer is a first plurality of components;

the IC components further comprise a second plurality of components on the third layer;

each via of a set of the vias connects a first-layer component to a third-layer component;

the formulated problem further expresses sizes of overlaps between the predicted as-manufactured shapes of vias on the second layer and components of the third layer at locations in the design layout at which the third-layer components are intended to connect to the second-layer vias in the design layout; and iteratively solving the problem comprises exploring modifications to the first, second, and third sets of mask images in order to identify modified first, second, and third sets of mask images that result in predicted as-manufactured shapes for the plurality of components and the plurality of vias that (i) sufficiently correlate to the desired shapes of the pluralities of components and plurality of vias and (ii) have sufficient overlap sizes at locations at which the vias are intended to connect to the first-layer components and to the third-layer components in the design layout.

3. The method of claim 2, wherein the first and third layers are metal layers and the second layer is a dielectric layer between the first and third layers with vias connecting components on the first layer and third layer.

4. The method of claim 1, wherein the first set of mask images are used to fabricate a metal wiring first layer of the IC and the second set of mask images are used to fabricate vias of a dielectric second layer adjacent to the first layer.

5. The method of claim 1 further comprising identifying a plurality of overlaps between components in the first layer and vias in the second layer, each respective overlap comprising a respective first-layer component and a respective via that connects the respective first-layer component to another component in another layer.

6. The method of claim 5, wherein the formulated problem expresses, for each identified overlap, a cost in an objective function that decreases as the size of the overlap increases.

7. The method of claim 6, wherein each identified overlap between a first-layer component and a second-layer via is expressed as a minimum overlap between a plurality of predicted as-manufactured shapes for the first-layer component and the second-layer via based on different manufacturing process conditions and misalignments.

8. The method of claim 1, wherein iteratively solving the problem comprises, for a particular iteration:

performing wafer simulation operations (i) to generate, from a current iteration of the first set of mask images, a first wafer image comprising predicted as-manufactured shapes of the plurality of components on the first layer and (ii) to generate, from a current iteration of the second set of mask images, a second wafer image comprising predicted as-manufactured shapes of the plurality of vias on the second layer; and modifying at least one mask image in the first set of mask images and at least one mask image in the second set of mask images.

9. The method of claim 8, wherein modifying at least one mask image in the first and second sets of mask images comprises:

modifying a first mask shape in a first mask image of the first set of mask images, the first mask shape relating to fabrication of a first first-layer IC component; and modifying a second mask shape in a second mask image of the second set of mask images, the second mask shape relating to fabrication of a second-layer via that overlaps with a second first-layer IC component.

10. The method of claim 9, wherein modifying the at least one mask image in the first and second sets of mask images further comprises modifying a third mask shape in the second mask image, the third mask shape relating to fabrication of a second-layer via that overlaps the first first-layer IC component.

11. The method of claim 9, wherein no mask shape relating to fabrication of the second first-layer IC component is modified.

12. A non-transitory machine-readable medium storing a program which when executed by at least one processing unit modifies a mask layout for producing masks used to manufacture an integrated circuit (IC), the mask layout comprising a plurality of mask images for a plurality of layers of the IC, the program comprising sets of instructions for:

identifying a first set of mask images corresponding to a first layer of the design layout and a second set of mask images corresponding to a second layer of the design layout;

formulating a problem that expresses (i) correlation between desired shapes of IC components and predicted as-manufactured shapes of the IC components that are produced through wafer simulation operations and (ii) sizes of overlaps between the predicted as-manufactured shapes of IC components of the first and second layers at locations in the design layout at which the first-layer IC components are intended to connect to the second-layer IC components, wherein the IC components comprise a plurality of components on the first layer and a plurality of vias on the second layer, each via connecting a component on the first layer to a component on another layer; and iteratively solving the problem by iteratively exploring modifications to both the first and second sets of mask images in order to identify modified first and second sets of mask images that result in predicted as-manufactured shapes for the plurality of components on the first layer and the plurality of vias on the second layer that (i) sufficiently correlate to the desired shapes of the plurality of components and plurality of vias and (ii) have sufficient overlap sizes at locations at which the vias are intended to connect to the first-layer components in the design layout.

13. The non-transitory machine-readable medium of claim 12 further comprising identifying a third set of mask images corresponding to a third layer of the design layout, wherein:

the plurality of components on the first layer is a first plurality of components;

the IC components further comprise a second plurality of components on the third layer;

each via of a set of the vias connects a first-layer component to a third-layer component;

the formulated problem further expresses sizes of overlaps between the predicted as-manufactured shapes of vias on the second layer and components of the third layer at locations in the design layout at which the third-layer components are intended to connect to the second-layer vias in the design layout; and the set of instructions for iteratively solving the problem comprises a set of instructions for exploring modifications to the first, second, and third sets of mask images in order to identify modified first, second, and third sets of mask images that result in predicted as-manufactured shapes for the plurality of components and the plurality of vias that (i) sufficiently correlate to the desired shapes of the pluralities of components and plurality of vias and (ii) have sufficient overlap sizes at locations at which the vias are intended to connect to the first-layer components and to the third-layer components in the design layout.

14. The non-transitory machine-readable medium of claim 13, wherein the first and third layers are metal layers and the second layer is a dielectric layer between the first and third layers with vias connecting components on the first layer and third layer.

15. The non-transitory machine-readable medium of claim 12, wherein the first set of mask images are used to fabricate a metal wiring first layer of the IC and the second set of mask images are used to fabricate vias of a dielectric second layer adjacent to the first layer.

16. The non-transitory machine-readable medium of claim 12, wherein the program further comprises a set of instructions for identifying a plurality of overlaps between components in the first layer and vias in the second layer, each respective overlap comprising a respective first-layer component and a respective via that connects the respective first-layer component to another component in another layer.

17. The non-transitory machine-readable medium of claim 16, wherein the formulated problem further expresses, for each identified overlap, a cost in an objective function that decreases as the size of the overlap increases.

18. The non-transitory machine-readable medium of claim 16, wherein each identified overlap between a first-layer component and a second-layer via is expressed as a minimum overlap between a plurality of predicted as-manufactured shapes for the first-layer component and the second-layer via based on different manufacturing process conditions and misalignments.

19. The non-transitory machine-readable medium of claim 12, wherein the set of instructions for iteratively solving the problem comprises sets of instructions for, for a particular iteration:

performing wafer simulation operations (i) to generate, from a current iteration of the first set of mask images, a first wafer image comprising predicted as-manufactured shapes of the plurality of components on the first layer and (ii) to generate, from a current iteration of the second set of mask images, a second wafer image comprising predicted as-manufactured shapes of the plurality of vias on the second layer; and modifying at least one mask image in the first set of mask images and at least one mask image in the second set of mask images.

20. The non-transitory machine-readable medium of claim 19, wherein the set of instructions for modifying at least one mask image in the first and second sets of mask images comprises sets of instructions for:

modifying a first mask shape in a first mask image of the first set of mask images, the first mask shape relating to fabrication of a first first-layer IC component; and modifying a second mask shape in a second mask image of the second set of mask images, the second mask shape relating to fabrication of a second-layer via that overlaps with a second first-layer IC component.

* * * * *